FIP8102 XR 3,173,996

March 16, 1965 C. A. RYPINSKI, JR 3,173,996

MULTIPLE CHANNEL RADIO TELEPHONE SYSTEM

Filed Dec. 1, 1961 17 Sheets-Sheet 1

CHANDOS A. RYPINSKI, JR.
INVENTOR

BY [signature]
ATTORNEYS

CHANDOS A. RYPINSKI, JR.
INVENTOR.

BY Fraser and Bogucki
ATTORNEYS

MULTIPLE CHANNEL RADIO TELEPHONE SYSTEM

INVENTOR.
CHANDOS A. RYPINSKI, JR.
BY [signature]
ATTORNEYS

MULTIPLE CHANNEL RADIO TELEPHONE SYSTEM

Filed Dec. 1, 1961

CHANDOS A. RYPINSKI, JR.
INVENTOR.

BY [signature]

ATTORNEYS

MULTIPLE CHANNEL RADIO TELEPHONE SYSTEM

Filed Dec. 1, 1961 17 Sheets-Sheet 7

CHANDOS A. RYPINSKI, JR.
INVENTOR.
BY [signature]
ATTORNEYS

MULTIPLE CHANNEL RADIO TELEPHONE SYSTEM

INVENTOR.
CHANDOS A. RYPINSKI, JR.
BY Leonard Bogunski
ATTORNEYS

March 16, 1965 C. A. RYPINSKI, JR 3,173,996

MULTIPLE CHANNEL RADIO TELEPHONE SYSTEM

Filed Dec. 1, 1961 17 Sheets-Sheet 10

CHANDOS A. RYPINSKI, JR.
INVENTOR.

BY [signature]
ATTORNEYS

MULTIPLE CHANNEL RADIO TELEPHONE SYSTEM

Filed Dec. 1, 1961

CHANDOS A. RYPINSKI, JR.
INVENTOR.

BY Fraser and Bogucki

ATTORNEYS

INVENTOR.
CHANDOS A. RYPINSKI, JR.
BY Fraser and Bogucki
ATTORNEYS

March 16, 1965 C. A. RYPINSKI, JR 3,173,996

MULTIPLE CHANNEL RADIO TELEPHONE SYSTEM

Filed Dec. 1, 1961 17 Sheets-Sheet 13

CHANDOS A. RYPINSKI, JR.
INVENTOR.

BY [signature]

ATTORNEYS

March 16, 1965 C. A. RYPINSKI, JR 3,173,996

MULTIPLE CHANNEL RADIO TELEPHONE SYSTEM

Filed Dec. 1, 1961 17 Sheets-Sheet 15

March 16, 1965 C. A. RYPINSKI, JR 3,173,996
MULTIPLE CHANNEL RADIO TELEPHONE SYSTEM
Filed Dec. 1, 1961 17 Sheets-Sheet 16
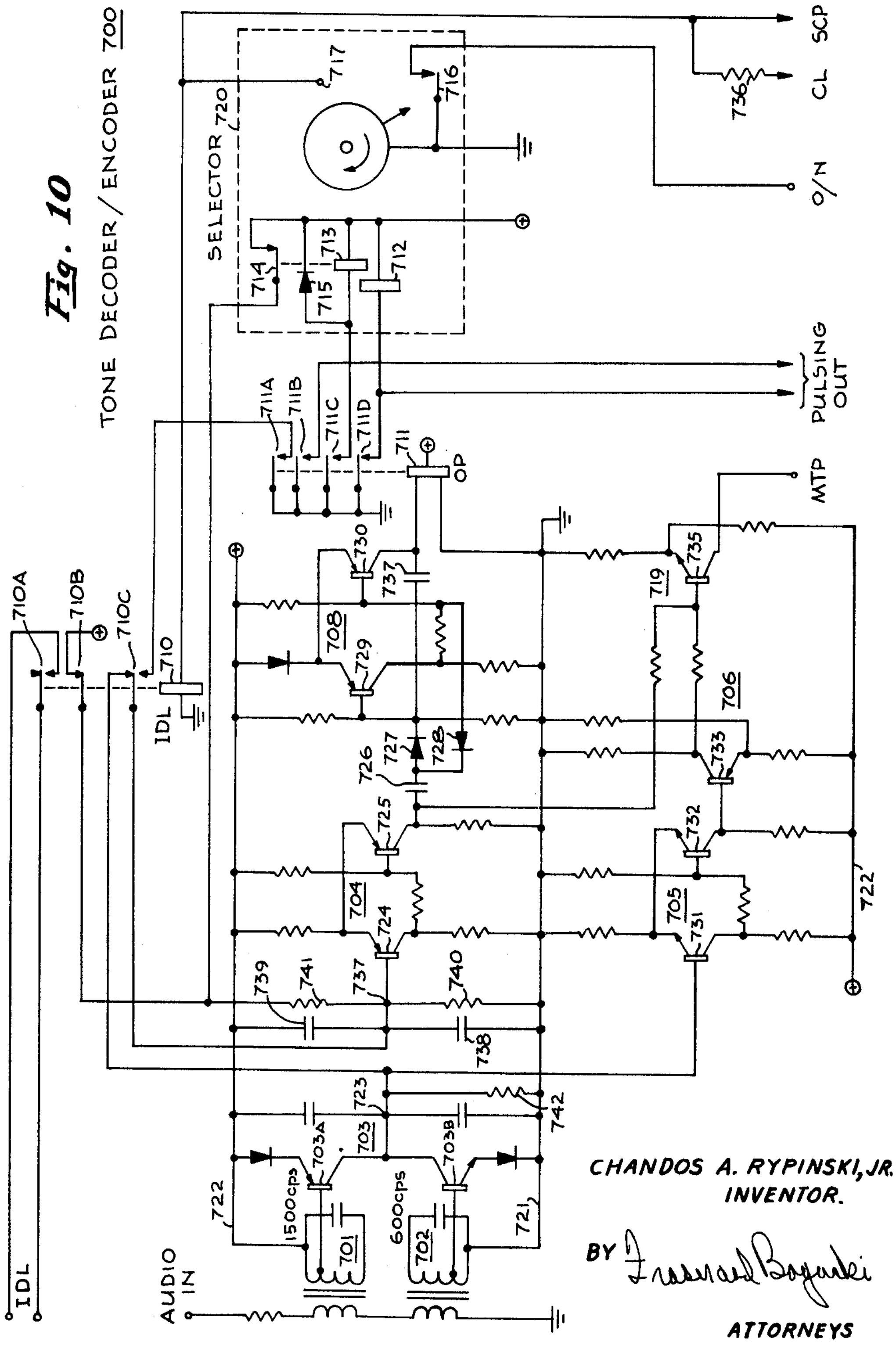
Fig. 10 TONE DECODER/ENCODER 700
CHANDOS A. RYPINSKI, JR.
INVENTOR.
BY [signature]
ATTORNEYS CHANDOS A. RYPINSKI, JR.
INVENTOR.
BY Fraser and Bogucki
ATTORNEYS United States Patent Office 3,173,996

Patented Mar. 16, 1965

3,173,996
MULTIPLE CHANNEL RADIO TELEPHONE SYSTEM

Chandos A. Rypinski, Jr., Tiburon, Calif., assignor to Secode Corporation, a corporation of California Filed Dec. 1, 1961, Ser. No. 157,306
85 Claims. (Cl. 179—41)

This invention relates to multiple channel radio telephone systems and more particularly to a new and improved system for communication between a plurality of unit stations and a central office terminal via any one of a number of separate communication channels.

In present day radio telephone systems, one or more base stations of fixed location may be employed for the transmission and reception of messages from a plurality of unit stations over predetermined communication channels. Where the number of unit stations exceeds the number of available channels, some sort of sharing of the channels between the unit stations is required. One arrangement is to separate the unit stations into groups, each of which shares a channel in a fashion similar to a party line telephone. This arrangement, however is seriously deficient in that at any given time a unit station may encounter a busy condition on its own communication channel while others of the channels are not in use. Therefore, for maximum channel utilization, some arrangement must be provided for enabling the unit stations to use a manually or automatically selected one of the available communication channels.

A selection of one of a group of channels may be accomplished at a unit station by means of a manual switch, as for example, by means of pushbuttons, where a busy indication is provided for each channel. Manual selection, however, not only requires a technical knowledge on the part of the user above that required for ordinary telephone usage, but also enables one party to monitor the conversation of another at will.

The problems associated with the selection of one of a plurality of communication channels for use between a base station and a selected unit station are particularly acute in the field of mobile radio telephony. Due to an increased utiliation of both automotive vehicles and telephones, there has arisen a consumer demand for the placing of telephones in automotive vehicles. In order to integrate a mobile radio telephone system into a conventional wire connected telephone system, it is desirable that the mobile unit station perform as much as possible as if it were a conventional wire connected telephone. Accordingly, control of channel access, direct dialing of local and toll numbers, accuracy in billing, privacy, freedom from delay and efficiency in use of radio channel time are all necessary. At the present time, there is not in operation any system which satisfactorily meets all of the above requirements.

Perhaps the greatest problem which has remained unsolved in radio telephone systems is the transfer of control signals between a base station and a plurality of unit stations attendant upon the selection of one of several possible communicaiton channels. Although a system was proposed some years ago which afforded automatic access by a plurality of mobile units to each of several channels for communication with a base station, the proposed system suffered from a great many disadvantages. For example, the proposed system depended upon the presence or absence of a radio frequency carrier wave on a channel to transmit logical control information between the base station and the unit stations. The absence of the carrier was utilized to designate an idle channel upon which a next communication might take place. This meant that the presence of a weak carrier wave from an adjoining area could produce a false indication to some of the mobiles in the system to the effect that the particular channel was busy when in fact it was idle. Moreover, momentary fades in the strength of the base station carrier waves would on occasion be interpreted as indicating an idle channel when in fact the channel was busy.

An additional difficulty of certain prior art systems is the loss of channel time from searching for an idle channel at the completion of every call by every non-busy radio connected subscriber. The period required for channel search is not profitably used for either signalling or talking on the channel and calls must be withheld until the unit stations are in position on the idle channel. If it is assumed that a call requires two minutes, an eight channel system in full use could complete a call every fifteen seconds. The idle channel search time would be added to this time, amounting to a significant loss in useful channel time even if the channel search only required three seconds' time.

An additional difficulty in certain prior art systems is an unnecessarily long exposure to the possibility of simultaneous seizure by two unit stations or one unit station and a call originating via the base station. Since the permissible size of a system may be determined by the probability of simultaneous seizure, the importance of this factor is emphasized.

Yet another limitation in known mobile radio telephone systems is the lack of any automatic arrangement for positively identifying a particular mobile unit station. The presence of information at the central office terminal identifying a particular unit station is important both from the standpoint of effecting a proper customer billing of charges for the use of the telephone equipment and also with reference to a determination as to which unit stations are engaged in a call and are therefore to be designated "busy" for a successive incoming call to that same unit station.

Another defect in known radio telephone systems is a lack of means of controlling which unit stations are entitled to obtain service at the central office. The problem is particularly acute when the unit station subscriber may have become delinquent in paying for service rendered.

Yet another defect of known mobile radio telephone systems is a lack of means for determining which unit stations are engaged in a call and are to be designated "busy" for other callers.

In the radio telephone system of the present invention, there is provided for the first time an arrangement in which communication links may be established between a base station and a plurality of unit stations via selected radio communication channels whereby each of the unit stations enjoys an automatic operation with reference to the main telephone system with a degree of speed, efficiency and facility of operation corresponding to that enjoyed by telephone subscribers in completely automatic wire connected systems.

Accordingly, it is an object of the present invention to provide a multiple channel radio telephone system which is insensitive to the appearance of carrier waves from adjacent mobile radio systems and which will work correctly so long as the system's base station transmitter is strong enough to override the carrier waves from adjacent areas.

Moreover, it is an additional object of the invention to provide a multiple channel radio communication system which is substantially unaffected by temporary fading of signals between a base station and the unit station.

It is another object of the present invention to minimize channel time diversion required for effecting the control functions between a base station and a plurality of unit stations.

It is still another object of the present invention to provide a multiple channel radio telephone system in which it is equally probable that any particular one of several communication channels will be employed for the next successive communication.

It is a further object of the present invention to provide a mobile telephone system in which positive identification of each unit station engaged in communication with a base station is achieved.

It is yet an additional object of the present invention to provide a mobile radio telephone system including storage of identification of busy unit stations at a base terminal.

It is another object of the present invention to provide a mobile radio telephone system in which a positive determination of unit stations in service is obtained at the base station.

It is yet another object of the present invention to provide a mobile radio telephone system in which the equipment required at each unit station is minimized.

It is yet another object of the present invention to provide a multiple channel radio telephone system in which a communication occurring on any particular channel is accorded a high degree of privacy.

It is yet another object of the present invention to provide a multiple channel radio telephone system having dial selection of called stations in either direction.

It is still another object of the present invention to provide a multiple channel radio telephone system in which the possibility of a double seizure of a communication channel is minimized.

In accordance with one aspect of the present invention there is provided a multiple channel radio telephone system in which a central office terminal and an associated base radio station function to establish communication links between the base station and selected ones of a plurality of unit stations via any one of a plurality of communication channels. The base station includes means for identifying a particular one of said communication channels by means of a marking signal to designate that channel upon which a next communication is to take place. Each of the unit stations includs a channel selector which sequentially scans each of the channels in search of the marking signal. The channel selector comes to rest upon the marked channel so that the next successive communication takes place over the marked idle channel. Where the call originates on the base station side of the system, a particular one of the unit stations is selected to remain on the marked idle channel while the remainder of the unit stations are caused to initiate search, scanning each of the communication channels in search of a marking signal applied thereto upon seizure of the previous channel for communication.

On the other hand, where a call originates from a unit station, seizure of the channel by the unit station causes the base station to transfer the marking signal to another channel so as to cause each of the remaining unit stations to seek out and come to rest upon the newly marked idle channel. By this means, each of the unit stations remains at rest upon an idle channel which is designated for a next successive communication. However, upon seizure of the communication channel in either direction, all but the selected or calling unit station are transferred to a newly marked channel. The marking signal applied to the idle channel thereby functions to establish positively which channel is in fact idle so that possible interference from carrier waves originating in adjacent areas is substantially eliminated. Moreover, receipt of the marking signal by the receiver indicates that a suitable signal can be transmitted between the base station and that particular unit station, thereby insuring the availability of a communication channel.

In the absence of receipt of any marking signal on a particular channel, a busy indication may be given at the unit station to indicate that no communication channel is available for use. By the above means, each of the communication channels is given an equal probability of use both for calls originating via the base station and for calls originating at the unit stations. Accordingly, maximum utilization of the communication channels is achieved, thereby effecting an enhanced degree of efficiency and operation of the system where a relatively large number of unit stations are served by a given number of communication channels.

In accordance with another aspect of the present invention a multiple channel radio telephone system is employed in which each one of a plurality of unit stations functions to transmit a numerical identification whenever the unit station originates a call. At the base station, the mobile unit identification is stored with the information being employed to enable the base station to determine whether or not the unit station is busy, i.e., engaged in a communication, on a receipt of each successive incoming call from the office side. Moreover, the storage of the unit identification at the base station enables the base station to transmit the mobile identification to central office billing equipment which functions to prepare the customer's statement in accordance with the identification of the unit station making the call so that a complete automatic billing procedure may be achieved. Dialed calls may therefore be charged proportionally to the usage time.

In accordance with another aspect of the present invention there is provided in a multiple channel radio telephone system a base terminal including an in-service number test arrangement by means of which calls originated on either side of the radio channels may be evaluated to determine whether or not a particular unit station is in service. Thus, a control may be obtained at the base station with respect to communication with particular unit stations which may be for one reason or another out of service.

Another aspect of the present invention arises from the manner in which the base station of the multiple channel radio telephone system of the invention effects the transmission of a numerical designation for selecting a unit station. In particular, the base station may be arranged to employ transitional tone signalling of the marking signal with the frequency shift modulation of the marking signal bearing the numerical designation. At the unit stations, an arrangement is provided for sensing the modulation of the marking signal to energize a selector with each selector at each unit station being assigned a unique numerical designation. By this means, a selected communication may be established with a selected unit station, and upon termination of the marking signal all other unit stations may be transferred to a newly marked idle channel.

Another feature of the present invention arises from the utilization of a guard tone by the unit stations during the transmission of numerical designations to the base station. The presence of the guard tone enables the base station to immediately identify a carrier fade situation indicating mutilated signalling.

In accordance with yet another aspect of the present invention a multiple channel radio telephone system is employed in which a central office terminal at a base station functions to establish communication links between a plurality of wire connected telephone or trunk lines and a relatively large number of unit stations by numerically selecting the called subscriber with the connection being established between the base station and the calling or selected unit station with a rapidity which minimizes the exposure of the system to the possibility of a double seizure of a particular communication channel.

In a particular system in accordance with the invention described in detail below by way of example, communication links are established via a crossbar switch between a plurality of incoming trunk telephone lines and selected unit stations via any one of a number of separate radio channels. Equipment at the base station performs the function of generating a marking signal on an idle communication channel to be employed for the next successive communication while each of the unit stations includes a channel selector responsive to the marking signal for maintaining the unit station when not in use on the idle channel upon which the next communication is to take place. Briefly, when a call originates on the base station side of the radio communication link, the number of the called unit station is stored and a determination is made with respect to whether or not the called unit station is busy and whether or not the called unit station is in service. Upon a determination that the called unit station is in service and not busy, a connection is established via a crossbar switch to the idle marked communication channel. Signalling then proceeds with a numerical designation being transmitted through a modulation of the marking signal. The base station transfers the marking signal upon start of pulsing to another idle channel upon which the next successive communication is to take place. At each of the unit stations, code selectors are actuated in accordance with modulation of the marking signal to advance and compare the numerical modulation with a number to which the code selector is responsive. Ordinarily, a unique number is assigned to each station so that one unit station and one unit station only responds to the numerical designation coded on the marking signal. The code selector in the selected unit station then estabishes an electrical connection which causes the unit station to be signalled by a call bell or other indicator being actuated. After two repetitions of the called mobile identification, all unit stations except that selected are transferred to the idle channel by means of a brief interruption of marking tone. Upon answering the call at the unit station, communication takes place in normal fashion until either the party calling or the called station hangs up. The base station is arranged to identify itself in radio-telegraph code at the conclusion of each use as required by law, and the unit station after transmitting on-hook supervision is released to seek a channel upon which a marking signal appears.

Briefly summarizing the operation of the system upon origination of a call from a unit station, an off-hook signal from the unit station is transmitted to the base station and the base station transfers the marking signal to an idle channel, thereby causing all but the calling unit station to transfer to an idle channel and initiating transmission of unit identification. If the identification is acceptable the base station connects to an idle trunk and upon receipt of a start dial signal returns to the mobile a dial tone, thereby indicating that the call may proceed. The unit station may then dial a called number in conventional fashion with the numerical designation of the called number being transmitted to the base station by on-off keyed tone. The base station converts the tone signal into a conventional series of dial impulses for transmission via the crossbar switch to a trunk line and into the main telephone system. The call then proceeds upon answering by the called party in conventional fashion until such time as either the called party or the unit station terminates the call by hanging up. When the unit station goes on-hook, it is released and seeks an idle marked channel. When the wire connected subscriber goes on-hook, the crossbar switch is released and the base station may again identify itself with code signalling before terminating transmission. Various other aspects and objects of the present invention, a portion of which are set forth above, are achieved in the manner described below in connection with one particular system for practicing the present invention.

Accordingly, a better understanding of the invention may be had from a reading of the following detailed description and an inspection of the drawings in which:

FIG. 10 is a combined block and schematic circuit diagram of a tone decoder for use in the unit station equipment of FIG. 8.

GENERAL DESCRIPTION

The present invention is directed to a radio telephone communication system for establishing communication links between a plurality of unit stations and a conventional telephone system via a predetermined number of separate radio channels. The system in accordance with the invention may comprise one or more base radio stations which are interconnected via central office terminal equipment to the trunk lines of the telephone system and a large number of unit stations which are adapted to initiate and receive communications via radio channels with the base radio station. The base radio station and each of the unit stations should be capable of two-way, i.e. duplex, operation so that signals may be transmitted simultaneously in both directions over the channel.

Figure 1:
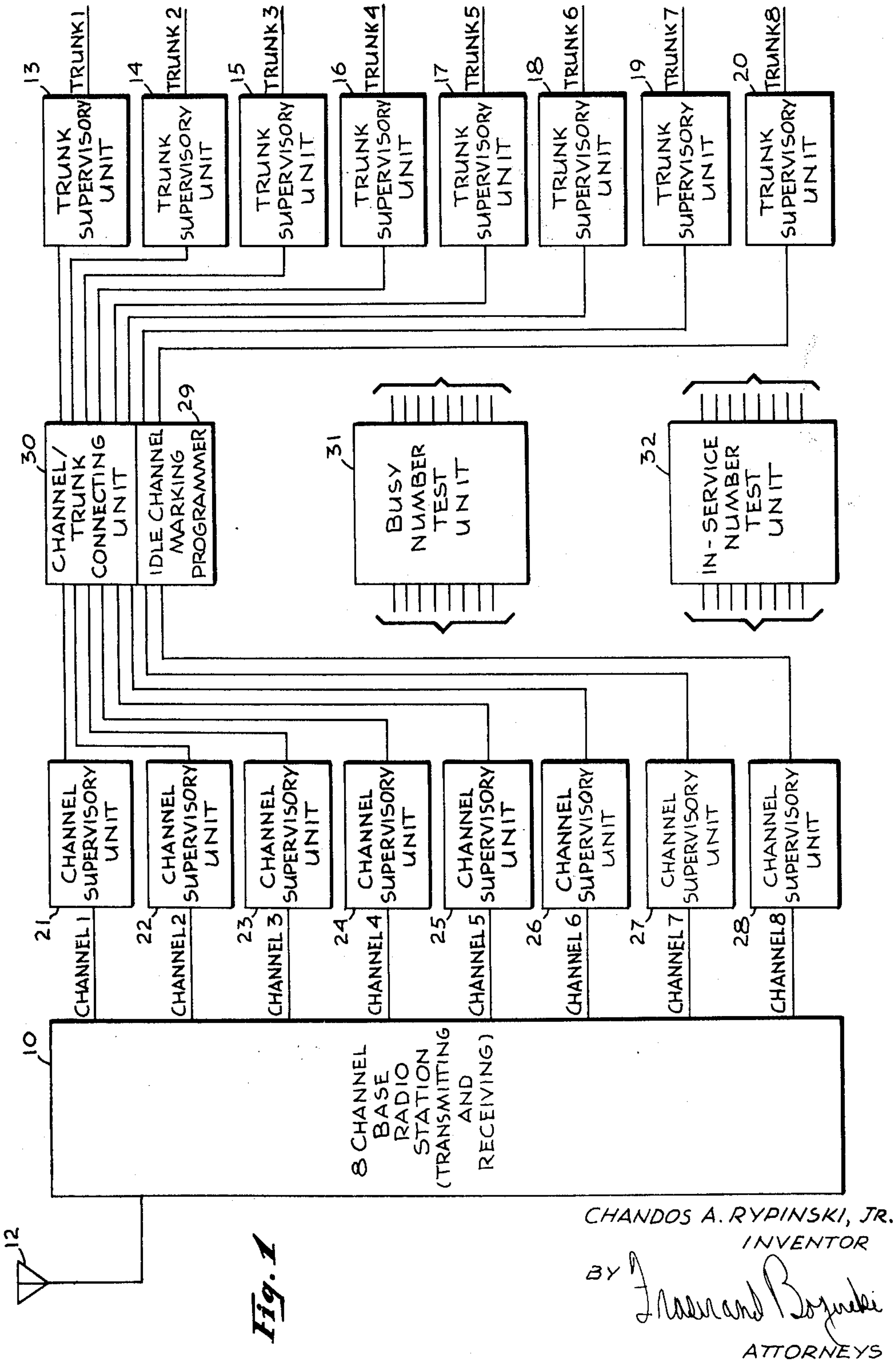
FIG. 1 is a block diagram of the base station equipment which may be employed in a radio telephone system in accordance with the present invention.

There is illustrated in FIG. 1 in block diagram form a portion of a radio telephone system in accordance with the invention including the central office terminal equipment and the base radio station. Although any number of radio channels may be employed in a system in accordance with the invention, for convenience of illustration, a system will be described herein having eight separate radio communication channels which would be suitable for use with perhaps 1000 unit stations. The eight-channel base radio station 10 of FIG. 1 is adapted to both transmit and receive radio signals via an antenna 12 within eight separate communication channels. Any conventional multiple channel radio signal transmitting and receiving method may be employed such as, for example, separate transmitters and receivers tuned to differing frequencies or subcarrier frequency division multiplex. In any event, the outgoing or transmitting communication link from the base radio station 10 should be separate from the receiving communication link. By keeping the transmitting and receiving communication links separate, a complete two-way or duplex communication system may be readily accomplished.

To the right of the radio station 10 in FIG. 1 there is illustrated in block diagram form equipment comprising a central office terminal which functions to establish selectively communication links between the radio station 10 and the trunk lines of a conventional telephone system. In the example shown, the central office terminal is adapted to operate in conjunction with conventional telephone trunk lines, each of which may comprise four wires, two of which are employed as a talking circuit and the remaining two of which carry dialing and supervisory signals in each direction. The trunk lines 1–8 each terminate in a trunk supervisory control unit. Thus, as shown in FIG. 1, trunk line 1 terminates at the trunk supervisory control unit 13, trunk line 2 terminates at a trunk supervisory control unit 14, etc.. Each of the trunk supervisory control units 13–20 may comprise a like structure which is described below and illustrated in that portion of FIG. 3 comprising FIG. 3E and FIG 3F taken together.

In a similar fashion, the electrical connections to the base radio station 10 corresponding to each of the eight communication channels may be terminated at the central office terminal in a channel supervisory unit. Thus, the channel 1 connections terminate at the central office terminal in the channel supervisory unit 21, channel 2 terminates in the channel supervisory unit 22, channel 3 terminates in the channel supervisory unit 23, etc. Again, each of the channel supervisory units 21–28 may be alike and will be described in detail below with the detailed structure being illustrated in that portion of FIG. 3 comprising sheets of drawings FIG. 3A and FIG 3B taken together.

Electrical connections from the channel supervisory units 21–28 and the trunk supervisory control units 13–20 are all brought together at the block labeled channel/trunk line connecting unit 30. The channel/trunk line connecting unit 30 functions to establish the connections between the individual circuits of the channels 1–8 and the trunk lines 1–8. It will be appreciated that any given channel may be connected to any one of the eight trunk lines, and vice versa, with the number of channel/trunk connections at any given time being determined by the number of calls being simultaneously handled by the radio telephone system. No particular trunk is associated with any particular channel by may be served equally by all channels, as all channels may be served equally by all trunks as availability permits.

Figure 3A:
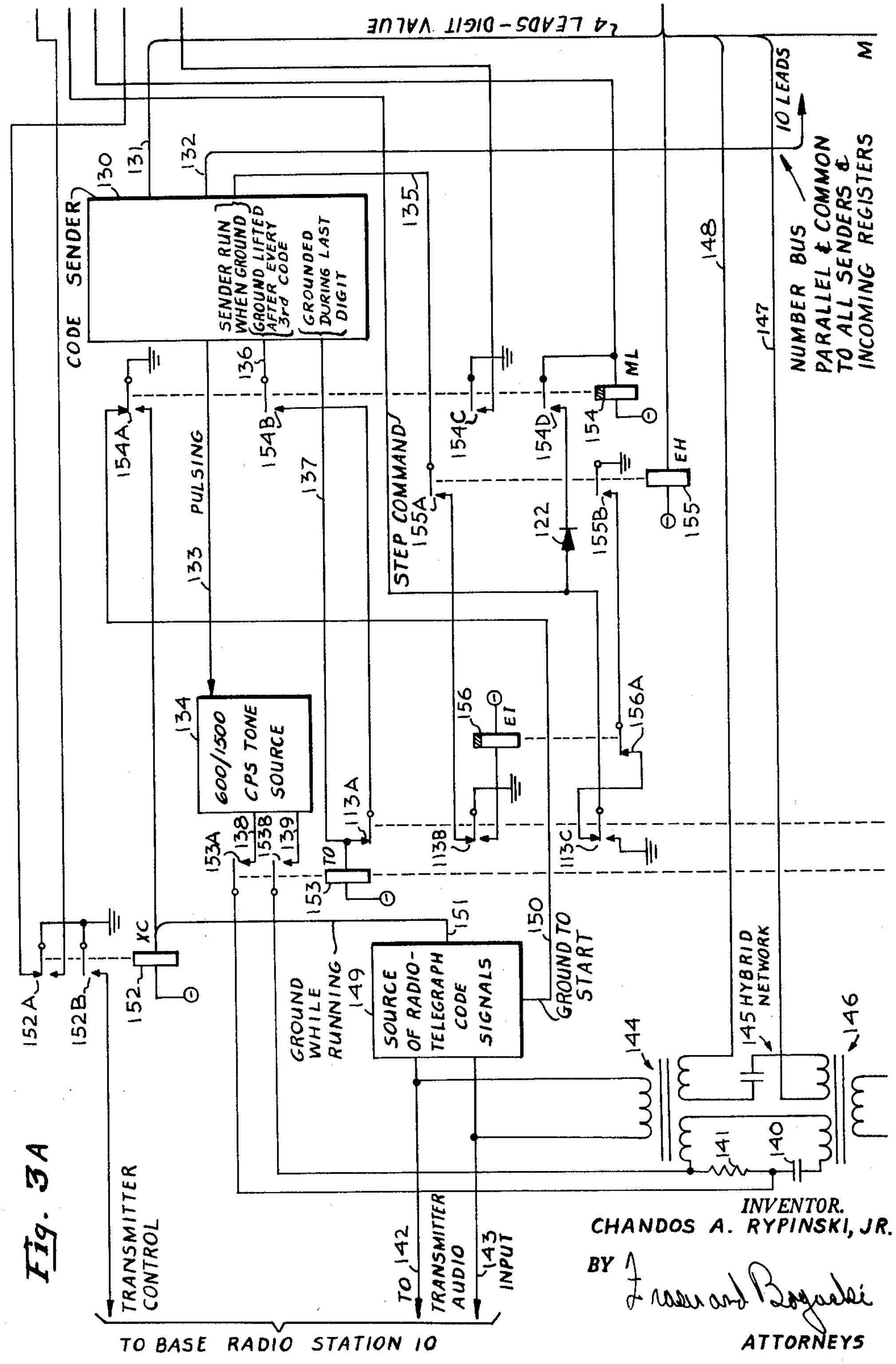
FIG. 3 is a block and schematic circuit diagram of a portion of a central office terminal for use in the base station of FIG. 1.
Figure 3B:
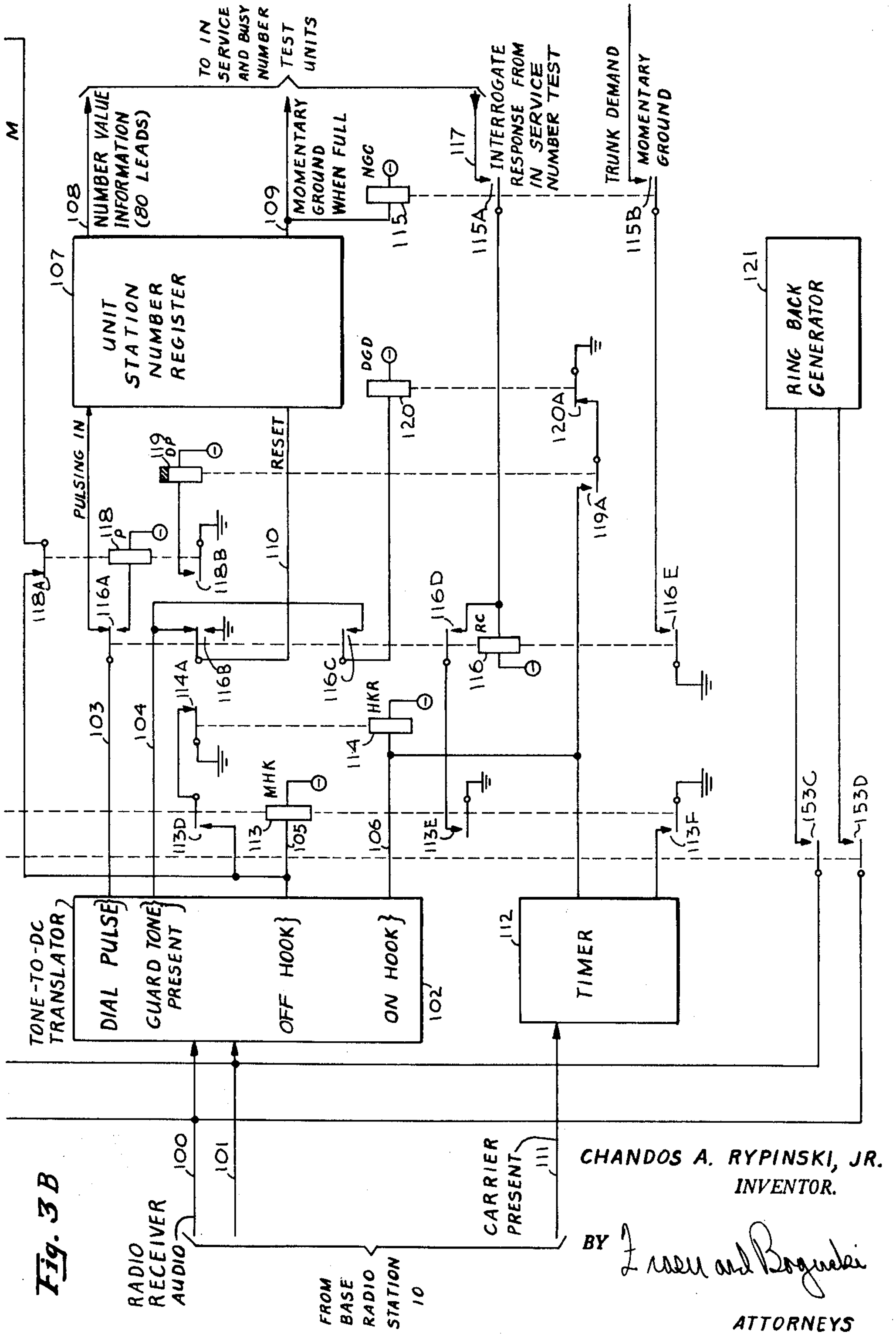

As will be described in detail below, the channel supervisory units 21–28, the channel/trunk connecting unit 30, the trunk supervisory control units 13–20 and the equipment in each unit or mobile station will cooperate to achieve a radio telephone system which permits the operation of each unit station in a manner substantially identical to that enjoyed by conventional wire connected telephones. The channel/trunk connecting unit 30 is described in detail below and corresponds to the portion of FIG. 3 comprising sheets of drawings FIGS. 3C and 3D. Thus, from an inspection of the block diagram of FIG. 1 it will be apparent that the channel supervisory unit of sheets of drawings FIGS. 3A and 3B is duplicated a number of times corresponding to the number of radio channels involved, the trunk supervisory unit of sheets of drawings FIGS. 3E and 3F is duplicated a number of times corresponding to the number of trunk lines involved, while the apparatus of sheets of drawings FIGS. 3C and 3D joins and interconnects all of the channel supervisory units 21–28 and the trunk supervisory units 13–20 as required.

Associated with the channel/trunk connecting unit 30 is an idle channel marking programmer 29 which functions in accordance with one aspect of the invention to identify a selected channel upon which a next communication is to take place. This is accomplished by placing a marking signal or tone on the selected channel as described in detail below.

Also shown in block diagram form in FIG. 1 is a block labeled busy number test unit 31 which upon the arrival of an incoming call on any one of the trunks 1–8 first establishes whether or not a particular unit station is in operation on one of the communication channels. The busy number test unit 31 is described in detail below and is shown in detail in FIG. 6. Another portion of the system in accordance with the present invention shown in FIG. 1 is the in-service number test unit 32. The in-service number test unit 32 operates with reference to calls originated both at individual unit stations and via the trunks 1–8 to determine whether or not the particular unit station calling or being called is in service and permitted to receive or initiate calls. Suitable connections from the busy number test unit 31 and the in-service number test unit 32 to the channel supervisory units 21–28 on the one hand and to the trunk supervisory control units 13–20 on the other are indicated in FIG. 1 but are not shown therein in detail in order to simplify the drawing. It will be understood, however, that these units are connected in a manner similar to that shown with the channel/trunk connecting unit 30.

In operation, upon the arrival of a call originated on the trunk lines 1–8, a determination is made as to whether the called unit station is either busy or not in service. Assuming that the number is not busy and is in service, the channel/trunk connecting unit 30 functions to establish a communication link between the trunk upon which the call appears and the selected one of the eight radio channels identified by the idle channel marking programmer 29. Signalling proceeds on an automatic basis with the unit station being automatically called by number designation. On the other hand, a call originating at a unit station arrives on a particular one of the channels 1–8 marked idle and no busy number test need be made at the radio telephone central office terminal, for on unit identification this information has no meaning and on dialing the test is unnecessary. Even if another system mobile is addressed the test will be made when the call appears at the incoming trunk supervisory control circuit forming a part of the telephone system to which the trunk lines are connected. However, an in-service number test is made by the unit 32 to determine whether or not the calling unit station is to be permitted to place a call. For example, the in-service number test unit 32 may be set to indicate those unit stations that are in arrears in payment of their telephone charges so that calls from delinquent subscribers may be inhibited. In any event, if the in-service number test indicates that the calling unit is in good standing, the channel/trunk connecting unit 30 establishes a connection between the calling unit station and one of the trunk lines 1–8.

Figure 2:
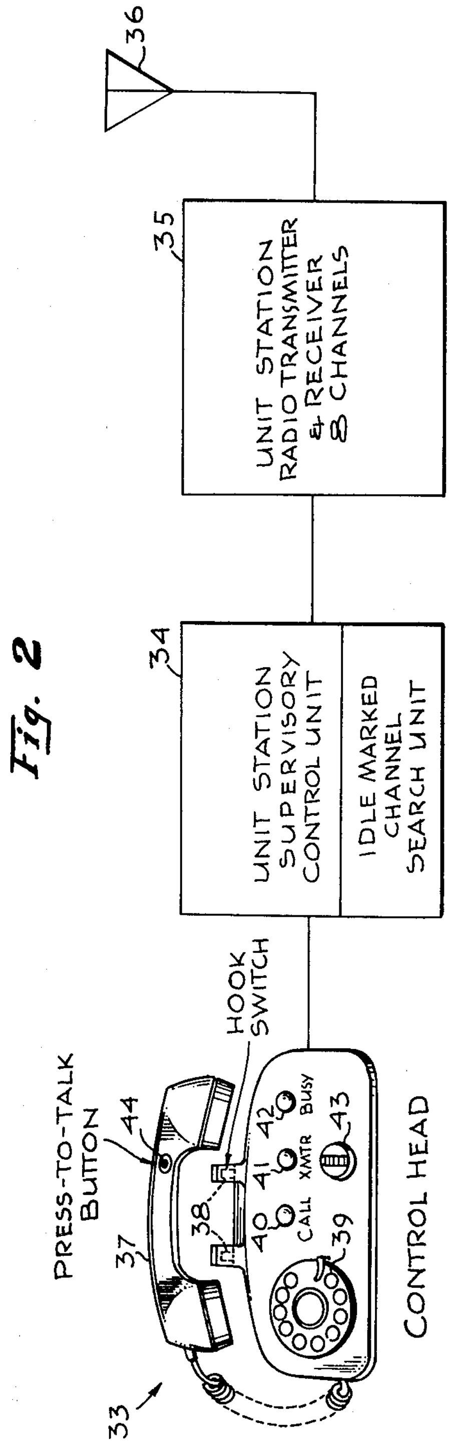
FIG. 2 is a block diagram of the unit station equipment which may be employed in a radio telephone system in accordance with the present invention.
Figure 9:
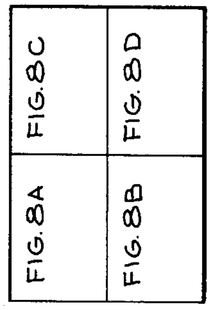
FIG. 9 illustrates the manner in which the separate sheets of drawings of FIGS. 8A–8D are combined to form FIG. 8.
Figure 4:
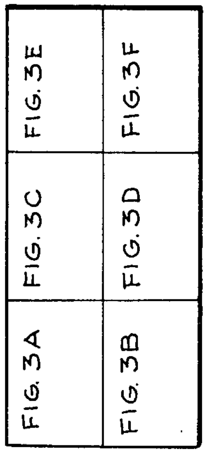
FIG. 4 is an illustration of the manner in which the separate sheets of drawings of FIGS. 3A–3F are combined to form FIG. 3.

FIG. 2 is a diagrammatic illustration of a single unit station for use in conjunction with the radio telephone system of the present invention. In general, the unit station of FIG. 2 comprises a control head 33, a unit station supervisory control unit 34 and a unit station radio transmitter and receiver 35. In over-all operation, the unit station radio transmitter receiver 35 transmits and receives signals via the antenna 36 and operates under the control of the unit station supervisory control unit 34. The control head 33 may include a telephone hand set 37 which normally engages a hook switch 38, along with a dial 39, various indicator lights 40, 41 and 42 and an off-on switch 43. A press-to-talk switch 44 may be mounted on the hand set 37 for the purpose of reducing the power requirements of the transmitter if desired. The control head 33 is interconnected with the unit station supervisory control unit 34 which in turn controls the operation of the unit station radio transmitter and receiver 35. In ordinary operation, the receiver is energized at all times to enable it to respond to transmissions from the base station of FIG. 1. The off-on switch 43 turns on the transmitter filaments while the press-to-talk switch may be connected to turn the transmitter carrier on and off. The supervisory control unit 34 may include a code selector in which is pre-set a designated number corresponding to that assigned to the unit station. Upon receipt of a transmission from the base station containing the numerical designation of the particular unit station of FIG. 2, a bell may be sounded to indicate an incoming call. Upon receipt of the correct numerical indication the hand set 37 may be lifted to enable the call to proceed. On the other hand, a call may be originated from the unit station of FIG. 2 by lifting the hand set 37, waiting for the appearance of a dial tone, and dialing the desired number by conventional manipulation of the dial 39.

As noted previously, where a single channel can be assigned to each unit station, little difficulty arises in the operation of a radio telephone system. However, with increasing utilization of mobile telephone service and the restriction on the number of radio frequencies which may be employed, some sort of channel sharing is required.

The present invention is directed to a system which overcomes this problem by an arrangement in which signalling proceeds between the base station and the unit station in a manner in which a particular communication channel is marked at the base station under the control of the idle channel marking programmer of FIG. 1 as a channel upon which the next communication is to take place. Accordingly, the unit station supervisory control unit 34 includes means for insuring that the unit station is at rest on the marked idle channel when not in use.

Figure 8A:
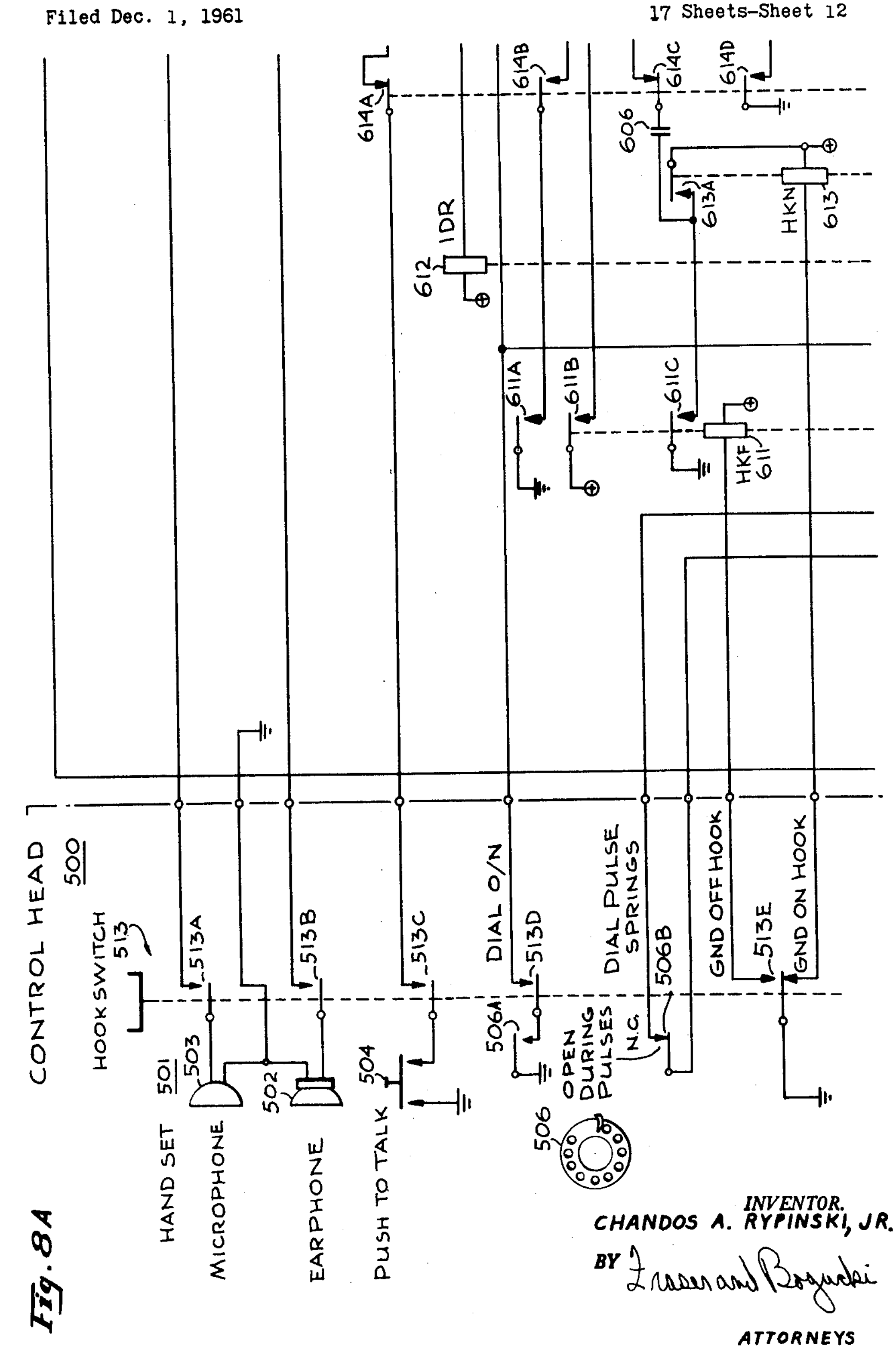
FIG. 8 is a block and schematic circuit diagram of control head and supervisory control equipment for use in the unit station of FIG. 2 particularly adapted for mobile radio telephone service.

The internal construction of the control head 33 and the supervisory control unit 34 is described in detail below and illustrated in FIG. 8 in which the left-hand portion of sheets of drawings FIGS. 8A and 8B corresponds to the control head 33 while sheets of drawings FIGS. 8C, 8D and the remaining portion of FIGS. 8A and 8B taken together correspond to the unit station supervisory control unit 34.

Although the principles of the invention may be applied in many different systems for the transmission of signal information between a base station and a large number of unit stations, it will be helpful to an understanding of the system to be described below to set forth the manner in which signal information is transmitted.

At the base station, one and one only non-busy radio channel is marked idle by the presence of a marking tone at either 600 or 1500 c.p.s. to indicate the channel on which the next outgoing call from the base station will be addressed or on which the next channel seizure by a unit station may take place. Furthermore, the base station signalling directed to the unit stations is keyed on the marking tone in the exemplary system described below, with each pulse of a numerical designation being represented by a transition from one frequency to the other.

Each of the unit stations may be signalled from a calling subscriber via the associated base station by dialing a number assigned to the unit station. At least the last three and most likely the last four digits of the number assigned to a particular unit station are identical with the corresponding digits of the unit station identification number. The transmission of supervisory and dialing signals from a unit station to the base terminal in the exemplary system described below is on a two-out-of-three tone code. Suitable tone frequencies may be:

| | C.p.s. |
|---|---|
| F1 | 1100 |
| F2 | 1300 |
| F3 | 1700 |

The signals transmitted by the unit station may be defined as follows:

Off hook=F1 and F3, but not F2
On hook=F2 and F3, but not F1
Unit station identification=F1 off pulsed, F3 on continuously as a guard tone and not F2
Dialing=F1 off pulsed, F3 on continuously as a guard tone, and not F2.

With respect to the transmission of an off hook condition of the hand set at the unit station, the signal is transmitted until acknowledged at the base station by termination of the idle channel marking tone. Furthermore, the central office terminal base station requires a positive absence of the third supervisory frequency, i.e., the absence of F2 for off hook, absence of F1 for on hook, and absence of F2 for identification and dialing. Moreover, the central office terminal at the base station senses the existence of the guard tone, i.e. F3, during identification of the unit station and dialing by the unit station so that in the event of an interruption in the guard tone, the call will be rejected.

It is a legal requirement that the base transmitter of a telephone system identify itself at the completion of each transmission. This is accomplished in radio-telegraph code at the approximate rate of 24 words per minute modulated on/off on a suitable audio tone.

CHANNEL SUPERVISORY UNIT

In that portion of FIG. 3 comprising sheets of drawings FIGS. 3A and 3B, there is shown one suitable form of channel supervisory unit for use in the central office terminal equipment of FIG. 1. In general, the portion of the structure shown in FIG. 3A functions to control outgoing calls from the base terminal to the unit station while the structure shown in FIG. 3B functions to control the operation of the system for incoming calls from a unit station. It will be appreciated that the number of channel supervisory units corresponds to the number of communication channels employed, so that the structure shown in sheets of drawings FIGS. 3A and 3B is duplicated a number of times equal to the number of communication channels.

Figure 7:
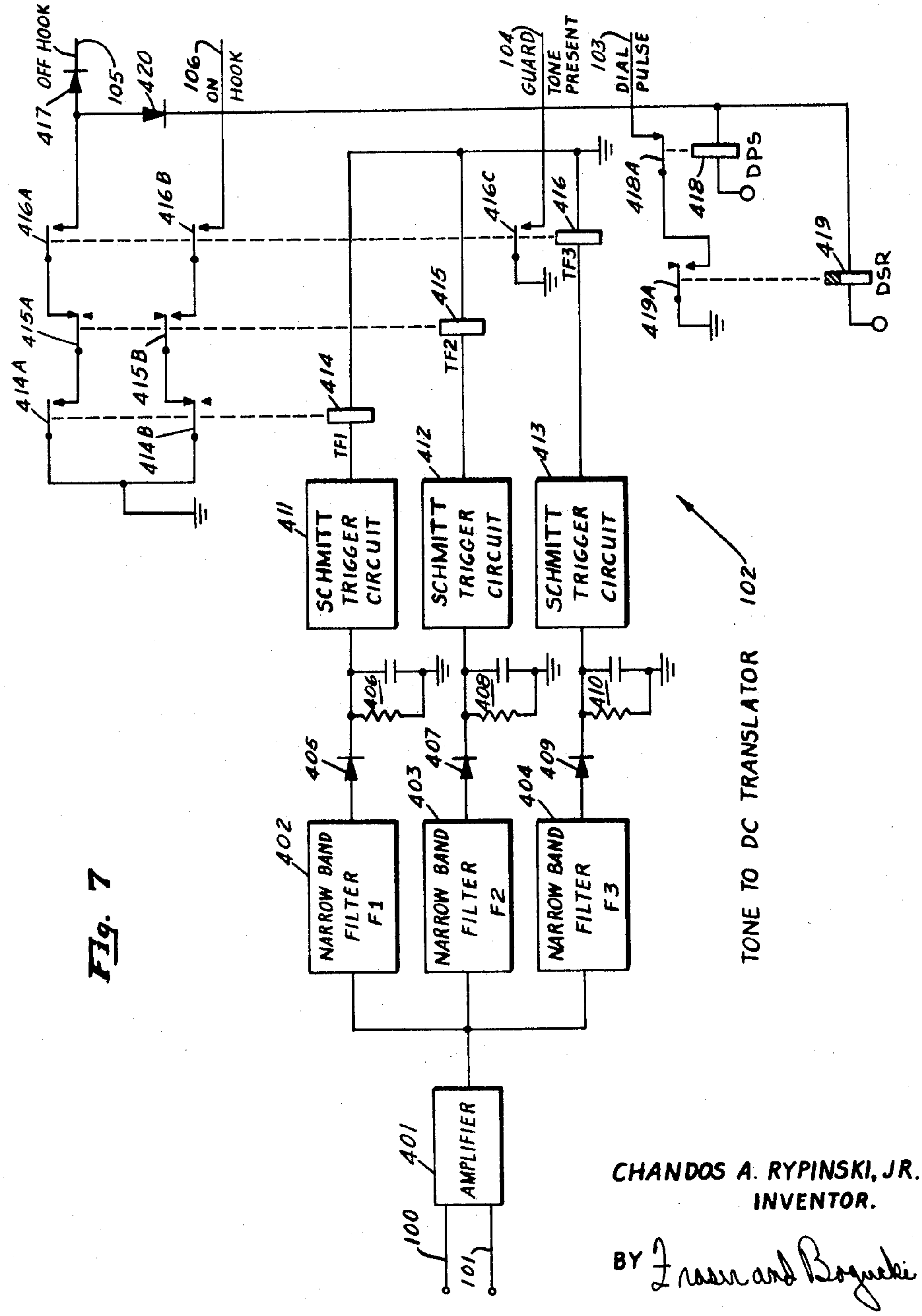
FIG. 7 is a block diagram of a tone-to-D.C. translator for use in the channel supervisory unit of FIG. 3A and FIG. 3B.

Referring in detail to FIG. 3B, audio frequencies from the unit station transmitter as received on a particular channel via the base station receiver appear on the leads 100 and 101. These signals are applied to a tone-to-D.C. translator 102 which functions to sense the appearance of various combinations of the tones F1, F2 and F3 which are transmitted by the unit station as described above in connection with a description of the signals appearing in the system. The tone-to-D.C. translator 102 may comprise three separate tone receivers, each of which is responsive to the frequency of one of the tones F1, F2 or F3. In addition, the tone-to-D.C. translator 102 may include logic circuitry for providing output signals in accordance with the appearance of various combinations of the tone signals F1, F2 and F3. One suitable form of tone-to-D.C. translator is shown in FIG. 7 and described below.

Where the unit station is transmitting signals indicating either dialing or identification, the tone-to-D.C. translator 102 provides corresponding D.C. pulses on the lead 103, which is grounded during the appearance of each pulse. In addition, the tone-to-D.C. translator 102 presents a ground condition on the lead 104 whenever the guard tone, F3, is being received. During the appearance of both the tones F1 and F3, indicating an off hook condition in the unit station, a signal appears at the output of the tone-to-D.C. translator 102 on a lead 105. For an interval immediately succeeding the unit station going on hook, the combination of F2 and F3 will be transmitted. The tone-to-D.C. translator functions to sense this condition to provide a ground connection on the lead 106. The pulses appearing on the lead 103 from the tone-to-D.C. translator 102 are applied to a mobile number register 107 which functions to store the numerical designation originating at a unit station. Mobile register 107 may comprise conventional stepping relays which provide a capacity for storing a multiple digit number. Electrical connections to the stepping relays in conventional fashion may provide the stored numerical designation on parallel output leads. For convenience of illustration the mobile number register 107 is shown having an output designated 108. The output 108 may comprise as many separate electrical connections as are required for the parallel transfer of the stored information from the mobile register 107.

Figure 5:
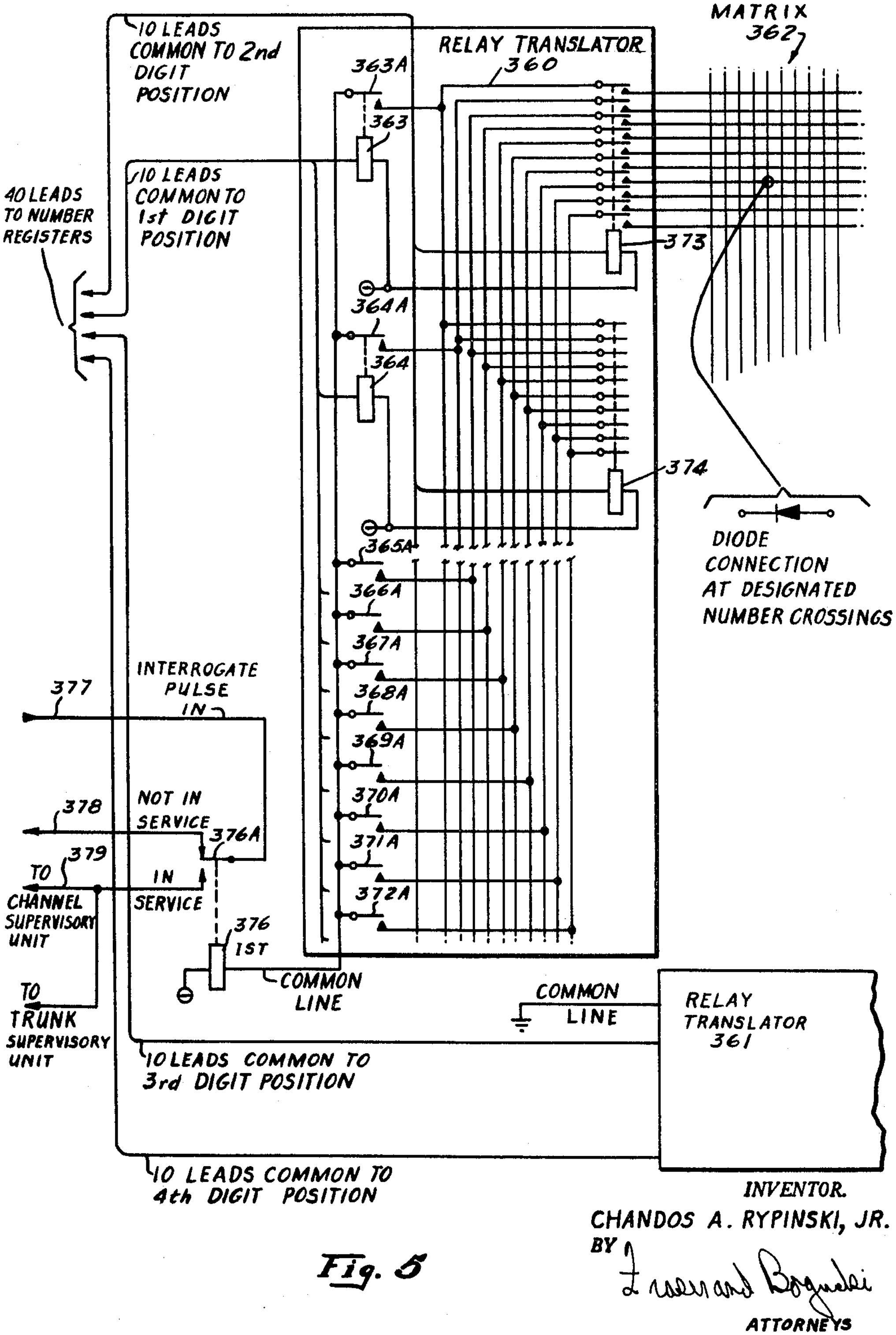
FIG. 5 is a block and schematic circuit diagram of equipment for effecting an in-service number test for use in conjunction with the central office terminal equipment of FIG. 3.
Figure 6:
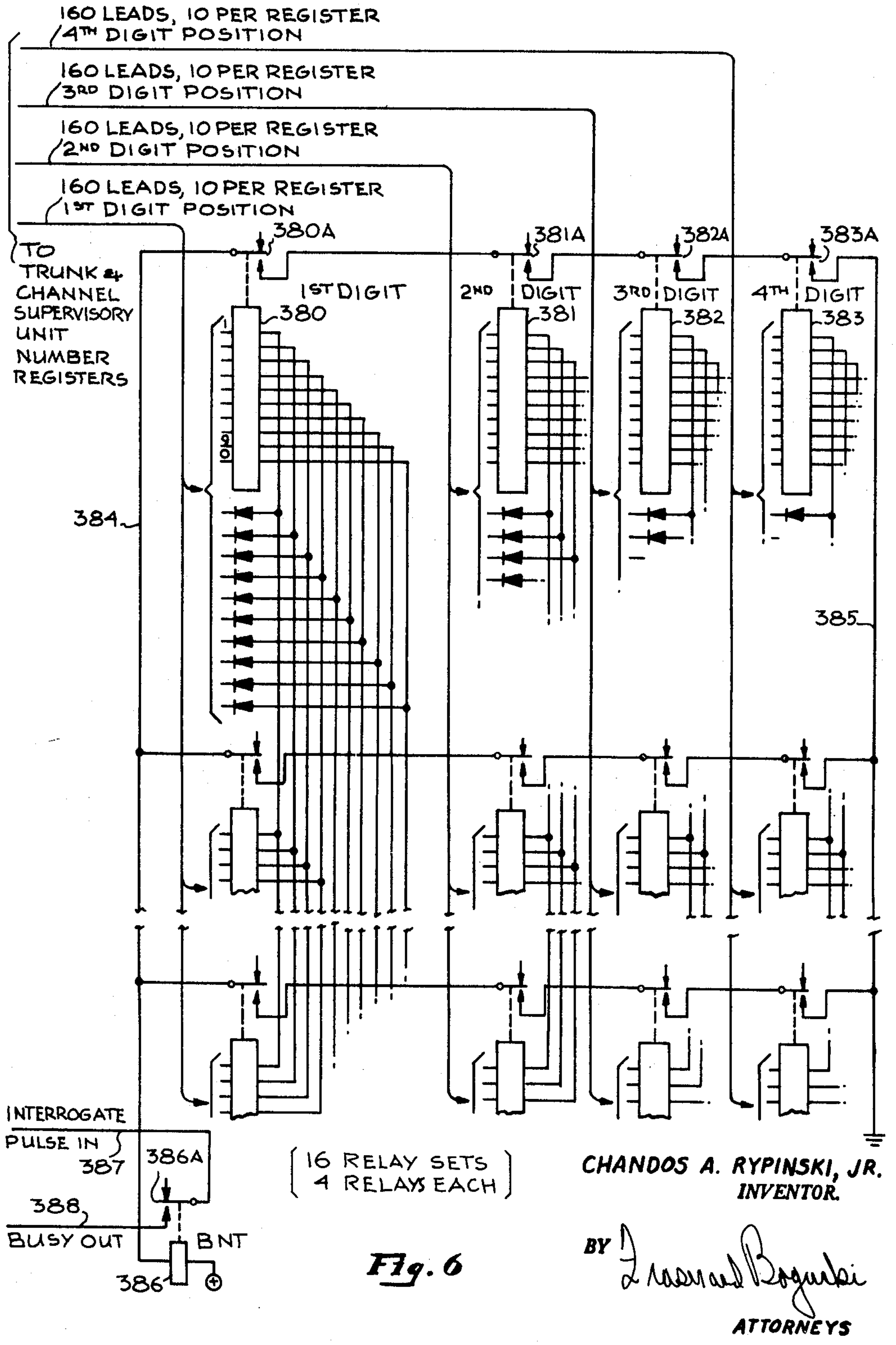
FIG. 6 is a block and schematic circuit diagram of apparatus for effecting a busy number test for use in conjunction with the central office terminal equipment of FIG. 3.

The mobile number register 107 is also adapted to provide a momentary ground condition on a lead 109 whenever the mobile number register 107 has received a complete numerical indication and is therefore full. As will be described in detail below, the mobile number register 107 stores the unit identification of a unit station. The stored information appearing on the output 108 along with the momentary ground appearing on the lead 109 may be applied to the busy number and in-service test units to be described below and which are illustrated in FIGS. 6 and 5, respectively. The mobile number register 107 may also be reset by the absence of a ground condition upon the lead 110. In operation, as described below, the mobile number register 107 is reset immediately prior to receipt of a unit identification as well as upon the failure of the guard tone, F3, as sensed by the tone-to-D.C. translator 102.

In addition to the audio signals appearing on the leads 100 and 101, the apparatus of FIG. 3B receives a signal on a lead 111 whenever a carrier wave from the unit station is present at the base station receiver. The signal on the lead 111 causes a timer 112 to be reset. The function of the timer 112 is to terminate the communication link, by simulation of the unit station on-hook condition, between the base terminal and a unit station whenever a unit station carrier disappears for a predetermined length of time. This condition might arise when the unit station travels out of range of the base station, for example.

In addition to the above-described structure shown in FIG. 3B, a total of seven relays appear, the function of each of which is as follows:

A mobile hook switch relay (MHK) 113 is connected in a latching circuit which is actuated in response to a momentary ground condition appearing on the lead 105 from the tone-to-D.C. translator 102.

Contacts 113A break ground to tone relay (TO) 153, interrupting marking or signalling tone transmission to the mobile when the mobile goes off-hook.

Contacts 113B furnish ground enabling the code sender to run when the mobile is on-hook or furnish ground to an E-lead inhibit relay (EI) 156 when the mobile is off-hook.

Contacts 113C determine whether release of the mark latch holding circuit is under the control of the mobile hook switch or the wire connected party hook switch through the trunk to the central office terminal and the cross-bar switch. When the call originates on the wire side of the terminal, release of the holding circuit is accomplished when the calling party hangs up until the called mobile answers. After the mobile has answered, release of the holding circuit is always under the control of the mobile regardless of which side hangs up first.

Contacts 113D furnish the holding circuit for the relay 113 coil.

Contacts 113E furnish ground to the holding circuit of the contacts and coil of register control relay (RC) 116 and release the holding circuit when the mobile goes on-hook.

Contacts 113F enable operation of the timer 112 only after an off-hook signal has been received from the unit station.

Hook switch release relay (HKR) 114. This relay is energized by the momentary ground condition appearing on the lead 106 corresponding to a unit station going on-hook as sensed by the tone-to-D.C. translator 102. In addition, this relay is responsive to an output signal from the timer 112 which appears as noted above at a predetermined interval after a failure of the unit station carrier at the base station receiver. The HKR relay 114 functions to release the mobile hook switch relay (MHK) 113.

Contacts 114A cause release of the holding circuit of the MHK relay 113 when the mobile goes on-hook from momentary operation.

Number test gate relay (NGC) 115. This relay is actuated in response to the momentary ground signal appearing on the lead 109 from mobile register 107.

Contacts 115A inhibit operation of the register control relay (RC) except when the mobile number register 107 is full and is interrogating the number test circuits.

Contacts 115B operate in conjunction with the contacts 116E to provide a momentary pulse for the trunk demand circuits, the beginning of which is determined by closure of the register control relay (RC) 116 and the end of which is determined by the release of the NGC relay 115.

Register control relay (RC) 116. The register control relay is energized by the appearance of a momentary ground condition on the lead 117 from the in-service test unit described below and illustrated in FIG. 5. The RC relay 116 latches in an energized condition and is released in response to an on-hook signal from the unit station.

Contacts 116A cause the output pulses of the tone-to-D.C. translator 102 to be routed to the mobile number register 107 until the number stored therein has been found to be in service. A return signal from the in-service number test unit operates the RC relay 116 after which further output pulsing is applied to the coil of pulsing relay (P) 118.

Contacts 116B direct reset of the mobile number register from guard tone drop out until the unit station identification is complete and then from unit station on-hook as obtained from the release of the RC relay 116.

Contacts 116C enable the dialing guard dropout relay (DGD) 120 to be energized from the presence of guard tone after identification has been completed.

Contacts 116D are in a holding circuit for the RC relay 116.

Contacts 116E operate with the contacts 115B as previously described to form a momentary trunk demand pulse.

Pulsing relay (P) 118. This relay repeats the numerical pulse designations appearing on the lead 103 from the tone-to-DC translator 102 after the register control relay (RC) 116 is energized.

Contacts 118A cause momentary breaks in the signaling lead in accordance with dial pulsing from the unit station.

Contacts 118B repeat pulsing into the dialing present relay (DP) 119.

Dialing present relay (DP) 119. This relay is a slow-to-release relay which does not follow the individual pulses appearing on the lead 103 from unit station dialing but is closed continuously in the presence of a train of pulses.

Contacts 119A operate in cooperation with the contacts 120A so that a ground condition simulating mobile on-hook appears at the hook switch release relay (HKR) 114 when guard tone drops out during mobile dialing.

Dialing guard dropout relay (DGD) 120. This relay is energized by the guard tone signal from the tone-to-D.C. translator 102 via the contacts 116C which are closed during dialing by the unit station.

Contacts 120A operate in cooperation with the contacts 119A as described above.

The portion of the channel supervisory unit shown in FIG. 3A functions to control outgoing communications between the base station and the unit station. The structure includes a code sender 130 which receives a numerical designation via groups of leads 131 connected through the crossbar switch and 132 multiple connected through common buses. The code sender 130 functions to provide on a lead 133 dialing pulses which are in turn applied to a 600/1500 c.p.s. tone source 134. The code sender 130 repeats the dial pulsing so long as a lead 135 is in ground condition and continues to completion of a code upon interruption of ground on the lead 135. Furthermore, after every third transmission of a complete code by the code sender 130, ground is momentarily lifted from the lead 136 and during the last digit of each code the lead 137 is grounded. The tone source 134 responds to the dial impulses on the lead 133 to provide an output modulated with one tone frequency transition per signal pulse on the leads 138 and 139 corresponding to the numerical designation appearing on the lead 133 from the code sender 130. The signals from the tone source 134 are applied to a balancing network comprising a capacitor 140 and a resistor 141 such that tone is modulated on the base transmitter carrier but not returned to the calling party. The tone is transferred to a pair of audio output leads 142 and 143 via a transformer 144. The audio output leads 142 and 143 as well as the audio input leads 100 and 101 are combined in a conventional hybrid network 145 with the audio input leads being coupled thereto by a transformer 146. The hybrid network 145 is connected to the tip and ring leads 147 and 148 which function as talking connections between wire connected and radio connected subscribers.

The structure of FIG. 3A also includes a source of international radio-telegraph code signals 149 which in response to the appearance of a ground condition on a lead 150 functions to transmit in radio-telegraph code the identification of the base station. The source of code signals 149 is adapted to provide a ground condition on the lead 151 while transmitting the code designation.

The structure shown in FIG. 3A includes in addition to the above described elements a total of five relays, the function of each of which is described below:

Transmitter control relay (XC) 152. This relay turns the base transmitter carrier on and off and in addition provides an indication of the condition when the particular channel is busy or idle.

Contacts 152A provide ground on one of two leads when the channel is available and on the other when the transmitter is on.

Contacts 152B furnish ground to turn on the carrier of the base transmitter associated with the channel supervisory unit.

Tone relay (TO) 153. The tone relay 153 is controlled by the code sender 130 and functions to connect the leads 138, 139 to the balance network comprising the capacitor 140 and resistor 141 so as to transmit the tone appearing at the output of the tone source 134.

Contacts 153A and 153B connect the tone source 134 to the balance network providing control of the presence or absence of marking and signalling tone.

Contacts 153C and 153D connect a ring back generator source 121 to the hybrid network in such a fashion that the calling party has audible confirmation of unit station ringing.

Mark latch relay (ML) 154. This relay comprises a slow-to-release relay which is energized in response to the commencement of the idle marking of the channel and is released at the completion of a call. Moreover, upon release at the completion of a call, the mark latch relay (ML) 154 produces an appearance of ground on the lead 150 so as to initiate operation of the source of code signals 149 as described above. The mark latch relay 154 should have a slow-to-release characteristic of about 20 milliseconds to prevent release during transfer of ground from initiate to holding circuits.

Contacts 154A operates to furnish ground to the XC relay 152, turning on the base transmitter, and, upon release at completion of a call, furnish ground via lead 150 to start radio-telegraph code identification.

Contacts 154B interrupt ground to the tone relay (TO) 153 when the channel becomes inactive at the completion of a call.

Contacts 154C furnish holding ground to the crossbar switch in the connecting unit until the ML relay 154 is released at the completion of a call.

Contacts 154D are a holding circuit for the ML relay 154 after removal of the idle mark ground condition.

E-lead hook switch relay (EH) 155. This relay follows the condition of the E-lead of the trunk line and is responsive to an off-hook condition of a wire-connected subscriber appearing on the E-lead in the apparatus of FIG. 3A subsequent to the completion of correct dialing.

Contacts 155A enable the code sender 130 to run by the grounding of lead 135 so long as the calling party is off hook.

Contacts 155B are a portion of the holding circuit of the mark latch relay (ML) 154 and permit release of the ML relay 154 when the wire-connected calling party abandons the call before an answer or off-hook from the unit station party.

E-lead inhibit relay (EI) 156. This relay functions to inhibit holding of the mark latch relay (ML) 154 by the wire-connected party on the completion of a call leaving release under the control of the mobile hook switch relay (MHK) 113 (FIG. 3B). The EI relay 156 should have a slow-to-release characteristic of more than 50 milliseconds.

Contacts 156A are in series with the holding circuit of the mark latch relay (ML) 154 and permit release of the ML relay 154 by the mobile hook switch independently of the hook switch position of the wire-connected party.

A diode 122 is shown in series with the contacts 154D of the ML relay 154 to permit this relay to be controlled by its holding circuit while blocking the idle mark initiate signal from the step command lead.

TRUNK SUPERVISORY UNIT

As may be seen by referring to FIG. 1, the number of separate trunk supervisory units corresponds to the number of trunk lines entering the central office terminal equipment, which number also correspond to the number of communication channels. The structure of one particular trunk supervisory unit serving one trunk line is illustrated in that portion of FIG. 3 comprising FIGS. 3E and 3F.

The four trunk line leads comprise the M-lead 200, the T-lead 201, the R-lead 202 and the E-lead 203. The T and R leads 201 and 202, more commonly referred to as the tip and ring leads, respectively, function as the talking circuit while the M-lead 200 and E-lead 203 carry the supervisory and dialing signals. The M-lead carries supervisory signals with reference to the unit station and dialing from the unit station to a wire-connected subscriber while the E-lead 203 carries supervisory signals with reference to the wire-connected subscriber and dialing signals between the wire-connected subscriber and the unit station. It will be understood that the term "wire-connected subscriber" refers to any call coming from the wire side of the central office terminal, even though the caller may be another unit station (mobile) whose calling path has passed through a central office terminal to a central office trunk and is proceeding back toward another mobile.

As shown in FIG. 3F, the trunk supervisory unit includes a trunk incoming register 204 which functions to store the numerical designation of a called unit station where the call originates from a wire-connected subscriber. The register 204 may comprise a conventional group of stepping switches which is energized by a serial train of decimally coded pulses on the lead 205. By means of suitable connections to the stepping switches, a parallel group of output signals appearing on a total of four digit value leads 206 and ten number value leads 207 may be provided. In addition, the stored number value in the trunk incoming register 204 may be provided as output signals on a suitable group of leads 208 in parallel for application to the in-service and busy number test units described below in connection with FIGS. 5 and 6. Furthermore, the trunk incoming register 204 may be arranged to provide a momentary ground on the lead 209 when full for the purpose of requesting the busy and in-service number tests.

Also included in the trunk supervisory unit is a timer 210 (FIG. 3E), used in completing unit station originated calls, which controls the sensing by the trunk supervisory unit of the presence of a start dialing signal returned by the trunk line within a time interval of the order of fifteen seconds subsequent to the establishing of a connection between the trunk line and a channel.

The trunk supervisory unit includes a total of nine relays, the functions of which are as follows:

E-lead repeating relay (ER) 211. This relay is energized in response to an off-hook signal on the E-lead 203, and opens and closes in response to incoming dial pulsing from a wire-connected subscriber.

Contacts 211A provide holding ground for the busy relay (BYL) 219 and for the not-in-service relay (NCL) 221 when the ER relay 211 is sensing off-hook condition and through the back contact enables holding of the dial tone latch relay (DTL) 217 only when the trunk is returning on-hook condition.

Contacts 211B repeat ground on the signalling lead over the front contact and in cooperation with the contacts 212A via the back contact serve to convert pulsing consisting of momentary interruptions into pulsing consisting of momentary circuit completions for use in the trunk incoming register 204 and to start return of dial tone upon detection of the start dial signal from the trunk.

Contacts 211C furnish ground to the coil of the trunk busy latch relay (TBL) 212.

Trunk busy latch relay (TBL) 212. This relay is energized in response to off-hook signals and has a slow-to-release characteristic such that it remains closed during incoming dial pulsing.

Contacts 212A operate in cooperation with contacts 211B as described above.

Contacts 212B furnish ground for a reset command to the trunk incoming register 204 upon hang-up by the wire-connected party.

Contacts 212C furnish ground comprising one source of busy signal to the corresponding trunk busy relay (TB) in the channel/trunk connecting unit (FIG. 3D) when the wire-connected party is off-hook.

Contacts 212D break a path to the trunk busy (TB) relays from the connected crosspoint contacts of the crossbar switch 300 enabling the use of the crosspoint condition information.

Idle trunk termination relay (ITT) 213. This relay is actuated in response to the establishment of a connection between the radio channel and a trunk line via the crossbar switch and functions to disconnect the idle trunk termination in response thereto.

Contacts 213A furnish ground to the timer 210 upon actuation of the crossbar switch crosspoint contacts.

Contacts 213B and 213C provide correct termination for the trunk talking path when there is no termination by a channel supervisory unit through the crossbar switch 300 of the connecting unit.

Number test gate relay (NGT) 214. This relay is energized momentarily when the trunk incoming register 204 is full and closes contacts which enable the trunk supervisory unit to receive signal indications from the busy number and in-service test units.

Contacts 214A inhibit the operation of relay 221 except when the in-service number test is interrogated.

Contacts 214B inhibit the operation of busy relay (BYL) 219 except when busy number test is interrogated.

Contacts 214C inhibit the demand for connection to a radio channel except during interrogation of the in-service number and busy number test units.

M-lead repeating relay (MR) 215. This relay responds to hook switch information from the unit station subsequent to establishing a connection between the unit station and a trunk line and functions to connect either ground or resistance battery to the M-lead 200 so that hook switch information is extended forward over the trunk line.

Contacts 215A cause release of the dial tone latch relay (DTL) 217 on the first dial pulse originating from the unit station.

Contacts 215B furnish ground or resistance battery to the connecting trunk in accordance with pulsing or hook switch information received from the channel supervisory unit through the crossbar switch.

Timer relay (MT) 216. This relay responds to timing information appearing at the output of the timer 210.

Contacts 216A complete a path for the E-lead start dial signal to reach the dial tone latch relay (DTL) 217 during an interval immediately after actuation of the crossbar switch 300.

Dial tone latch relay (DTL) 217. When energized, this relay closes contacts which return dial tone to the unit station subscriber from a dial tone generator 218.

Contacts 217A and 217B complete the path from the dial tone generator 218 to the talking circuit going back to the unit station through the crossbar switch and the channel supervisory unit.

Contacts 217C establish a holding circuit for DTL relay 217.

Busy relay (BYL) 219. This relay when energized closes contacts which return a busy tone from a source 220 to the wire-connected subscriber.

Contacts 219A and 219B complete a path from the busy tone source 220 to the talking path of the wire-connected party.

Contacts 219C establish a holding circuit for BYL relay 219.

Not in service relay (NCL) 221. This relay is energized in response to a signal from the in-service test unit whenever the number called is not in service. The relay closes contacts which connect a recorded announcement from a source 222 so that the recorded announcement may be heard by the calling party.

Contacts 221A and 221B complete a path from the recorded announcement source 222 to the trunk circuit talking path when the relay 221 is energized.

Contacts 221C establish a holding circuit for NCL relay 221.

CHANNEL/TRUNK CONNECTING UNIT

As described above in connection with FIG. 1, the channel/trunk connecting unit functions to establish connections between the trunk lines and the radio communication channels. Accordingly, a single channel/trunk connecting unit shown in that portion of FIG. 3 comprising the sheets of drawings FIGS. 3C and 3D serves a number of channel supervisory units corresponding to a number of radio communication channels and a like number of trunk supervisory units. Therefore, even though FIG. 3 illustrates only a single trunk supervisory unit and a single channel supervisory unit connected to the channel/trunk connecting unit, it will be appreciated that the channel/trunk connecting unit may be arranged to serve any number of channel units and trunk units as required. However, in the exemplary system described herein the channel/trunk connecting unit is adapted to serve eight trunk lines and eight communication channels.

Figure 3C:
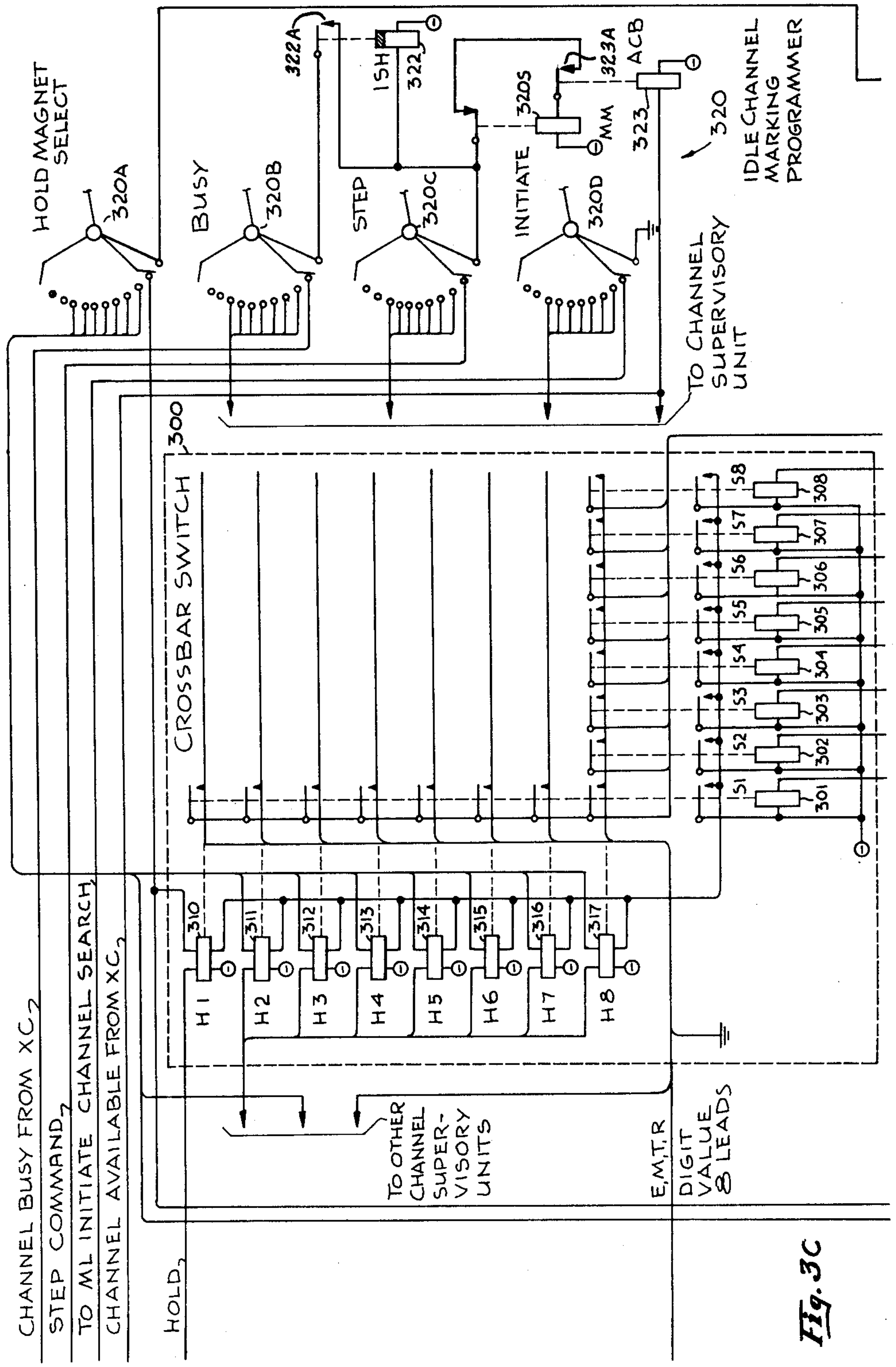

In general, the structure shown in FIG. 3C comprises a crossbar switch 300 which functions to establish the electrical connections between the communication channels and the trunk lines. The crossbar switch 300 has a capacity corresponding to the number of connections between channels and trunks for which the system is designed. In the example selected for purposes of illustration herein, the crossbar switch 300 is adapted to connect eight trunks with eight communication channels, each of the trunk-channel connections comprising eight electrical contact closures. An additional electrical contact closure is established when each channel is connected to a trunk for control purposes. The crossbar switch 300 includes eight select magnets 301–308 and eight hold magnets 310–317. On energization of a particular select magnet and the subsequent actuation of a hold magnet, the crosspoint connections are established between a trunk line and a communication channel within the crossbar switch.

FIG. 3C also includes an idle channel marking programmer 320 which may comprise a known type of rotary ten position switch of which eight positions are used and having four separate levels of contacts 320A, 320B, 320C and 320D. The idle channel marking programmer 320 functions to control the operation of the base terminal in placing a marking signal on the idle channel to be employed for the next successive communication. The idle channel marking programmer 320 is advanced from position to position by means of a motor magnet 320S. Like number contacts of each of the levels of contacts 320A, 320B, 320C and 320D are directed to individual channel supervisory units. Contacts 320A function in cooperation with the hold magnets 310–317 of the crossbar switch 300 to establish a connection within the crossbar switch on the particular channel which is marked idle. The switch contacts 320B provide an indication as to which of the channels are in use so that when the switch is stepping, it may not stop on other than a non-busy channel. The contacts 320C are responsive to a step command to transfer the marking signal from the particular channel upon which the idle marker programmer 320 rests. A set of contacts 320D controls the initiation of the idle marking signal on the channel upon which the rotary switch 320 is at rest.

The following relays operate in conjunction with the idle channel marking programmer 320 and have the functions indicated:

Idle search hold relay (ISH) 322. This relay is energized by a step command from the programmer 320 to search for an idle channel and is connected to respond to a busy channel condition to cause the idle channel marking programmer motor magnet 320S to continue stepping until an idle channel is reached.

Contacts 322A extend a ground condition to the motor magnet solenoid 320S when the particular channel contacted by the contact level 320B is busy.

All channels busy relay (ACB) 323. This relay responds to information from the transmitter control relay (XC) 152 of each of the channel supervisory units so as to interrupt channel search by the idle channel marking programmer 320 when all communication channels are in use.

Contacts 323A close the circuit path to the motor magnet solenoid 320S when the ACB relay 323 is energized.

Figure 3D:
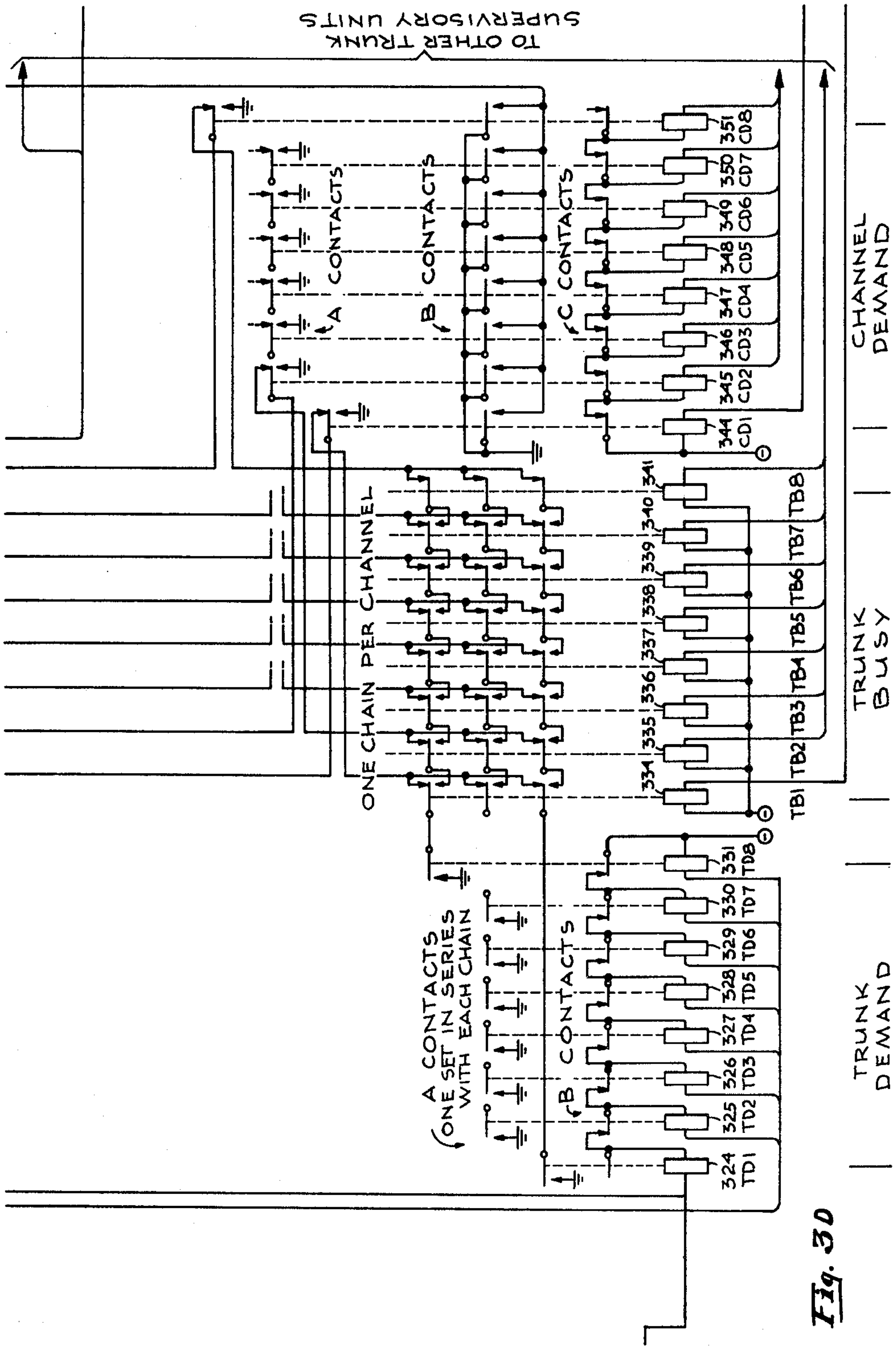
Figure 3E:
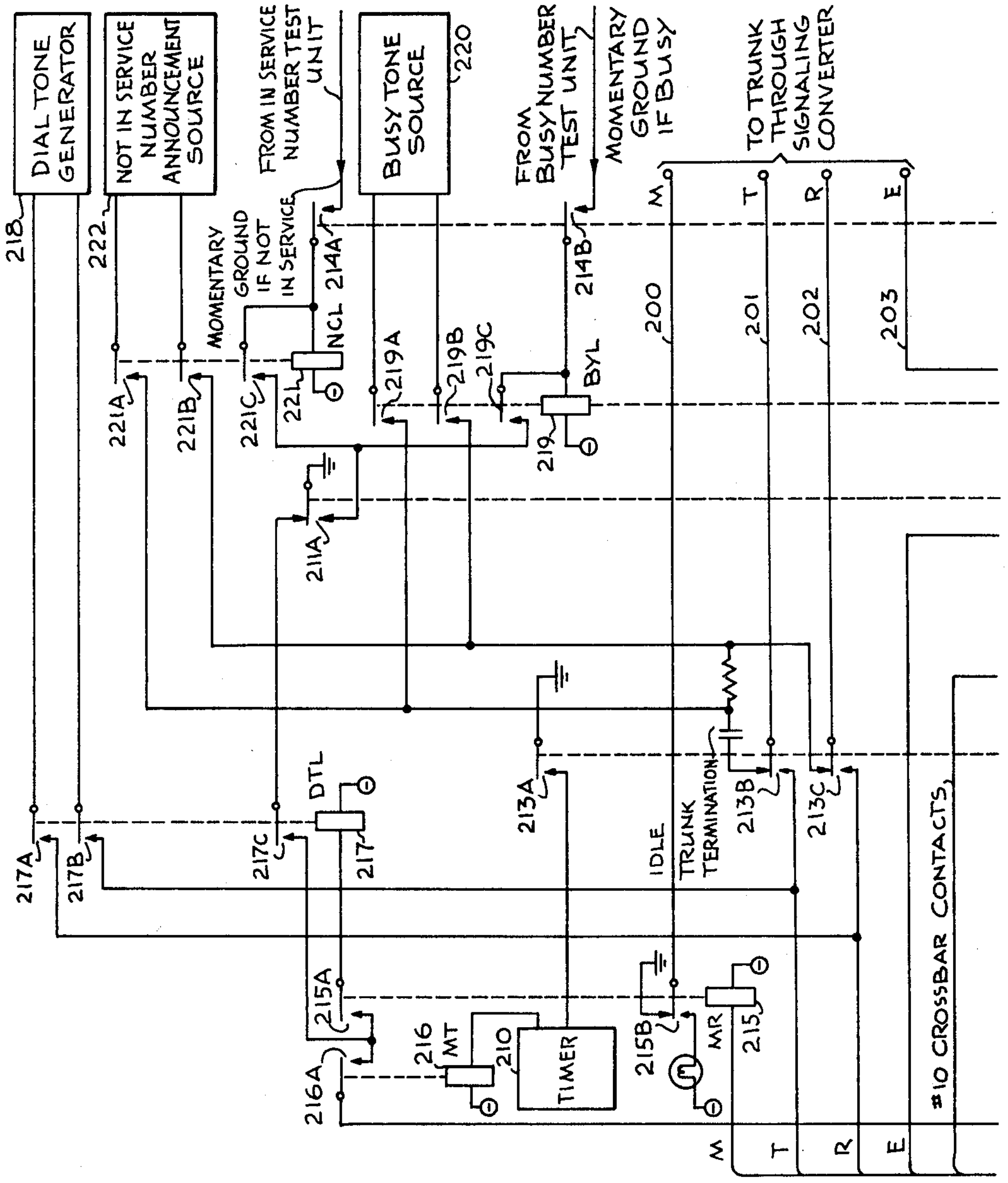
Figure 3F:
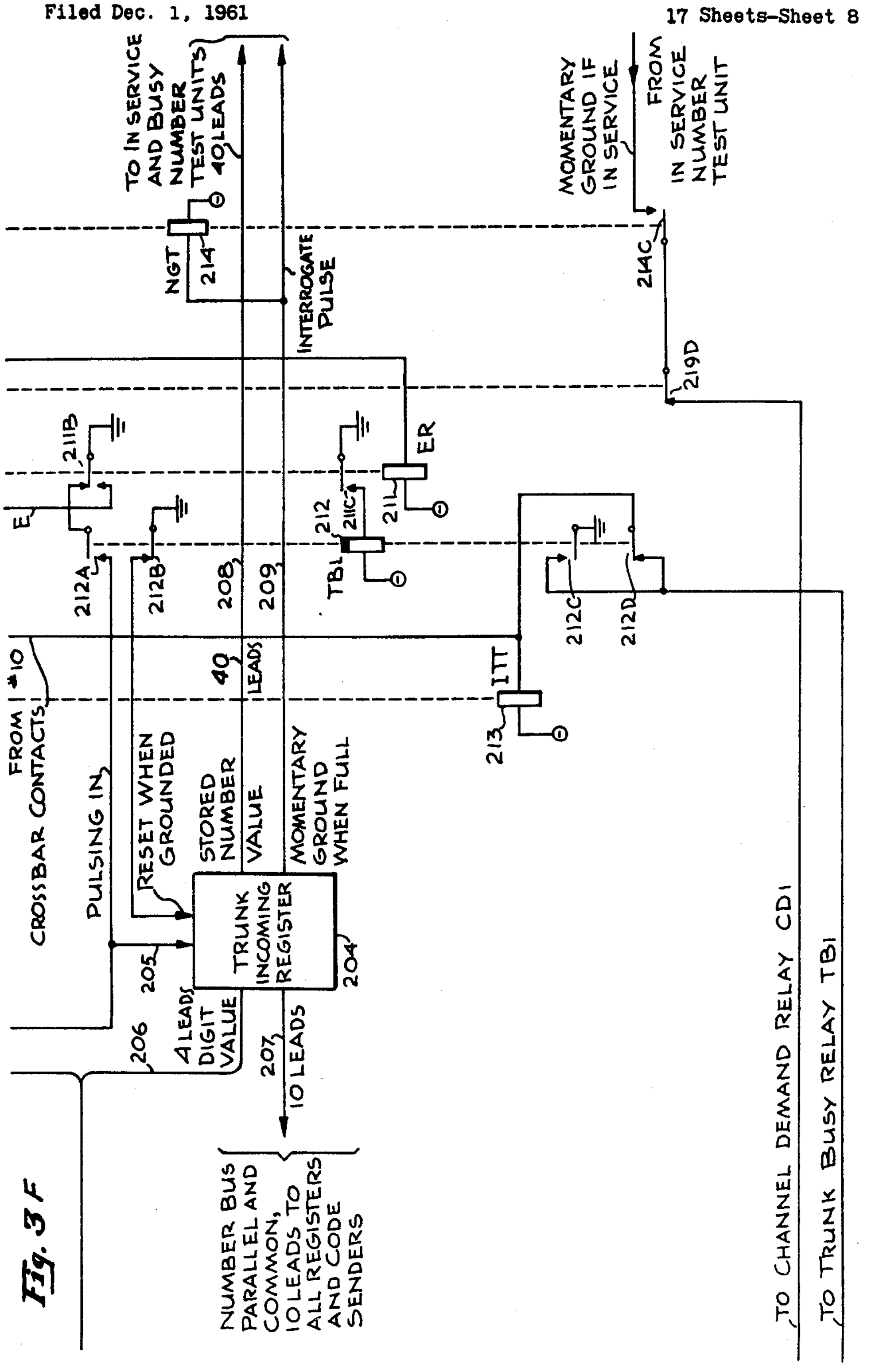

The apparatus of FIG. 3D comprises three sets of relays which are interconnected with the select and hold magnets of the crossbar switch 300 of FIG. 3C. The trunk demand relays 324–331 are individually connected to each of the channel supervisory units as shown, for example, with respect to channel No. 1, wherein the TD1 relay 324 is connected to the NGC relay contacts 115B (FIG. 3B). Each of the other trunk demand (TD) relays 325–331 is connected in a corresponding arrangement to each of the remaining channel supervisory units.

Each of the trunk demand relays 324–331 has two pairs of relay contacts, generally designated A and B contacts, respectively. As shown in FIG. 3D, the B contacts are arranged in a serial chain on the battery return lead of each relay coil in such a fashion that when a TD relay control lead is energized, one and only one TD relay may be operated. The A contacts are individually connected in chain circuits with the trunk busy (TB) relays as shown. In the case of two simultaneous demands from two channel supervisory units, the demand of the highest numbered channel will be executed, ignoring the lower numbered channel. For example, the TD8 relay 331 is given preference over the lower numbered relays. Thus, upon momentary trunk demand, one and only one of the A contacts of the TD relays 324–331 will close, placing a ground condition on the common lead of a trunk busy select designate contact chain.

The trunk busy (TB) relays 334–341 obtain information from each of the trunk supervisory units. An appropriate TB relay is energized when either its associated trunk circuit is off hook or the select row of the crossbar switch 300 corresponding to that trunk is in use. The select row busy information is obtained from the number 10 contact at each crosspoint in the following manner:

The tenth contact on each hold row of the crossbar switch 300 is grounded. In addition, each tenth contact on a select row is multiplied as are all other connections on the select row. When ground on the tenth lead is returned to its corresponding trunk supervisory unit it appears at the ITT relay 213 and the contacts 212D (FIG. 3F) where it is combined with off-hook information from the ER relay 211 controlling the TBL relay 212 to provide operate information for the trunk busy relays.

The trunk busy (TB) relays form one select designate contact chain per channel, the common lead of which goes to a corresponding A contact of a trunk demand (TD) relay. The select designate chain operates in a preferential fashion such that the ground is extended until it comes to the lowest numbered trunk busy (TB) relay that is not operated. This ground is then extended to the corresponding select magnet to complete the designation of a particular crosspoint which will be actuated from that particular trunk demand signal.

The channel demand (CD) relays 344–351 are used on calls originating from the wire-connected side of the terminal. The coils of each of the channel demand (CD) relays 344–351 are connected individually to the channel demand lead of the corresponding trunk supervisory unit. The battery side of the coils of the channel demand (CD) relays is connected to a serial chain of contacts on the C row such that upon demand one and only one of the channel demand relays may be operated, with preference going to the lowest numbered trunk circuit. The B contacts of the channel demand relays control ground on the A level of the idle channel marking programmer (320A) so that ground is present behind the operate coil of the idle hold magnet only when this idle channel is demanded by a trunk supervisory unit. The B contacts row of the channel demand relays 344–351 all being paralleled, any demand is capable of furnishing this ground.

Since a particular trunk is always associated with a particular select magnet from the crossbar switch 300 there is no need for the trunk busy relay chain on trunk originated calls when a channel demand pulse is received. Select row in use information is not important in this instance, since a select row is busy when the corresponding trunk is idle only at completion of a call during base station identification. The select magnet may be used again before release of the previous connection. The A set of contacts on the channel demand (CD) relays 344–351 transfer control of the select magnet directly to the demanding trunk and the choice of the corresponding hold magnet is accomplished by the A level of the idle channel marking programmer 320A.

IN-SERVICE NUMBER TEST UNIT

In FIG. 5 there is shown an in-service number test unit corresponding to the block 32 of FIG. 1. The in-service test unit of FIG. 5 is interconnected with the central office terminal equipment illustrated in FIG. 3. Specifically, the in-service test unit is connected to the mobile number registers in each of the channel supervisory units and to the trunk incoming number registers of each of the trunk supervisory units by 40 leads multiple connected to equivalent points on each number register. The function of the in-service test unit is to perform an operation in which it is determined whether or not a particular unit station is in service and permitted to initiate and receive communications. In general, the apparatus of FIG. 5 comprises two relay translators 360 and 361 which are connected to a matrix 362 which in the exemplary embodiment shown is arranged to have a capacity of 10000 four-digit numbers of which it is assumed that no more than 1000 will be employed. The relay translators 360 and 361 may comprise identical structures. The relay translator 360 serves the first two decimal digits of a number stored in the registers of the channel and trunk supervisory units and the relay translator 361 serves the last two digits of the number. The relay translators 360 and 361 may each include 20 relays connected in a relay tree. The relays of the translator 360 function to establish electrical connections to each of the horizontal wires of the matrix 362 so that each of the horizontal wires corresponds to a particular combination of the first two digits of the number. Accordingly, by providing electrical connections to 100 horizontal wires of the matrix 362 all possible combinations of the first two decimal digits may be accommodated.

In a similar fashion, the relay translator 361 includes 20 relays connected in a relay tree to establish connections to the vertical wires of the matrix 362 in all possible combinations of digital values of the last two digits of the stored numbers in the registers of the channel and trunk supervisory units.

A portion of a suitable relay tree is shown in the relay translator 360 in which a first relay 363 is energized by a digital value equal to one in the first digit position and a second relay 364 is energized in response to a digital value equal to two in the first digital position and so on. The relays 363 and 364 function when energized to close the sets of contacts 363A and 364A, respectively. In a similar fashion, the contacts 365A through 372A may be closed in accordance with the value of the digit in the first digital position. The connections from the number registers corresponding to the second digit of the stored number are applied to an additional group of 10 relays in the relay translator 360. As for example, when the digital value appearing in the second digital position is equal to one, the relay 373 is energized, when the digital value appearing in the second digital position is equal to two the relay 374 is energized, and so on, with a separate relay being actuated in response to each digital value appearing in the second digital position. Thus, the 20 relays within the relay translator 360 function to establish an electrical connection to the horizontal wires of the matrix 362 corresponding to all possible combinations of digital values in the first two digit positions of the registered numbers. In a similar fashion, the relay translator 361 establishes connections on the vertical wires of the matrix 362 corresponding to the digital values in the last two digit positions of the registered numbers. The result is that each crossing of a vertical wire with a horizontal wire in the matrix 362 corresponds to one four-digit number.

By connecting a horizontal wire and a vertical wire in the matrix 362 at a particular crossing, a given number may be identified as being in service. One suitable arrangement for accomplishing this result is to arrange the matrix 362 in the fashion of a plug board having ten thousand jacks into which plugs may be inserted to accomplish the connections. The plugs must include a diode for connecting the horizontal to the vertical wire to avoid interaction between the connections since many connections may be made in the matrix 362. It is apparent that where the number plan is known only a small portion of the available field need be installed.

The contacts 363A—372A corresponding to one digit value are joined on a common line to which there is connected serially an in-service test relay (IST) 376. In similar fashion, the corresponding contacts in the relay translator 361 are joined together on a common line which is grounded as shown.

In operation, the number registered in the trunk or channel supervisory units causes the relay translators 360 and 361 to establish electrical connections to the matrix 362. If the crossing point corresponding to the registered number is connected by a diode, a circuit path is established from the common line of the relay translator 360 through the matrix 362 to the comomn line of the relay translator 361. In the absence of an electrical connection at the particular crossing point of the matrix 362 corresponding to the registered number, no electrical connection is established. Therefore, the in-service test relay 376 is energized whenever the number stored in the register is indicated by an electrical connection at the corresponding crossing point of the matrix 362. An interrogate pulse may be applied to the in-service number test unit via a lead 377. At the same time, the interrogating register establishes a ground connection on the common leads associated with its number storage devices synchronously with the interrogate pulse. The interrogate pulse is returned by the relay contacts 376A of the in-service test relay on either the lead 378 or 379 depending upon whether or not the number is in service. When the number is not in service, the in-service test relay 376 is not energized and the pulse is returned over the lead 378. On the other hand, when the number is in service, the in-service test relay 376 is energized and the pulse is returned via lead 379. Where a diode is placed at a crossing of the matrix 362 for each in-service number, the signals appear on the leads 378 and 379 as indicated. Alternatively, diodes may be placed at the crossings corresponding to out-of-service numbers with the leads 378 and 379 being reversed. As described above in connection with the central office equipment of FIG. 3 and as will be set forth below in the description of operation, appearance of the in-service test number interrogating pulse determines at the central office whether a particular unit station is in good standing and is entitled to initiate or receive the calls.

BUSY NUMBER TEST UNIT

The busy number test unit is shown in FIG. 6 and corresponds to the block 31 in the central office equipment shown in FIG. 1. The structure of FIG. 6 is connected through 40 leads to each of the mobile number registers in each of the channel supervisory units and also to the trunk incoming registers in each of the trunk supervisory units. In over-all function, the busy number test unit determines whether or not a particular mobile unit station is engaged in a call, whenever a call originates on the wire-connected side of the base terminal.

In contrast to the in-service number test unit of FIG. 5 in which the parallel numerical information is derived from the registers over common connections, the busy number test unit of FIG. 6 requires an individual connection to the digit value points of each digit registering device in each of the trunk and channel supervisory unit registers. Accordingly, four groups of leads are shown entering the circuit of FIG. 6 from the registers with registration in each one of the registers being served by leads electrically separate from the other. The number of registers in the exemplary system equals sixteen, eight in the trunk supervisory units and eight in the channel supervisory units. Furthermore, to cover ten digital values in each of four digit positions 160 leads must be assigned to each digit position, making a total of 640 individual connections for transmitting the registrations of the registers separately and in parallel. The busy number test unit includes sixteen sets of four relays each, each relay including ten coils proportioned so that battery on any coil causes operation. Each set of four relays is assigned to a register in each of the trunk and channel supervisory units. One ten-coil relay corresponds to the digital position in each of the individual registers. Moreover, the incoming digital information with respect to digital value is applied to each of the separate windings of each ten-coil relay. For example, the ten-coil relay 380 in the first digital position may have one side of its ten windings individually connected to the digit value leads from one of the registers. The other sides of the windings share common connections with each of the other ten-coil relays in the first digital position. In a similar fashion, sixteen ten-coil relays serve the second digital position, sixteen ten-coil relays serve the third digital position, and sixteen ten-coil relays serve the fourth digital position.

A busy test in the unit of FIG. 6 takes place upon interrogation by a register which has just been filled. In interrogating the busy number test unit, the number in one of the sixteen registers is compared with the stored numbers in the other fifteen registers of the trunk and supervisory control units so as to determine whether or not a particular unit station is engaged in a call. With reference to the relay connections of FIG. 6, the appearance of a busy number is sensed by electrically connecting the interrogating register directly to the common bus connections without passing through coils of the relays of the busy number test unit associated with the interrogating register. This is accomplished by establishing a ground connection on the common leads of all registers except the interrogating register upon which the common lead of battery is applied. Thus, the direction of current flow associated with the interrogating register is reversed with respect to the remainder of the relays of the busy test unit so that the diode connected in parallel with each individual winding of each sensing relay functions to bypass the coils of the relays upon reverse current flow. By this means, the interrogating register establishes connections via the diodes which complete the circuit through the coils of each of the relays of the busy number test unit which are connected to points in the registers of like digital value.

The effect is that the sensing relays of FIG. 6 are energized where the register with which the sensing relay is associated is set to the same digital value as the interrogating register in the same digital position. For example, if any of the registers connected to the relay 380 is set to the value two while the interrogating register has the value of two in the first digital position, a circuit is established to close the contacts 380A. Assuming that the second, third and fourth digital positions also bear digital values in the same register corresponding to the interrogating register, the contacts 381A, 382A and 383A will be closed. The result is that an electrical connection is established between the leads 384 and 385 whenever the number in the interrogating register corresponds to the number in any other register.

The connection between the leads 384 and 385 causes the busy number test relay (BNT) 386 to be energized to close the contacts 386A. By applying an interrogating pulse synchronous with application of battery to the common lead of the interrogating register to the lead 387, the pulse is returned on the busy line 388 whenever the busy number test relay 386 is energized, thereby indicating that a number appears in one of the trunk or channel supervisory unit registers corresponding to the number in the interrogating register.

TONE-TO-D.C. TRANSLATOR

The combined block and schematic circuit diagram of FIG. 7 shows one suitable arrangement for performing the function of the tone to D.C. translator 102 in the channel supervisory unit shown in that portion of FIG. 3 comprising sheets of drawings 3A and 3B. The apparatus of FIG. 7 receives input signals on the audio leads from the base station radio transmitter via the leads 100 and 101 as shown in FIG. 3. Signals appearing on the leads 100, 101 are applied to an amplifier 401 having a high impedance input, i.e., greater than 15,000 ohms. The amplified signals from the amplifier 401 are applied to three separate narrow band filters 402, 403 and 404. Each of the filters 402–404 is tuned to a different frequency which in the case of the signals upon which the exemplary system operates are F1=1100 c.p.s., F2=1300 c.p.s. and F3=1700 c.p.s. Therefore, the F1 filter responds to the appearance of an 1100 cycle per second tone in the received signal, F2 filter 403 responds to 1300 cycle per second tone appearing in the received signal, and the F3 filter 404 responds to the appearance of a 1700 cycle per second tone in the received signal.

It will be remembered from the description given above, that the tones F1, F2 and F3 are transmitted by the mobile unit station in various combinations for the purpose of transmitting off-hook information, on-hook information, dialing and identification. The output signals from the filters 402, 403 and 404 are each rectified and applied to an integrating circuit. A diode 405 rectifies the output signal from the filter 402 to provide a voltage across the integrating circuit 406 whenever the F1 tone of 1100 cycles per second is present in the received signal. In a similar fashion, the diode 407 and the integrating circuit 408 provide a voltage corresponding to the presence of the F2 tone of 1300 cycles per second in the received signal. Similarly, a diode 409 and integrating circuit 410 produces a voltage in response to the presence of the F3 tone of 1700 cycles per second at the output of the filter 404. The voltages appearing across the integrating circuits 406, 408 and 410 are applied to Schmitt trigger circuits 411, 412 and 413, respectively. The threshold of each of the Schmitt trigger circuits 411–413 is set to provide a D.C. ouptput signal of fixed level in the presence of a voltage corersponding to the tones F1, F2 and F3 appearing across the integrating circuits 406, 408 and 410. The output signals from the Schmitt trigger circuits 411, 412 and 413 function individually to energize tone present relays. Thus, the output signal from the Schmitt trigger circuit 411 energizes a tone present relay (TF1) 414, the output signal from the Schmitt trigger circuit 412 energizes a tone present relay (TF2) 415 and the output signal from the Schmitt trigger circuit 413 energizes a tone present relay (TF3) 416.

By connecting the relay contacts of the tone present relays 414, 415 and 416 in various combinations, the presence of the tones F1, F2 and F3 may be converted to off-hook, on-hook, guard present, identification and dialing pulses as desired. In the presence of F1, F3 and not F2 the relays 414 and 416 are energized completing a circuit via contacts 414A, 415A, 416A to establish a ground condition on the off-hook lead 105. A diode 417 may be included in the off-hook lead 105 to reduce interaction between the circuits connected thereto. In a similar fashion, an on-hook condition is recognized by the presence of the tones F2 and F3 but not F1 by the connection of the on-hook lead 106 to ground via the contacts 414B, 415B and 416B.

The presence of F3, the guard tone, causes the relay 416 to be energized so as to close the contacts 416C, thereby connecting the guard tone present lead 104 to ground.

During pulsing by the mobile unit station for dialing or identification, the off-hook lead 105 carries the pulsing information in response to interruptions in the tone F1 while the guard tone F3 is on continuously. The contacts 414A open and close in response to the energization of the relay 414 as it follows the dial pulses. Dial pulses are applied to a dial pulse sensing relay (DPS) 418 as well as to a slow-to-release (DSR) relay 419 via a diode 420. The slow-to-release relay 419 may have a slow-to-release time of the order of 80 milliseconds in order to remain closed during the entire train of transmitted pulses. On appearance of the first dial pulse the relay 419 is energized to close the contacts 419A with the dial pulse sensing relay 418 opening and closing the contacts 418A with each dial pulse. Therefore, a ground condition corresponding to each dial pulse transmitted by the mobile unit station appears on the dial pulse lead 103. Therefore, in over-all operation, the tone-to-D.C. translator 102 of FIG. 7 functions in response to the combinations and interruptions of the transmitted tones F1, F2 and F3 to provide signals on the output leads corresponding to off-hook, on-hook, guard tone present, and dial and identification pulses.

OPERATION OF BASE STATION

A. *Unit station seizure*

It may be asumed that a particular unit station is at rest on the marked idle channel. After determining that the unit station is not in the busy condition, the unit station subscriber may take the hand set from the cradle, causing his transmitter to go on the air modulated with 1100 and 1700 cycle tone. These tones reach the tone-to-D.C. translator 102 producing ground on lead 105 and operating the MHK relay 113 which latches to ground through contacts 113D.

The operation of the MHK relay 113 causes the release of the TO relay 153 by contacts 113A. Transmission of audio tone on the channel is then interrupted by contacts 153A and 153B of the TO relay 153, causing all unit stations other than the seizing unit to search again for an idle channel.

It must be remembered that at this time the base transmitter is on the air, as indicated by the XC relay 152 being in the operated condition. The ML relay 154 which has been held energized by ground on the idle mark initiate lead from the idle channel marking programmer 320 now becomes latched over a ground path through the 154D contacts of the ML relay 154 and the 113C contacts of the MHK relay 113. The very same ground from the 113C contacts of the MHK relay 113 constitutes a step command to the idle channel marking programmer 320, causing it to step until the next channel is reached at which the transmitter is not then operating.

The unit station, being equipped with full duplex radio, is able to receive the signal transmitted by the base station simultaneously with the transmission of the off-hook supervisory tones. When the unit station detects termination of the idle mark tone transmission, this is interpreted as acknowledgement of seizure and command to identify. The unit station holds 1100 and 1700 c.p.s. tone on the transmitter except that now these are under the control of the identification circuits which cause off-pulsing of the 1100 c.p.s. tone in accordance with the identity of the unit station. Logic circuitry within the tone-to-D.C. translator 102 converts these momentary interruptions of 1100 c.p.s. tone in the presence of guard tone to momentary grounds on a separate dial pulsing lead 103. The pulsing is conveyed on lead 103 through contacts 116A to the unit station number register 107 where the identity of the unit station is sequentially stored in a suitable individual register. The unit station number register 107 becomes full upon completion of unit identification and then forms a momentary ground pulse on lead 109. Simultaneously a ground is applied to the common leads of the individual number registers. The same momentary ground on lead 109 also operates the NGC relay 115, closing contacts 115A and 115B and making the RC relay 116 responsive to the in-service number test.

As previously described some combination of four tree relays will be closed at the in-service number test unit 32 and assuming an acceptable identification, i.e. one marked by the presence of a diode interconnection at a crosspoint at the in-service number test plug board matrix, a ground from the common line of relay translator 361 will be extended through the relays and diode of the in-service test unit 32 to operate the IST relay, the contacts of which return the momentary ground on lead 117 causing operation of the RC relay 116. The RC relay latches in the operated position through contacts 116D and 113E of the MHK relay 113. The transfer of the unit station pulsing, which will appear on lead 103 from the number register 107, to the P relay 118 is accomplished by contacts 116A. The contacts 118A then become capable of extending mobile dial pulsing forward.

The duration of the momentary pulse appearing on lead 109 from the unit station number register 107 is designed to be of sufficient length that it is still present when the RC relay 116 operates. Therefore, the closure of the 116E contact in cooperation with the 115B contacts of the NGC relay 115 causes a pulse to be formed which is taken by the channel/trunk connecting unit 30 as a demand for connection to an idle trunk circuit. This demand causes closure of one only of the TD relays 324–331, setting up a ground which is extended to one of the select magnets of the crossbar switch 300, as determined in a fashion previously described, by the contact chains of the TB relays 334–341. Simultaneously, with the application of ground to one of the TD relays, the very same ground has been applied also to the operate lead of a hold magnet in the crossbar switch 300 corresponding to the channel supervisory unit which has just been seized. The off-normal contacts of all select magnets are in parallel as shown in FIG. 3C and provide battery behind the operate windings of all hold magnets. Since there is ground on the opposite end of the operate winding of only one of these hold magnets, this hold magnet is the one which is operated in response to the trunk demand. This use of the off-normal contacts of the crossbar switch 300 is employed to satisfy the required sequence of actuation well-known in the use of such switches. In this fashion a connection is established through the crossbar switch 300 between the talking and supervisory leads of the seized channel supervisory unit and an idle trunk supervisory unit.

B. *Unit station dialing*

When the connection is established through the crossbar switch 300, the unit station off-hook information is extended to the MR relay 215, the contacts of which cause an off-hook condition on the trunk M-lead 200. The trunk responds to this signal by returning a momentary off-hook signal on the E-lead 203. This pulse closes the ER relay 211 and through contacts 211B and 212A extends a ground pulse to the dial tone latch circuitry. As has been described above, establishing a circuit through an intersection in the crossbar switch causes a ground to be extended to the ITT relay 213 which transfers the talking circuit of the trunk appearing on leads 201 and 202 from an idle termination to the leads passing through the crossbar switch 300 to the channel supervisory unit. In addition, contact 213A of the ITT relay starts a timer 210 which runs for approximately 15 seconds, as previously described, operating the MT relay 216. This enables the extension of the start dial signal through contacts 216A and 215A to the coil of the DTL relay 217. This relay then becomes latched with ground furnished through contacts 211A, 217C and 215A. Contacts 217A and 217B then establish a path from the dial tone generator 218 to the talking circuit which becomes audible at the hand set of the unit station subscriber.

It should be appreciated that the operate time of the relays in this unit will not be greatly different from perhaps 10 milliseconds. It is, therefore, possible to complete the sequence of operations between completion of mobile identification and return of dial tone in a few tenths of a second. It is an object of the timer and dial tone circuitry to avoid the possibility of imitation of the start dial signal by hook switch manipulation of either party to a call after the connection has once been established.

Upon return of dial tone, the unit station subscriber will dial the desired number in known fashion, causing pulsed operation of the P relay 118, the contacts of which will cause pulsed interruptions on the M-lead extended through the crossbar switch to the MR relay 215, which in turn will cause ground pulses to be sent forward via the connecting telephone trunk circuit and release the DTL relay 217 by opening the holding circuit through contact 215A and thereby interrupting dial tone. The unit station subscriber will hear ring back from the completing office via the talking path.

C. *Unit station abandoned call*

It is possible that during the dailing cycle the unit station will wish to abandon the call, perhaps because of incorrect dialing. This will be accomplished by returning the hand set to the hand set cradle, operating the unit station hook switch and causing the unit station to transmit 1300 and 1700 c.p.s. tone for five seconds. When these tones reach the tone-to-D.C. translator 102, a ground will be made on lead 106 which will operate the HKR relay 114. The 114A contacts will release the holding circuit formed in cooperation with the 113D contacts, thus releasing the MHK relay 113. The holding circuit of the ML relay 154 which has been made through contacts 113C of the MHK relay will be released. This initiates a complete disconnect cycle for the terminal which will be more fully described under Unit station disconnect.

D. *Wire line party answers*

Answer of a call by the wire line party will result in ground on the E-lead 203 operating the ER relay 211. This in turn through contacts 211C will operate the TBL relay 212. Contacts 212C of the TBL relay will indicate to the channel/trunk connecting unit that this trunk is busy. Ground will be extended through contacts 211B and through the connection established in the crossbar switch 300 operating the EH relay 155. The answer of the wire line party is evident to the unit station when ringing is tripped and the called party answers.

E. *Unit station disconnect*

The release cycle of the central office terminal on a completed connection is always the same and is under the control of the unit station. The wire side party may disconnect the terminal only on an abandoned call. This sequence of operations, therefore, applies equally to the termination of a call originated by a wire line connected subscriber.

It must be assumed that either party may hang up first and the other afterwards or not at all, and each combination of circumstances is considered.

It is now assumed that the unit station subscriber hangs up first, releasing the MHK relay 113 as previously described. The 155B contacts of the EH relay would provide holding ground on the back contacts 113C were it not for the operated condition of the EI relay 156 holding contacts 156A in the open condition. Therefore, the release of the MHK relay 113 provides a sufficient break in holding ground to the ML relay 154, as measured by the release time of the EI relay 156 to effectively release the ML relay. If the wire connected party hangs up promptly, the EH relay is released and the EI relay function is not needed.

The 154A contacts then release transmitter control. The reconnection of marking tone to the transmitter by the 113A contacts of the MHK relay is inhibited by an open circuit from the 154B contacts of the ML relay. Contacts 154C of the ML relay release the hold winding of the hold magnet on the crossbar switch 300, releasing the connection between the channel and trunk units, and bring up the idle trunk termination with the ITT relay 213. The on-hook signal is returned to the trunk circuit by the release of the MR relay 215 which is accomplished, not only by the release of the crossbar connection, but as a result of the release of ground by the 113D contacts of the MHK relay 113.

It is then necessary, to satisfy legal requirements on automatic radio stations, to cause identification of the base radio transmitter in radio-telegraph code. This identification is generated by a suitable source 149 which obtains the command to start on lead 150 from ground through contacts 154A of the ML relay 154. One of the auxiliary functions of the code signal unit 149 is to provide a ground on lead 151 while it is running in order to hold the base radio transmitter on the air through the XC relay 152 and its contacts 152B. It is further provided that the channel be marked busy to prevent trunk seizure or an attempt at idle marking during this brief identification interval. It is only during this interval that the XC relay is operated and the ML relay is not. Busy information is therefore obtained from the contacts 152A for use by the idle channel marking programmer 320 so that the channel may not be seized until identification is complete.

It is possible that the unit station may not stay within communication range if it is installed on a vehicle. If no on-hook signal is received from the unit station, it is also probable that no carrier will be received. In this circumstance the out-of-range timer will operate and after a predetermined interval will simulate a unit station on-hook signal.

If the wire line party does not hang up, the release of the channel supervisory unit and the trunk channel connecting unit will not be affected. However, the trunk supervisory unit will be held busy until the wire line party does hang up or automatic trunk protection circuits in the connected central office function.

As has been previously described, provisions have been made to sense transmission failure between the unit station and the base station during either identification or dialing. When it has been sensed that signalling is aborted by guard tone drop out, the effect is to simulate mobile on-hook by releasing the MHK relay. This is the only circumstance where the unit station subscriber will be able to hear the base station transmit radio-telegraph identification.

The number stored in the register is also released at the completion of the call by the hook switch with which it is associated. More specifically, the unit station number register 107 is cleared by the release of the RC relay, and the trunk incoming register, by the release of the ER relay 211. In addition, the registers are held in a cleared condition by the reset logic until their next use.

F. *Trunk seizure and dialing*

It is assumed that the trunk circuit is of a type which will immediately start pulsing forward without the return of the start dial signal. Should a trunk of this type not be available it is a minor matter unrelated to the present invention to arrange the trunk incoming register 204 to provide a pulse of off-hook signal on the M-lead immediately after it receives ground from the contacts 212B on the TBL relay.

Seizure of the trunk by a wire-connected party will be indicated by off-hook condition on the E-lead 203 operating the ER relay 211 and the TBL relay 212 through contacts 211C. This will make the trunk busy immediately on seizure by a wire-connected party through the contacts 212C in a manner previously described. The busy indication will be maintained during incoming pulsing as a consequence of the slow release characteristic of TBL relay 212 which will not follow the incoming pulsing. It may be assumed that incoming pulsing will start very soon after seizure and will be detected by momentary releases of the ER relay 211 pulsing contacts 211B. Contacts 211B in cooperation with 212A convert the momentary interruptions present on the E-lead 203 to momentary grounds which may be better used by the trunk incoming register 204. These pulses have no effect on the dial tone circuitry to which they are also connected since the timer is not running and the MR relay 215 is not operated. When the trunk has completed pulsing, indicating the identity of the desired unit station, the trunk incoming register 204 becomes full and generates internally a momentary ground to interrogate the in-service number test unit 32 and the busy number test unit 31 and operate the NGT relay 214. Synchronously with the generation of the number test interrogation pulse, ground is removed and battery placed on the common leads of the registers associated with busy number test; and ground is placed on the common leads of number registers associated with in-service number test.

If the number stored in the trunk incoming register 204 is the same as that in any other register, ground will be returned through contacts 214B to the BYL relay 219 which then latches through contacts 219C and 211A. Busy tone is returned to the wire-connected party from the busy tone source 220 through contacts 219A and 219B to the T- and R-leads 201 and 202. Contacts 219D inhibit demand for connection to a channel.

If the number is found to be in service by the number test unit 32, in a fashion previously described, ground will be returned through contacts 214C and 219D to a channel demand relay in the channel trunk connecting unit. If the number is not in service, the ground pulse will appear through contacts 214A to the NCL relay 221 which will then latch throuhg its own contacts 221C via contacts 211A. Contacts 221A and 221B will establish a connection between a recorded announcement appropriate for a not-in-service number and the talking path to the calling party on the T- and R- leads 201 and 202. Both NCL relay 221 and BYL relay 219 are released by wire line on-hook condition releasing the ER relay 211 and its contacts 211A.

The interogation pulse appearing on lead 209 from the trunk incoming register 204 will be returned through the NGT relay, as described above, to cause operation of the associated channel demand relay of the group 344–351. The channel demand relays are each associated with a particular trunk so it is already known which select magnet must be operated. The A contact set of the operated channel demand relays causes a ground to appear on the corresponding select magnet and inhibits any backward transfer of ground through the chains of the trunk busy relays. The B contact row of the channel demand relays 344–351 furnishes ground upon the channel demand signal to the A level of the idle marking programmer 320.

The interrogate pulse of the trunk incoming register 204 is then repeated by one of the channel demand relays 344–351 to the corresponding select magnet, the off-normal contacts of which in turn pulse one side of all operate coils of the crossbar switch hold magnets. On the other side of the operating winding of the hold magnet, ground appears on the coil which is then designated as the marked idle channel by the A level (320A) of the programmer 320 by extension of ground through the common lead of the B level from the operated CD relay 344–351. The connection is established from the seized trunk supervisory unit in which a mobile identification number has been stored to the channel supervisory unit which is then idle.

G. *Unit station signalling*

When the selected crosspoint contacts of the crossbar switch 300 are closed, the ITT relay 213 transfers the T- and R-leads from the idle trunk termination to the crossbar switch 300 as described above. The E-lead off-hook condition is extended as a ground through contacts 211B and the crosspoint contacts of the crossbar switch 300 to the EH relay 155 which is then operated, closing contacts 155A which, through contacts 113B, initiate operation of the code sender 130. The idle channel marking programmer 320 is caused to search for a new channel by a ground established through contacts 155B of the EH relay 155, contacts 156A and the back contact of the set 113C. The same ground which initiated idle channel search by the programmer 320 also provides ground for the holding contact 154D of the ML relay. The diode 122 is wired in such fashion that ground may propagate from the 113C contacts to the holding contacts, but not in the reverse direction which otherwise would enable the idle mark initiate ground to cause the programmer 320 to search. It must be observed that the TO relay is already energized through contacts 113A and 154B.

The leads which have been extended to the channel supervisory unit include not only the two talking leads and the two supervisory leads but four digit value leads which, by their manner of connection to reference buses through the trunk incoming register 204, determine the numerical values to be transmitted by the code sender 130 which are to be identical with those stored in the trunk incoming register 204. The first outward pulse on lead 133 produces a shift from one frequency to the other in the tone source 134 which immediately makes busy all unit stations until they are released after the third code. The outgoing code continues repetitively so that the loss of a particular identification sequence due to temporary failure of propagation does not prevent reception of the call. After every third code group, the code sender 130 releases ground for a short interval on lead 136, interrupting tone transmission for an equivalent period of time. This interval is proportioned so that all mobiles will be released to search for a new idle channel except the unit station which has received the call, but not long enough to be interpreted as an abandoned call by the unit stations.

H. *Abandoned call*

If the unit station does not answer, the calling party will hang up which will release the ER relay 211 and, through previously described contacts, the EH relay 155. The ML relay 154 is released when contacts 155B interrupt the ground for the holding circuit thereof. When the ML relay is released, the crossbar switch 300 is released and the base transmitter is caused to identify itself as described above under Unit station disconnect.

I. *Unit station answer*

When the unit station goes off-hook the 1100 and 1700 c.p.s. tones are transmitted causing operation of the MHK relay 113. The tone is immediately interrupted when the TO relay 153 is released by contacts 113A. The interruption of the signalling tone causes the unit station to release its off-hook signal just as in the case upon seizure. The run signal on the lead 135 to the code sender 130 is interrupted by contacts 113B; however, it is so designed that it will always run to the end of the cycle, regardless of when the interruption occurs. The holding circuit for the ML relay 154 is now on the MHK relay 113 through the transfer of the 113C contact. The RC relay 116 is not operated on a wire-line originated call. Conversation may now proceed, since the connection between the calling party and the unit station has been established.

As was pointed out above, the disconnect cycle is the same for calls originating on either side of the terminal once the connection has been established.

THE UNIT STATION

The unit station supervisory control unit 34 operates in cooperation with the unit station radio receiver and transmitter 35 and control head 33 as shown in the block diagram of FIG. 2. The unit station radio receiver receives tone signals from the central office terminal via the base radio transmitter. The unit station supervisory control unit 34 originates other tone signals which are modulated upon the carrier wave of the unit station radio transmitter and used by the central office terminal. The nature and sequence of these signals are such as to satisfy the functional requirements of normal telephone operation from the control head 33 installed at the unit station. The control and response functions of the control head are interrelated with the supervisory control unit and are shown together in the block and schematic circuit diagram of FIG. 8.

Within the supervisory control unit 34 is the tone decoder/encoder unit 700 which is shown in detail in the schematic diagram of FIG. 10. The operation of the supervisory control unit 34 will be better understood if first the tone decoder/encoder unit 700 and its related functions are described.

A. *Tone decoder/encoder unit*

The tone decoder/encoder 700 has three basic functions. First, it decodes transitions between two tone frequencies into a pulse train which is made to operate a code selector responsive only to a particular numerical designation. Secondly, with a slight rearrangement of the decoder circuit elements, it is possible to cause the selector to pulse out the very same numerical identification as that to which it is responsive as a decoder. Thirdly, the provision of additional circuitry enables an output which is responsive only to the presence or absence of tone but not its frequency. A major function of the unit station supervisory control unit is to program and respond to the capabilities of the tone decoder/encoder unit.

As shown in FIG. 10 the tone decoder/encoder is composed of the following principal circuit groups whose function is briefly described.

The filters 701 and 702 are tuned respectively to 1500 and 600 c.p.s. and are of a bandwidth sufficient to pass high speed dial pulsing and yet narrow enough to reject a large proportion of noise and speech energy components which may appear within the audio band.

Polar detector 703 is made up of two transistors 703A and 703B arranged so that their common voltage point stands half way between the battery voltage on bus 722 and the ground bus 721.

A signal received from one filter but not the other will cause deflection of the voltage of the common output point 723 toward battery or ground in accord with which filter is furnishing a signal. Signal output from both filters, as in the event of a heavy random noise input, does not cause the voltage at 723 to change except in a random way.

A "signal" Schmitt trigger circuit 704 employs a well-known circuit with two conditions of stability depending upon whether the input signal is above or below a predetermined triggering level. The trigger circuit is biased in a first stable condition with the input transistor 724 normally conducting and the output transistor 725 cut off. The signal appearing at the output of the 1500 cycle tone filter 701 will cause the voltage at the point 723 to move toward the potential of the battery bus 722, causing the input transistor 724 of the Schmitt trigger 704 to shift into a second stable condition where the input transistor 724 is cut off and the output transistor 725 is conducting. Thus, the output transistor 725 which conducts when transistor 724 is cut off will be cut off when 600 cycle tone is present and conducting when 1500 cycle tone is present. The sharp transitions between conduction and non-conduction of transistor 725 are differentiated by capacitor 726, forming trigger pulses of both polarities for the monostable multivibrator circuit 708. Steering diodes 727 and 728 permit the differentiated pulses of one polarity to be applied to the base of the transistor 729 and of the other polarity to the transistor 730. In this manner trigger pulses of both polarities may trigger pulse generation by the multivibrator circuit 708. The monostable multivibrator circuit 708 furnishes a pulse of suitable duration to operate the selector 720 through a relay 711 and contacts 711C and D.

A "tone present" Schmitt trigger circuit 705 operates in identical fashion to the signal Schmitt trigger circuit 704 except that the polarities of the transistors 731 and 732 have been interchanged from PNP to NPN types causing the tone present Schmitt trigger 705 to conduct at the output transistor 732 from the presence of 600 c.p.s. tone rather than 1500 c.p.s. tone.

An inverter 706 changes the output reference of the tone present Schmitt trigger 705 from battery bus 722 to ground bus 721. An OR gate 719 observes the output of both trigger circuits and if either of the output transistors 725 or 732 is conducting so does the transistor 735.

Although the apparatus for the selector 720 is well known, the selector and its supplementary functions will be briefly described so that the operation of the whole tone decoder/encoder may be better understood. A more detailed disclosure of the transponding selector employed in the decoder/encoder may be found in co-pending patent application Ser. No. 82,750, of Clarence E. De Puy, filed January 16, 1961, and assigned to the assignee of this invention. A description of the selector believed adequate to an understanding of the present invention is set forth below.

The selector coils 713 and 712, designated "slow door magnet" and "fast door magnet" respectively, may be synchronously pulsed with a decimally coded serial pulse train including interdigit intervals. The mechanism associated with the fast door magnet 712 causes the advance of a ratcheted wheel. The ratcheted wheel bears holes situated around its periphery numbering perhaps 50 to 70 holes. The wheel is advanced against the moment of a suitable spring and may, by the mechanism contained therein, be reset to a home position upon sensing of the required conditions. Placed in the holes about the periphery of the code wheel are code pins inserted at hole count positions corresponding to values of a particular identification number to which it is desired that the selector be responsive. The slow door magnet 713 causes motion in a slow door mechanism which does not move during pulsing but remains closed until the appearance of an interdigit interval. The mechanism associated with the slow door, fast door, code pin and code wheel operates in a fashion such that when pulsing stops, the slow door is released and the code wheel is reset to home position if it is not then at a position where a code pin has been inserted. Thus, if the count is either over or under the specified value on any digit the reset of the code wheel will take place. The last code pin is different from those of the intervening specified digits because it is arranged to close an electrical circuit in cooperation with a contact mounted upon the slow door. The completion of a circuit from the slow door mounted contact pin to the selector contact pin indicates that the desired sequence of digits has been pulsed into the selector without under count or over count on any digit.

The slow door mounted electrical contact appears as 717 in FIG. 10. In addition, certain other contacts are incorporated on the selector 720 for purposes special to the application in the unit station supervisory control unit. These are the flag mounted contact 714 which is normally closed, but is opened when the code wheel is positioned at a count corresponding to the installed code pin and held open until the slow door releases. Thus, if the selector is exposed to a train of pulses these contacts will open when the number of pulses received corresponds to the position of the code pin. The contacts 716 are mounted on the slow door such that if the selector is off normal, i.e. not upon the home position, these contacts are closed.

Apart from the selector 720, the tone decoder/encoder 700 contains two relays whose function may be described as follows:

Identification latch relay (IDL) 710. This relay serves to transfer the combination of circuitry and selector from the decoder mode to the encoder mode of operation in a fashion to be described below.

Contacts 710A are used in cooperation with other external contacts to form a holding circuit for the IDL 710 relay via circuit paths shown in FIG. 8.

Contacts 710B transfer control of bias on the trigger circuit 704 to the flag contact 714 of the selector 720 during identification.

Contacts 710C transfer the input circuit of the signal Schmitt trigger circuit 704 from the output of the polar detector 703 to contacts 711A on the output pulsing relay 711 during identification.

Output pulsing relay (OP) 711. This relay is energized when the transistor 730 in the multivibrator circuit 708 is conducting for an interval determined by the time constant of a capacitor 737 and associated resistors.

Contacts 711A are used to convey output pulsing information to the signal Schmitt trigger circuit 704 input in the identification mode.

Contacts 711B are used externally to start and reset an external timer 604.

Contacts 711C are used to pulse the slow door magnet 713 of selector 720.

Contacts 711D are used to pulse the fast door magnet 712 of the selector 720. In addition, contacts 711D furnish a pulsing signal over a "pulsing out" lead to an external tone oscillator keying relay. A reset pulse may be received over the same pulsing out lead and applied to the fast door magnet 712 from an external reset pulse generating circuit to be described below.

The operation of the circuit elements together may now be described. Through intervening circuitry described above the OP relay 711 closes for a timed interval of approximately 25 milliseconds each time the tone signal shifts frequency between 600 and 1500 c.p.s. Pulsing of the OP relay 711 is analyzed by the selector 720 and if the incoming pulse code matches that which is preset in the selector, the contact pin 717 is connected to ground. While the selector 720 is pulsing or is in any other position than home, the off normal contacts 716 are closed. The selector 720 may be seset by a pulse which is applied to the fast door magnet 712 but not to the slow door magnet 713.

The collector circuit of transistor 735 in the OR gate 719 may be completed to battery externally through a suitable relay which will then operate whenever tone is present at either 600 or 1500 c.p.s.

In the encoder mode the unit may be made to pulse out its own identification number in the following fashion:

The IDL relay 710 is closed by externally generated momentary command from the terminal marked CL. The path to battery is through resistor 736 and the IDL relay 710 is latched in the energized condition through the contacts 710A via the circuit of FIG. 8.

The capacitors 738 and 739 in cooperation with resistors 740 and 741 operate to form an RC time constant network adjusted to yield the desired interpulse time interval in the encoder mode. The removal of a resistor 742 from the time constant network just mentioned by the opening of the contacts 710C enables the voltage at point 737 to rise to a level at which the transistor 724 of the Schmitt trigger 704 is cut off and the transistor 725 becomes conducting. At this transistion a trigger pulse is generated resulting in closure of relay OP 711 and contacts 711A for approximately 25 milliseconds. The closure of the contacts 711A causes the voltage at 737 to be clamped to ground until relay 711 releases. There is no further operation of the OP relay 711 until the RC networks controlling the voltage at 737 have had the opportunity to rise sufficiently close to battery voltage following the well known exponential charging characteristic of a capacitor to again trigger the 704 circuit. In this fashion the selector is pulsed consecutively with the time constant of the pulses being determined by the multivibrator 708 and the time interval between them by the RC network connected to point 737.

When the selector reaches a point at which a code pin has been placed, the flag contacts 714 open, releasing the charging circuit on point 737 and thereby interrupting pulsing. The pulsing remains interrupted until the slow door of the selector 720 releases, again closing flag contact 714 at which time pulsing resumes.

In this fashion pulsing continues, repeating the present code in the selector 720 with interdigit time spacings equal to an interval composed of the pulse duration from the multivibrator 708 added to the release time of the slow door magnet of the selector 720.

When the code wheel of the selector has advanced to the final pin, a connection is made between the slow door contact 717 and ground, short-circuiting the coil of the IDL relay 710. This circuit causes the release of the IDL relay 710 but does not short-circuit battery since the voltage is dropped across resistor 736. Release of the IDL relay 710 completes the identification cycle.

B. *Control head*

The telephone hand set employed is a common type for use in mobile telephony, modified to incorporate a press-to-talk switch at a location convenient for its operation. While it is presumed that the transmitter may be operated continuously during a telephone conversation and must in fact be capable of full duplex operation, yet it is desirable to have transmitter carrier under control of the unit station subscriber. The unit station transmitter, if installed in an automotive vehicle, would be a principal source of current drain on the battery power system of the vehicle. It is frequently desirable to minimize this drain by operating the transmitter only when necessary for communication. Accordingly, the control head is arranged so that the transmitter carrier may be put on the air by the unit station party or by automatic operation for the transmission of supervisory signals accomplished within the logic portion of the supervisory control unit.

Referring to FIG. 8, the rotary dial 506 is substantially identical to that found on telephone subsets in common use. The off-normal springs (contacts) 506A are normally open and are closed whenever the dial is moved from its home position. The dial pulse springs (contacts) 506B are normally closed and they open momentarily during the return of the dial to home position after it has been pulled off normal. The off-normal springs are used to turn on the transmitter and appropriate supervisory signalling tones. The pulse springs are used to interrupt signalling tone in a fashion suitable to convey the dialed number to the central office terminal.

The hook switch 513 is mechanically associated with the hand set cradle and is operated by placement and removal of the hand set from the cradle. The 513A and 513B contacts of the hook switch disconnect the microphone and earphone when the hand set is not in use.

The contact 513C inhibits push-to-talk operation while the hand set is in the cradle. Contacts 513D inhibit turn-on of the transmitter and supervisory signals by dial off-normal operation while the hand set is in the cradle. Contacts 513E provide ground off-hook and on-hook signals for use in the logic portions of the supervisory control unit.

The busy light 508 has associated with it a push-button 507 so that it is capable of illumination only when the pushbutton is down. It is commonly believed that the continued flashing of a light visible to the driver of an automotive vehicle is distracting and unsafe. By use of the pushbutton there is no flashing light except when the subscriber has need for the information it represents.

C. *Unit station supervisory control unit*

It is an object in the design of the control head and the supervisory control unit to minimize the number of wires required for interconnection between them, since they may be physically located at some distance from each other. A description of the operation of the unit station supervisory control unit may be better understood if the function of each relay and circuit group contained therein is first defined. The unit station supervisory control unit is shown in FIG. 8 and comprises four circuit groups, two of which are oscillators and two of which are timers.

Figure 8B:
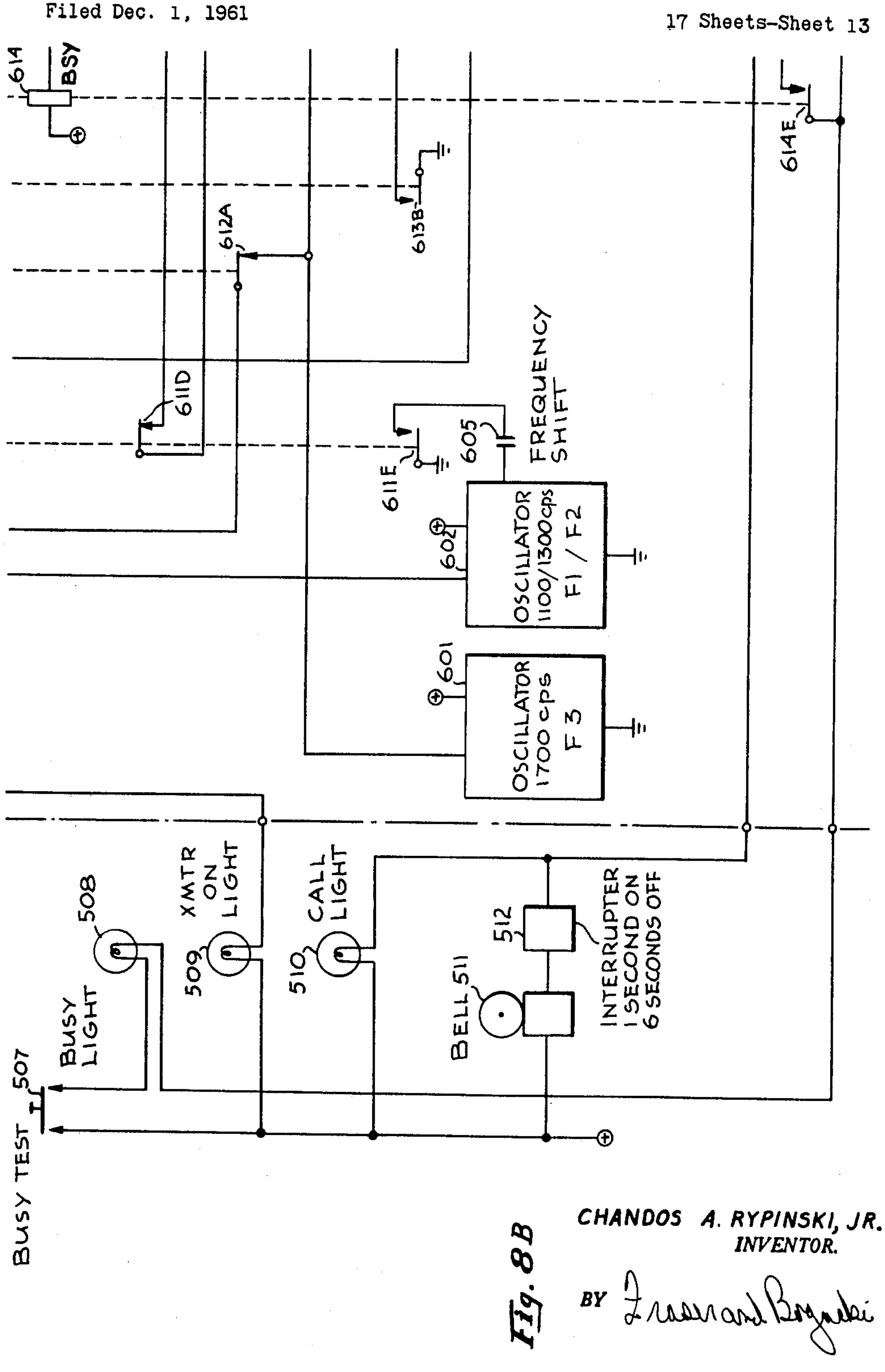
Figure 8C:
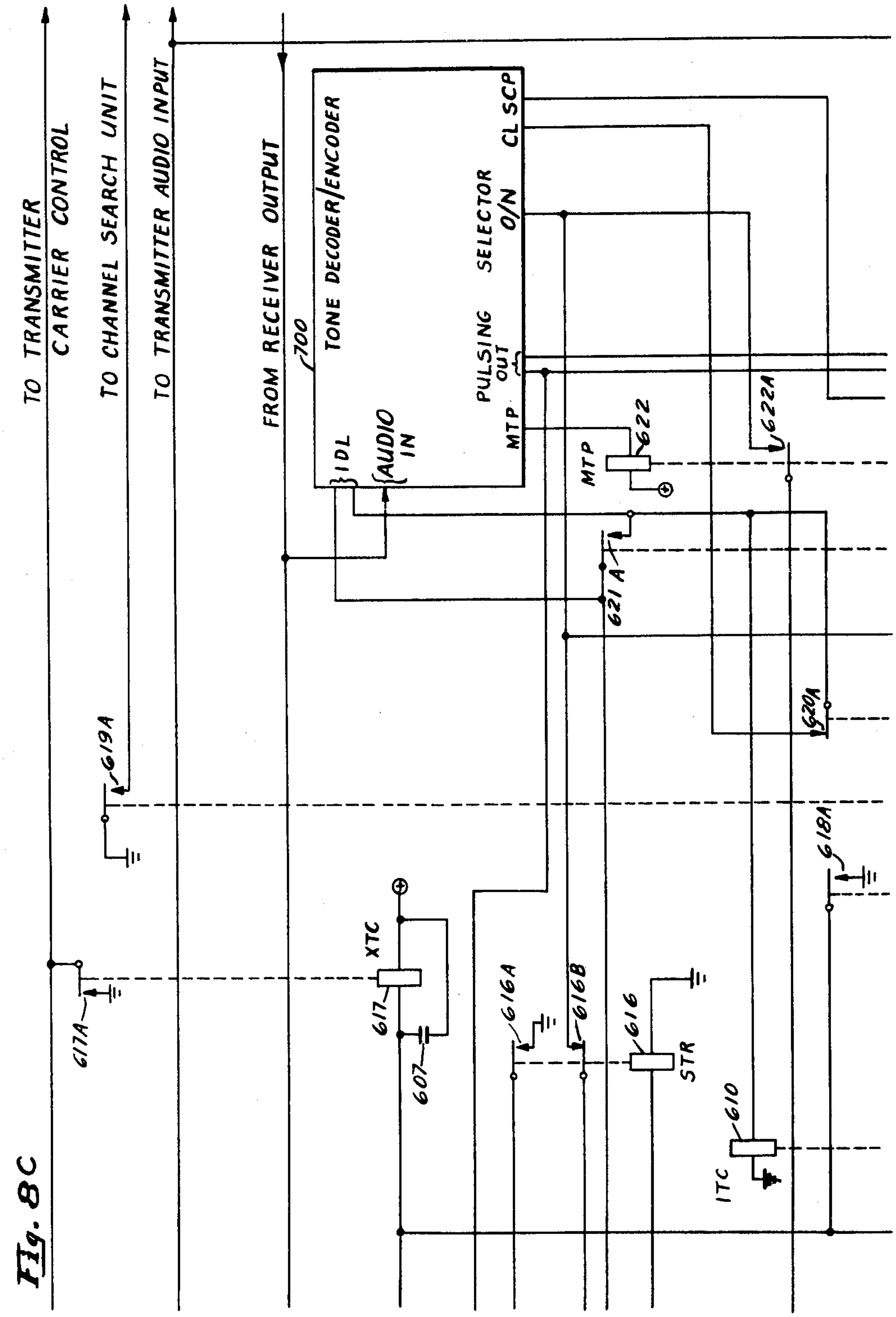
Figure 8D:
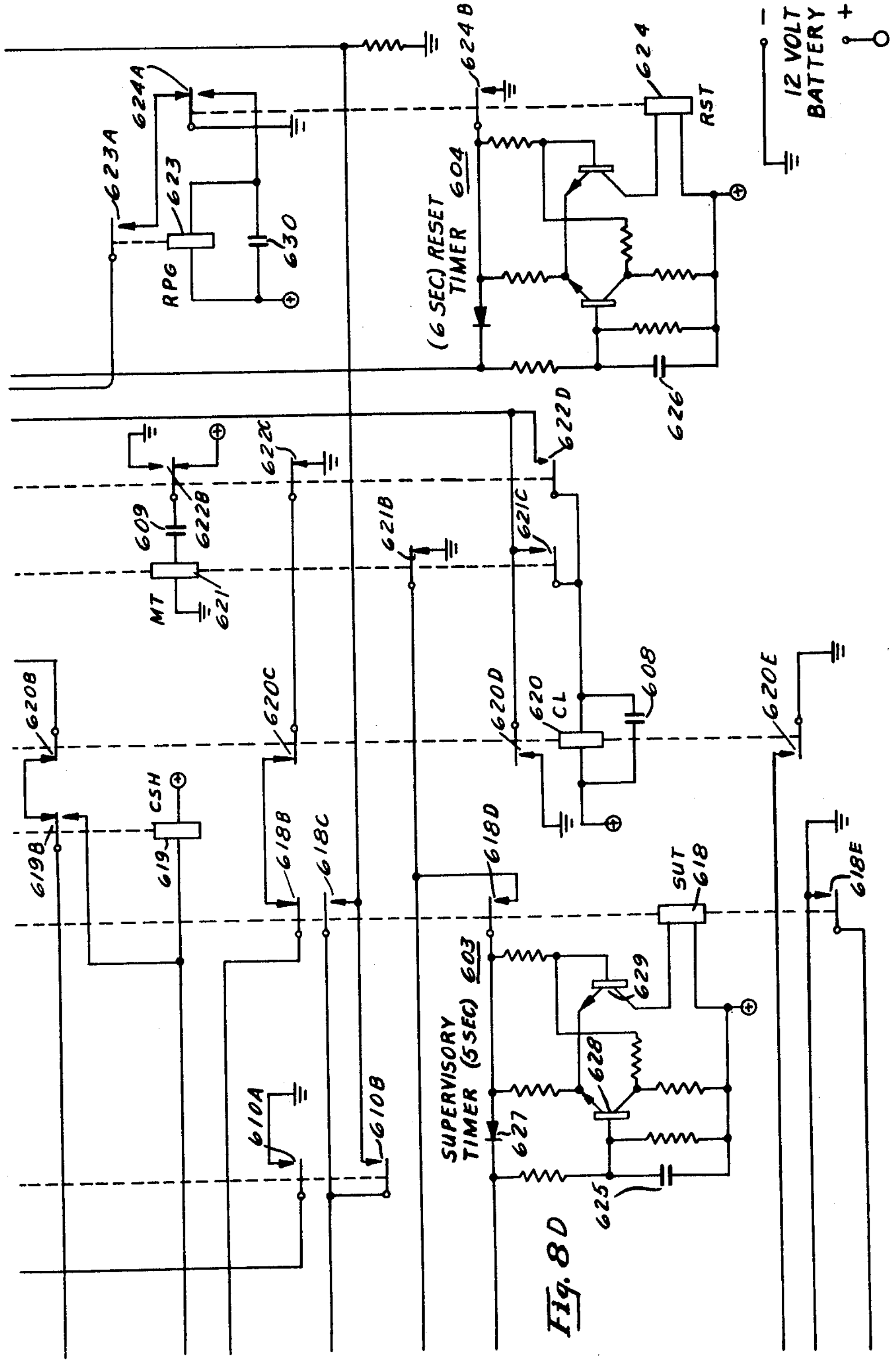

The oscillators are shown in FIG. 8B as blocks, since the circuits of audio oscillators are well known. One oscillator 601 operates continuously at 1700 c.p.s. and the other oscillator 602 operates at either 1100 or 1300 c.p.s. according to whether a capacitor 605 is or is not externally grounded. The oscillators operate continuously and are keyed on the audio output lead by relay contacts.

The timer circuits are likewise well known. The operation of the supervisory timer 603 will be described; however, it should be understood that the operation of the reset timer 604 is identical except for the difference in time interval setting.

Transistors 628 and 629 in cooperation with the coil of the SUT relay 618 form a Schmitt trigger circuit. The circuit is arranged so that the transistor 629 is normally cut off and no current flows through the coil of the SUT relay 618 except when the capacitor 625 is charged. When capacitor 625 has discharged to a certain predetermined value, the SUT relay is released. This circuit is suitable to perform a slow-to-release function whenever the time interval involved must be measured with some accuracy or is appreciably longer than one-tenth of a second.

The supervisory timer 603 is used to measure the maximum interval of time that the unit station transmitter will be held on and supervisory tones transmitted after the appearance of an initiating signal originating at the hook switch or at the dial off-normal contacts.

The reset timer 604 is used to measure an interval somewhat longer than the longest interdigital time that the unit station is likely to receive in a pulse code from the base station. This interval is employed to distinguish an interdigital interval from a cessation of pulsing for the purpose of resetting the selector 720.

In addition to the structure described above, the supervisory control unit contains fourteen relays the names and functions of which are as follows:

The identification tone control relay (ITC) 610 is used to establish an audio tone path from the tone oscillators 601, 602 to the transmitter audio input while the tone decoder/encoder 700 is performing an identification pulsing function.

The off-hook relay (HKF) 611 is used to close contacts associated with the off-hook function.

The on-hook relay (HKN) 613 is used to close contacts associated with the on-hook function.

The identification repeat relay (IDR) 612 repeats tone decorder/encoder pulsing to the keying contacts of the tone oscillator 602 output circuit.

The busy relay (BSY) 614 indicates the availability of the unit station for the origination of a call and inhibits any use of the unit station when it is not in a mode suitable for such use.

The supervisory trigger relay (STR) 616 is closed momentarily each time the hook switch operates and is used principally to initiate transmission of supervisory signals.

The transmitter control relay (XTC) 617 supplies ground to a transmitter carrier control lead via contacts 617A to turn on the unit station transmitter and energize the light 509 signifying this condition. The relay 617 is made slow-to-release by the capacitor 607 connected across it.

The supervisory timer relay (SUT) 618 is responsive to the output of the supervisory timer 603 and remains in a closed condition for an interval of about five seconds after release of the timer initiate signal.

The channel search control relay (CSH) 619 furnishes ground to an external channel search circuit when logically required to do so.

The call latch relay (CL) 620 is energized from the moment that it is known that a call for the particular unit station has been received until either the call is abandoned or the unit station subscriber answers. When the call latch relay is energized, visual and audible call signals in the control head are actuated.

The marking tone present relay (MTP) 622 is energized whenever a tone of either frequency is received from the base transmitter at the central office terminal.

The marking trigger relay (MT) 621 operates momentarily each time the MTP relay is energized or released. The interval of momentary operation of the MT relay must be longer than the interruptions in marking tone after every third identification.

The reset timer relay (RST) 624 is energized from the reset timer circuit 604 and is closed for a preset interval after the last pulse has been observed by the tone decoder/encoder unit. Its output is used to initiate the reset pulse to clear the selector and tone encoder and decoder upon completion of pulsing.

The reset pulse generator relay (RPG) 623 is made slow-to-release by capacitor 624 and generates a reset pulse equal in duration to its release time upon completion of the cycle of the reset timer 604.

With the operation of the tone decoder/encoder 700, control head 500, and the individual relays and circuits of the unit station supervisory control unit understood from the above description, the operation of the unit station supervisory control unit as a whole will now be considered.

OPERATION OF UNIT STATION

A. *Busy function*

A call may be placed on the unit station if it is not busy. The conditions under which it is busy are determined by the operation of the busy relay (BSY) 614. The unit is busy when it is searching for an idle channel and the BSY relay obtains ground in parallel with the coil of the channel search control relay (CSH) 619 through contact 619B or during incoming pulsing as indicated by the ground path made up from the selector off-normal (O/N) contacts through the contacts 620B of call latch relay (CL) 620. The BSY relay 614 is held by the contacts 614D until released by the 622A contacts of the marking tone present relay (MTP) 622. In this fashion the mobile is made busy from the receipt of the first signalling pulse from the base station and released by an incoming call or by a break in the marking tone.

The circuit made up of series contacts 611A, 614B and 616B is without effect while the hand set is on-hook. If, however, the hand set is taken off-hook while the BSY relay 614 is energized, the BSY relay will remain locked up through this contact chain and may not be released except by hang up. This circuit is necessary to prevent unit station subscribers from waiting off-hook for channel availability and thus creating an automatic opportunity for simultaneous seizure by two unit stations.

The contact 614A is employed to inhibit any operation of the unit station transmitter by the press-to-talk switch while busy. The 614C contact is used to inhibit any operation of the supervisory timer when busy. The 614E contact is employed to operate a busy light 508 in the unit station control head 500. If the mobile is not busy, as evidenced by absence of illumination of the busy light 508 when the busy test button 507 is depressed, a call may be initiated by taking the hand set 501 off the hand set cradle, operating associated hook switch 513 contacts in the control head.

B. *Seizure function*

The 513E hook switch contact provides ground to the off-hook relay (HKF) 611. The transfer of one side of capacitor 606 from battery through contact 613A of on-hook relay (HKN) 613 to ground through contact 611C of the HKF relay 611 causes a momentary closure of the supervisory trigger relay (STR) 616 while the capacitor discharges through the coil thereof. The momentary closure of contact 616A causes capacitor 625 in the supervisory timer 603 to become charged, energizing the supervisory timer relay (SUT) 618 until capacitor 625 discharges to a sufficiently low voltage to release the trigger circuit of the supervisory timer 603. Contacts 618C of the SUT relay 618, when closed, complete a path from both of the supervisory tone oscillators 601 and 602 to the transmitter audio input circuit. Contacts 618D complete a holding circuit providing ground to the supervisory timer while it is measuring out its preset interval. Contacts 611E are closed while the mobile is off-hook, causing the tone oscillator 602 to operate at the lower supervisory frequency (F1) of 1100 c.p.s. Supervisory tones of 1100 and 1700 c.p.s. are then transmitted to the base station as a seizure signal. Contacts 618A simultaneously hold the unit station transmitter on by energizing the XTC relay 617. When the base station acknowledges seizure, marking tone is interrupted. This interruption is detected in the tone decoder/encoder 700 and evidenced by the release of the marking tone present relay (MTP) 622. The transfer of one lead of capacitor 609 from ground to battery by contacts 622B causes current to flow for an interval of time in the coil of the marking trigger relay (MT) 621. Contacts 621B then open the holding circuit through contacts 618D, releasing the SUT relay 618 and its associated contacts. The contacts 621A of the MT relay when closed initiate identification of the unit station by providing the momentary pulse to operate the IDL relay in the tone decoder/encoder unit 700. This relay latches in a manner described above. The completion of the IDL latch provides battery to the identification tone control relay (ITC) 610. The contacts 610B are in parallel with the 618C contacts of the SUT relay and similarly complete an audio path for the supervisory tones to the unit station transmitter input. Likewise contacts 610A are in parallel with contacts 618A to hold the unit station radio transmitter operated. In a manner previously described, the tone decoder/encoder provides an identification pulsing output which is received as ground on the identification repeat relay (IDR) 612 whose contacts 612A cause off pulsing of the 1100 cycle tone in accordance with the identity of the particular unit station. Upon completion of identification, the IDL relay is released by establishment of the selector contact path and supervisory tone is interrupted by contact 610B of the ITC relay. If the identification is acceptable to the central office terminal, the subscriber will hear a dial tone and may proceed to dial the desired party. The interval of time between off-hook and return of dial tone may be about three or four seconds.

C. *Dialing*

When the rotary dial 506 in the control head 500 is pulled off normal, the contacts 506A close and ground is brought forward through the hook switch contacts 513D to the supervisory timer 603 causing operation of the SUT relay 618 with the result previously described. When the pulse springs 506B of the rotary dial 506 in the unit station control head open during the free return of the dial to normal position, the openings of the pulse springs produce corresponding interruptions of 1100 cycle tone as applied to the transmitter audio input circuit. If the interval between dialed digits is less than the interval of time determined by the capacitor 625 in the supervisory timer 603, as for example five seconds, both 1100 cycle and 1700 cycle tone will remain on continuously except for the dialed interruptions of the 1100 cycle tone. The continuing presence of the 1700 cycle guard tone during dialing facilitates the task of distinguishing between dropout of guard tone and interdigit interruptions at the central office terminal. Supervisory signalling tones will go off at an interval determined by supervisory timer 603 (approximately five seconds) after completion of the last dial pulse. This interval may slightly overlap the period in which the signalled central office equipment is making up the connection to the called party, but produces no interference with call completion.

D. *Disconnect*

On completion of the call the unit station subscriber will return the hand set 501 to the hand set cradle operating the associated contacts of the hook switch 513. The operation of the contacts 513E causes release of the HKF relay 611 and energizes the HKN relay 613. Again the transfer from ground to battery of the lead from capacitor 606 causes the temporary flow of current through the STR relay 616, momentarily operating it while capacitor 606 is charging. Closure of the 616A contacts of the STR relay starts the supervisory timer 603 as described above, operating the SUT relay 618 and causing the supervisory oscillators 601, 602 to be connected to the unit station transmitter input via the contacts 618C. The on-hook signal, however, is 1300 and 1700 cycles (F2 and F3 respectively), since capacitor 605 has been removed from the circuit of oscillator 602 by the contacts 611E of the HKF relay. This supervisory signal continues for five seconds. since any interruption of the holding circuit is inhibited by the 613B contact of the HKN relay.

E. *Unit station called*

A further understanding of the operation of the unit station supervisory unit may follow from tracing the sequence of operations on a wire-connected party originated call to the unit station. It may be assumed that the unit station is locked on the idle channel and is therefore not busy. When the first outward pulse appears on the marking tone from the base station, the selector will go off normal, causing the busy relay (BSY) to operate in a manner described above and preventing any effect from the mobile going off-hook during incoming pulsing. Should the mobile go off-hook during incoming pulsing, this will be without effect except that he may not originate a call until he returns his hand set to the hand set cradle to operate the hook switch 513. If the correct identification is received from the base station, the selector in the tone decoder/encoder will reach the code pin 717, putting out ground on the SCP lead. This ground is passed through the 622D contacts of the MTP relay to the CL relay 620. The CL relay becomes latched by its own contacts 620D in parallel with the selector code pin contact. Contacts 620E of the CL relay send ground forward to the control head 500, causing the call lamp 510 to become illuminated and the bell 511 in series with a suitable interrupter 512 to ring intermittently.

F. *Call abandoned*

Should the wire-connected party abandon the call, marking tone would go off and cause release of the contacts of the MTP relay immediately. The MT relay 621 is then operated briefly by the charging of the capacitor 609 as it is transferred between battery and ground by contacts 622B. A short interval (perhaps 200 milliseconds) after the release of the MTP relay 622 and the MT relay 621 upon the termination of marking tone, the CL relay 620 would be released.

G. *Call answered*

The unit station subscriber will lift his hand set from the cradle to answer the call, operating the previously described hook switch relays while the CL relay 620 is operated. In a manner previously described, the unit station is caused to transmit 1100 and 1700 cycles immediately upon removal of the hand set from the cradle on the control head. When this signal is received at the central office terminal from the base station, signalling tone will immediately be interrupted. This interruption is sensed by the release of the MTP relay 622. As described above, this releases the call latch holding circuit through contacts 620D and 622D. The momentary opening of contacts 621B of the MT relay in addition releases the holding circuit of the supervisory timer 603 and the SUT relay 618 which in turn interrupts the transmission of supervisory tone.

No other unit station will be able to answer the call. If the call latch relay 620 is not operated but the unit station is still on the signalling channel, it is also busy, thus making the off-hook operation ineffective. More commonly, mobiles other than the signalled mobile will not stay on the signalling channel very long, since they will be shifted to an idle channel as soon as marking tone is interrupted. When the unit station subscriber has answered, conversation may proceed with the wire-connected party. Call completion and supervision after hang up are identical in the unit station regardless of the direction of the call.

It is now helpful to examine certain auxilliary functions contained within the circuitry of the unit station supervisory control unit.

H. *Reset*

Since the unit station identification code reserves no particular combination for reset of the selector it is necessary that this function be accomplished by some logical means. It is a property of the selector 720 that a pulse applied to the fast door actuating magnet alone and not simultaneously with an equal pulse to the slow door magnet will cause reset of the selector to its home position. Advantage is taken of this property to reset the selector from circuitry composed of reset timer 604, reset timer relay (RST) 624 and reset pulse generator relay (RPG) 623, made slow-to-release by capacitor 630.

Operation of this circuit portion is as follows: Each pulse transmitted to the selector in the tone decoder/encoder 700 also charges capacitor 626 in the reset timer circuit 604, causing the RST relay 624 to be energized. The discharge time constant of capacitor 626, determined by the associated resistors, and the biasing of the reset timer trigger circuit are so arranged that an interval of time larger than an interdigital time in an automatically transmitted base station code is required for release of the RST relay 624. Thus after a pause in outward pulsing, the RST relay releases; this pause must be larger than the normal interdigit time. Contacts 624A energize the RPG relay 623 while the timer is operative and the RST relay 624 is operated. When the RST relay 624 releases, contacts 624A in cooperation with contacts 623A generate a momentary ground pulse of duration equal to the release time of the RPG relay 623. This pulse is conveyed to the fast door magnet of the selector 720 in the tone decoder/encoder unit 700, causing reset thereof. Contact 624B is used to furnish ground to the timer circuit 604 while time is running.

I. *Channel search*

Idle channel seeking is controlled by the channel search relay (CSH) 619, the contacts 619A of which furnish ground to cause operation of the external channel search rotary circuitry. Contacts 619B enable operation of the busy relay (BSY) while the channel search relay is energized and return control of the busy relay to the previously described busy control circuitry at the end of channel search.

The channel search operation is under the control of the unit station supervisory control unit operating in the following manner: The primary requirement is that the channel search be initiated when marking tone is absent and stopped when its presence is detected as indicated by the position of the MTP relay 622 via contacts 622C. Idle channel search however shall be inhibited under the following conditions: When the mobile is off-hook, which is accomplished on contacts 611D of the HKF relay; when the mobile has just received a call, which is accomplished on the 620C contacts of the CL relay 620; or when the mobile is transmitting a disconnect supervisory signal, which is accomplished on contacts 618B of the SUT relay 618.

Attention must now be given to a detail of the channel search control during signalling by the base station to the mobiles where after every third complete code signalling tone is interrupted for a short interval of perhaps 100 milliseconds. It is necessary that this interval be sensed by all mobiles which have not been addressed so that they may search for a new idle channel. However, the interval may not cause release of the CL relay 620 at the called mobile, yet the called mobile must be able to detect a longer interruption of signal tone for interpretation as an abandoned call and so release the CL relay 620 in that case. It may be seen that idle channel search is in process by virtue of the CSH relay holding path through contacts 622C whenever the quick acting MTP relay 622 is not energized unless the idle channel search is inhibited under one of the conditions described above. The CL relay 620 is controlled by the MTP relay contacts 622D paralleled by the 621C contacts of the MT relay. The 622D and 621C contacts cooperate to inhibit release of the CL relay 620 until signalling has been absent an interval of time appreciably longer than that required to cause uncalled unit stations to step from a seized channel and begin idle channel search, as determined by the slow release time of the MT relay 621 and capacitor 609 in combination.

CHANNEL SEARCH UNIT

As described generally in connection with FIG. 2, the unit station includes means for scanning the channels in search of a channel bearing an idle marking tone. One suitable method would be to employ a telephone type electro-mechanical stepping switch associated with a multiplicity of crystal oscillators in a radio transmitter and receiver for this purpose.

However, in accordance with another aspect of the present invention a channel searching unit may be provided which does not suffer from the wear, noise and current drain disadvantages of an electromechanical switch.

Figure 11:
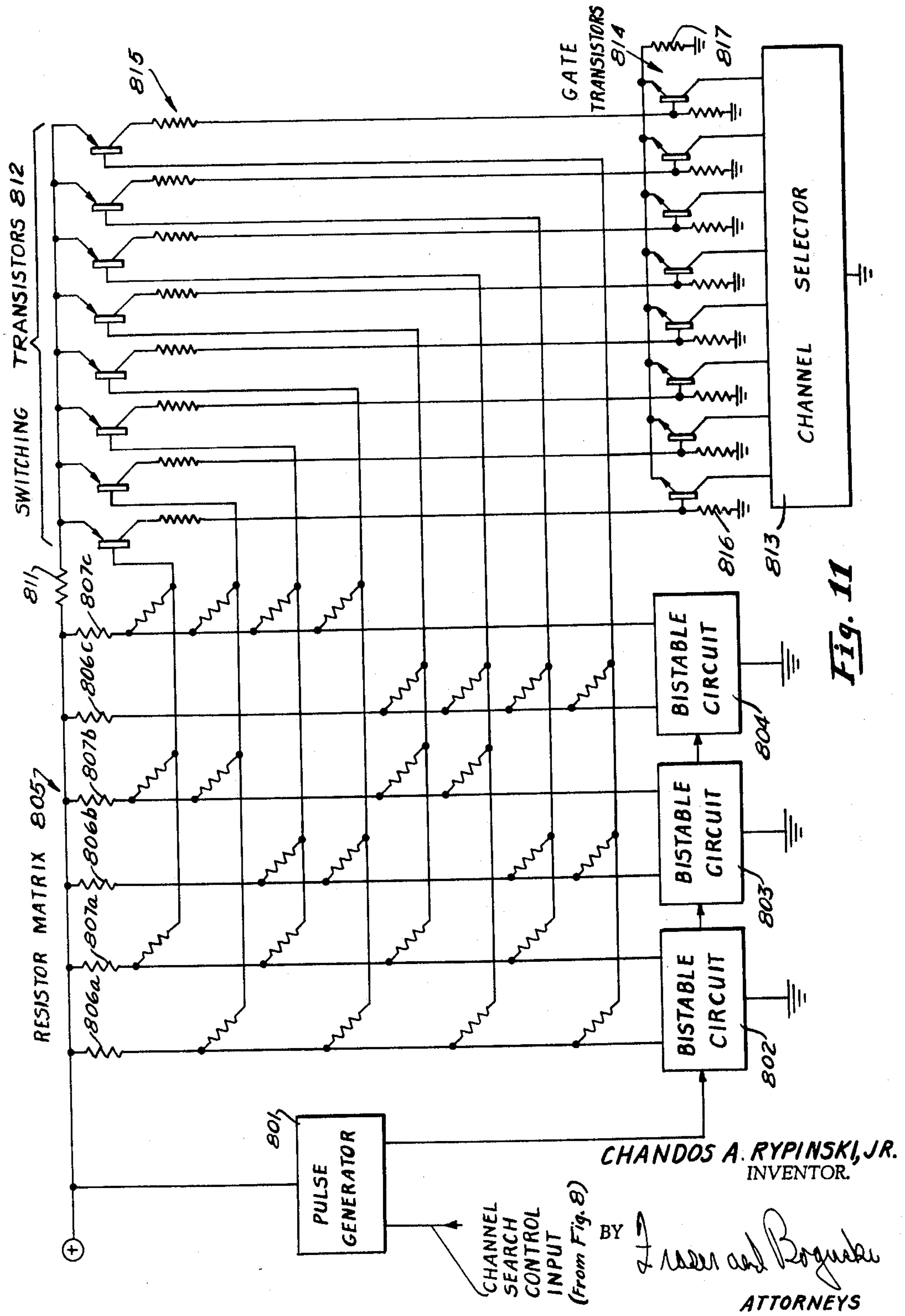
FIG. 11 is a diagrammatic illustration of an electronic rotary channel selector for use in the unit station equipment of FIG. 8.

An electronic rotary channel searching unit is shown in FIG. 11 comprising a pulse generator 801, three bistable circuits 802, 803 and 804 connected in the manner of a binary counter, a resistor matrix 805 and eight switching transistors 812. The switching transistors 812 may be connected to the channel selector circuits via the gate transistors 814 which determine the channel of operation at the unit station.

In operation the pulse generator 801 generates pulses whenever the control lead from the unit station supervisory control unit is grounded. These pulses occur at a rate of the order of four to ten pulses per second.

The pulses from the pulse generator 801 are applied to three bistable circuits 802, 803 and 804 which function as a binary counter. The resistor matrix 805 is connected to the bistable circuits 802, 803 and 804 as shown. The resistor matrix 805 includes load resistors 806*a*–806*c* and 807*a*–807*c* for the bistable circuits 802, 803 and 804. Thus a voltage drop appears across one or the other of each pair of load resistors in accordance with the operation of the bistable circuits 802, 803 and 804.

The operation of the matrix 805 and the switching transistors 812 may be understood by considering that one and one only connection to the switching transistors is grounded by the bistable circuits 802, 803 and 804 via the resistor matrix 805 at any given time. Thus one and one only of the transistors 812 is conducting and the remainder are rendered non-conducting at any given time.

The collector of each switching transistor 812 is connected to the base of one of the gate transistors 814, with current limiting resistors 815 being placed in each of the connections. Each gate transistor is connected to ground at its base via corresponding ones of the biasing resistors 816 and the emitters of all of the gate transistors share a return to ground via a common emitter resistor 817.

Since the gate transistors 814 are of opposite conductivity type to the switching transistors 812, one and one only of the gate transistors is rendered conducting at any given time by the particular switching transistor 812 which is conducting. The collectors of the gate transistors 814 are in turn connected to the channel selector 813 which functions to control the unit radio station to place it on a channel determined by the position of the binary counter comprising the bistable circuits 802, 803 and 804.

In response to a series of pulses from the generator 801, the apparatus of FIG. 11 scans each channel in sequence and under control of the unit station supervisory unit is brought to rest on a channel upon which a marking signal appears as described above.

CONCLUSION

There has been described above in detail an eight-channel two-way radio telephone system interconnected with eight trunk lines. Due to the enhanced channel utilization and operating advantages associated with the concepts of the present invention, it is expected that the number of separate unit stations which may be served from a single central office terminal may be substantially increased by the use of systems embodying the invention. It will be appreciated that the particular system described is by way of example and that the invention may be readily adapted for use in conjunction with any desired number of communication channels, base stations or unit stations. Furthermore, the system need not be interconnected with the telephone trunk lines but may be connected to a large number of lines leading to telephone subscriber loops and subsets. Moreover, although the particular system described above by way of illustration employs relays and electromechanical switching devices for performing logic and circuit connection functions, an alternative system might well include other types of circuit components including electron tubes, and semiconductors, for example.

Various aspects and advantages have been set forth for the system of the present invention which will enable those skilled in the art to utilize any portion or the entire system thereof to enhance the operation of radio telephone systems, either with reference to the provision of mobile radio telephone service or telephone service with a large number of unit stations of fixed location via radio communication links. Furthermore, additional features may be added to the system of the invention without departing from the inventive concepts set forth therein. For example, provision may be made for operator access by each unit station in the event of a malfunction or in the case where a unit station from another system having different signalling standards desires to communicate with a base station. In mobile radio telephone service, the problem of operator access frequently might arise where a mobile unit station journeys into an area served by a base terminal system with which the mobile unit station is not primarily adapted to operate.

Apart from the above suggested alternatives and modifications, it will be appreciated that the present invention is in no way limited to the specific details given with reference to the exemplary eight-channel system described in detail above and shown in the drawings. Accordingly, the invention should be considered to include all modifications, improvements, and alternative arrangements falling within the concepts of the invention as shown and described herein and set forth in the annexed claims.

What is claimed is:

1. A multiple channel two-way radio telephone system in which a plurality of unit stations selectively employ any of a plurality of radio channels for communication with at least one base station, including the combination of means at said base station for generating a marking signal on a selected one of said plurality of channels upon which a next successive communication is to take place, means associated with each of said unit stations for scanning said plurality of channels in sequence, each of said unit stations including means responsive to the appearance of said marking signal for causing said scanning means to come to rest upon said selected channel, means at said base station for shifting the frequency of said marking signal at the commencement of the signalling of a unit station from said base station, and means at each of said unit stations responsive to said shift in marking signal frequency for inhibiting a unit station from initiating a call during the signalling of the unit station from said base station.

2. The combination in accordance with claim 1 further comprising means individually associated with said unit stations for disabling a selected scanning means upon the reception of a numerical identification signal.

3. A multiple channel two-way radio telephone system in which a plurality of unit stations selectively employ any of a plurality of radio channels for communication with at least one base station, including the combination of means for generating a marking signal conditionally appearing as one of two given frequencies on a selected one of said plurality of channels which is idle and upon which a next successive communication is to take place, scanning means associated with each of said unit stations for sequentially examining each of said channels in sequence for the appearance of said marking signal, means responsive to the appearance of said marking signal upon an idle channel for causing said scanning means to come to rest, means at said base station for shifting the frequency of the marking signal back and forth from one of said given frequencies to the other in accordance with a numerical designation to signal a selected unit station, each of said unit stations including means for maintaining a selected unit station at rest on the selected channel when the numerical designation transmitted by said base station is the numerical designation assigned to the unit station, and each of said unit stations including means for causing said scanning means to initiate search whenever the numerical designation transmitted by the base station is not the numerical designation of the unit station.

4. A multiple channel two-way radio telephone system in which a plurality of unit stations selectively communicate with a base station via a plurality of radio channels, including the combination of a central office terminal at said base station including means for generating a marking signal upon one of said plurality of channels upon which a next successive communication is to take place, scanning means associated with each of said unit stations for sequentially searching said channels for the presence of a marking signal, means associated with each unit station and responsive to the appearance of a marking signal on one of said plurality of channels for causing the scanning means to come to rest thereon, means for shifting the frequency of the marking signal in accordance with a selected numerical designation of a unit station, and means connected to said scanning means at each unit station for initiating a channel search operation by each of said unit stations other than the unit station identified by said selected numerical designation.

5. In a multiple channel two-way radio telephone system in which a plurality of unit stations selectively employ any of a plurality of radio channels for communication with at least one base station, the combination of means for generating a marking signal on a selected idle channel of said plurality of channels, means for modulating said marking signal with a numerical designation of a selected one of said plurality of unit stations, each of said unit stations including scanning means for searching said plurality of channels in sequence for said marking signal, means responsive to the appearance of said marking signal on an idle channel for arresting the operation of said scanning means in a position in which each of said unit stations is at rest on the channel upon which said marking signal appears, each of said unit stations including means responsive to the modulation of said marking signal for causing the scanning means of the selected unit station to remain at rest on said channel whenever a numerical designation borne by the modulation of said marking signal corresponds to the numerical designation of said unit station, and means at each of said unit stations responsive to an interruption in said marking signal for initiating a scanning operation whereby all of said unit stations with the exception of that station identified by the numerical designation borne by the modulation of said marking signal are removed from said channel to search for the appearance of a marking signal on another of said plurality of channels upon which the next successive communication is to take place.

6. In a multiple channel two-way radio telephone system in which a plurality of unit stations selectively employ any of a plurality of radio channels for communication with at least one base station, the combination of means generating a marking on a single selected idle channel upon which a next communication is to take place, means associated with each of said unit stations for scanning said plurality of channels in search of said marking signal, means coupled to said scanning means for causing said unit stations to come to rest thereon, said base station including means responsive to the seizure of said idle channel by one of said unit stations for interrupting said marking signal on said selected channel and generating a marking signal upon another of said plurality of channels, means at each of said unit stations responsive to the interruption of said marking signal on said selected channel for initiating a searching operation by said scanning means to cause each of said unit stations except the seizing station to come to rest upon said marked idle channel, said seizing station including means for transmitting a coded numerical designation to said base station identifying the unit station in response to an interruption in said marking signal, and said base station including at least one register for storing the numerical designation of said seizing unit station.

7. In a multiple channel two-way radio telephone system in which a central office terminal functions to establish communication links over a plurality of channels between a base station and selected unit stations, the combination of means for generating a marking signal on a selected one of said channels upon which a next communication is to take place, means at said central office terminal responsive to the seizure of a communication channel for interrupting said marking signal and transferring said marking signal to a next idle channel upon which a successive communication is to take place, each of said unit stations including means for transmitting a coded numerical designation identifying the unit station upon seizure of a communication channel by the unit station, and means responsive to the termination of a communication over each of said plurality of channels for transmitting a signal identifying the base station.

8. A unit station for use in a multiple channel two-way radio telephone system in which a base station identifies one of a plurality of radio channels by means of a marking signal to indicate that the next communication is to take place thereon and in which the marking signal appears on alternate ones of two frequencies to transmit a numerical designation identifying a selected unit station, comprising the combination of scanning means for sequentially searching each of said plurality of channels for said marking signal, means responsive to the appearance of said marking signal on one of said radio channels for arresting the operation of said scanning means and causing said unit station to come to rest thereon.

9. Apparatus in accordance with claim 8 in which said unit station is numerically identified and includes means responsive to the transmission from said base station of said marking signal bearing a numerical designation, said numerical designation responsive means being adapted to disable said scanning means whereby said unit station remains at rest on said selected channel irrespective of an interruption in said marking signal.

10. A central office terminal for use in conjunction with a two-way radio telephone system in which communication links are established between a plurality of telephone lines and a plurality of unit stations via intermediate radio communication channels including the combination of means for generating a marking signal on a selected one of said communication channels upon which a next successive communication is to take place, means adapted to seize said selected channel in response to an incoming numerical designation on one of the telephone lines, means for selectively transmitting said marking signal on alternate ones of two frequencies in accordance with the numerical designation received via said telephone lines for identifying a selected unit station, means for establishing a communication link with the selected one of said unit stations and said telephone line upon which said incoming numerical designation appears, and means for transferring said marking signal to another of said plurality of communication channels upon the seizure of said selected channel in response to said incoming numerical designation.

11. A central office terminal for use in a multiple channel two-way radio telephone system in which a plurality of communication links are selectively established between a plurality of telephone lines and a plurality of unit stations via communication channels including the combination of means for marking a selected one of said communication channels with a signal to indicate the channel upon which the next successive communication is to take place, means responsive to a seizure of said selected channel by any one of said unit stations for transferring said marking signal to another of said channels, at least one register for receiving a numerical designation transmitted by the unit station seizing the channel, and means for conditionally establishing a communication link between said seizing unit station and one of said telephone lines in accordance with the numerical designation in said register.

12. In a multiple channel two-way radio telephone system in which a plurality of unit stations selectively employ a plurality of radio channels for communication with at least one base station, the combination of a central office terminal at said base station including an idle channel marking selector which is adapted to generate a marking signal on a selected one of said plurality of radio channels upon which a next successive communication is to take place, said central office terminal also including means for shifting the marking signal from a first to a second frequency, each of said unit stations including channel selector means responsive to the appearance of a marking signal on said selected channel for causing each of said unit stations to come to rest thereon, and means at each of said unit stations coupled to the channel selector means for inhibiting each of said unit stations from initiating a communication in response to a shift in frequency of said marking signal from said first to said second frequency.

13. In a multiple channel two-way radio telephone system in which a plurality of unit stations are each uniquely identified by a number and arranged to selectively employ any of a plurality of radio channels for communication with at least one base station, the combination of a central office terminal at said base station having means for generating a marking signal on a selected idle channel to identify that channel as the one upon which a next communication is to take place, each of said unit stations including a channel selector responsive to the appearance of said marking signal to cause said unit stations to come to rest upon said selected channel, means associated with said central office terminal for modulating said marking signal in accordance with the numerical designation corresponding to the number of a particular one of said unit stations, said marking signal generating means being adapted to transfer said marking signal to another idle channel at the completion of the transmission of the said numerical designation, and means associated with each of said unit stations for inhibiting the operation of said channel selector whenever the modulation of said marking signal corresponds to the number assigned thereto whereby each of said unit stations with the exception of the particular unit station designated by said numerical modulation is transferred to another idle channel preparatory to establishing a next successive communication.

14. A multiple channel two-way radio telephone system in which a plurality of unit stations selectively employ a plurality of radio channels for communication with at least one base station, including the combination of a central office terminal at said base station including an idle channel marking selector which is adapted to generate a marking signal on a selected one of said plurality of channels upon which a next successive communication is to take place, each of said unit stations including a channel selector responsive to the appearance of a marking signal on said selected channel for causing each of said unit stations to come to rest thereon, means for transferring said marking signal to another of said communication channels whenever the selected channel is seized for communication, each of said unit stations including means for inhibiting the operation of said channel selector whenever a communication link between said base station and the unit station is established, means at said central office terminal for establishing a communication link to said particular unit station via said selected channel, means at said central office terminal for transmitting a signal identifying the base station at the conclusion of each communication between the base station and the unit station, and means for blocking the channel on which the identifying signal is being transmitted from being marked with said marking signal until base station identification is concluded.

15. A central office terminal for use in conjunction with a two-way radio telephone system in which communication links are established between a plurality of trunk lines and a plurality of unit stations via intermediate radio communication channels, including the combination of means for generating a marking signal on a selected one of said communication channels upon which a next successive communication is to take place, a plurality of number registers connected to said trunk lines for storing the numbers of unit stations being called, an in-service test unit coupled to said registers, means interrogating said in-service number test unit upon each storage of a unit station number in said registers, means adapted to seize said selected channel in response to an incoming communication on said plurality of trunk lines conditionally upon interrogation of said in-service number test unit means for establishing a communication link with a selected one of said unit stations and said trunk line upon which said incoming communication appears, and means for transferring said marking signal to another of said plurality of communication channels upon the seizure of said selected channel in response to said incoming communication.

16. A central office terminal for use in conjunction with a two-way radio telephone system in which communication links are established between a plurality of trunk lines and a plurality of unit stations by intermediate radio communication channels, including the combination of means for generating a marking signal on a selected one of said communication channels upon which a next successive communication is to take place, a plurality of number registers connected to said trunk lines for storing the numbers of unit stations being called, a busy number test unit coupled to said registers, means interrogating said busy number test unit upon each storage of a number in said plurality of registers, means adapted to seize said selected channel in response to an incoming communication on said plurality of trunk lines conditionally upon interrogation of said busy number test unit, means for establishing a communication link with a selected one of said unit stations and said trunk line upon which said incoming communication appears, and means for transferring said marking signal to another of said plurality of communication channels upon the seizure of said selected channel in response to said incoming communication.

17. A central office terminal for use in conjunction with a two-way radio telephone system in which communication links are established between a plurality of trunk lines and a plurality of unit stations via intermediate radio communication channels, including the combination of means for generating a marking signal on a selected one of said communication channels upon which a next successive communication is to take place, a plurality of registers connected to said trunk lines for storing the numbers of unit stations being called, an in-service number test unit coupled to said registers, a busy number test unit coupled to said registers, means interrogating both said in-service number and busy number test units upon storage of a unit station number in any of said plurality of registers, means adapted to seize said selected channel in response to an incoming communication on said plurality of trunk lines conditionally upon an interrogation of both said busy number and in-service test number units, means for establishing a communication link with a selected one of said unit stations and said trunk line upon which said incoming communication appears, and means for transferring said marking signal to another of said plurality of communication channels upon the seizure of said selected channel in response to said incoming communication.

18. A central office terminal for use in conjunction with a two-way radio telephone system in which communication links are established between a plurality of wire-connected lines and a plurality of unit stations via intermediate radio communication channels, including the combination of means for generating a marking signal on a selected one of said communication channels upon which a next successive communication is to take place, a plurality of number registers connected to said wire-connected lines for storing the numbers of unit stations being called, an in-service test unit coupled to said registers, means interrogating said in-service number test unit upon each storage of a unit station number in said registers, means adapted to seize said selected channel in response to an incoming communication on said plurality of lines conditionally upon interrogation of said in-service number test unit, means for establishing a communication link with a selected one of said unit stations and said line upon which said incoming communication appears, and means for transferring said marking signal to another of said plurality of communication channels upon the seizure of said selected channel in response to said incoming communication.

19. A central office terminal for use in conjunction with a two-way radio telephone system in which communication links are established between a plurality of wire connected lines and a plurality of unit stations by intermediate radio communication channels, including the combination of means for generating a marking signal on a selected one of said communication channels upon which a next successive communication is to take place, a plurality of number registers connected to said lines for storing the numbers of unit stations being called, a busy number test unit coupled to said registers, means interrogating said busy number test unit upon each storage of a number in said plurality of registers, means adapted to seize said selected channel in response to an incoming communication on one of said plurality of lines conditionally upon interrogation of said busy number test unit, means for establishing a communication link with a selected one of said unit stations and said line upon which said incoming communication appears, and means for transferring said marking signal to another of said plurality of communication channels upon the seizure of said selected channel in response to said incoming communication.

20. A central office terminal for use in conjunction with a two-way radio telephone system in which communication links are established between a plurality of wire connected lines and a plurality of unit stations via intermediate radio communication channels, including the combination of means for generating a marking signal on a selected one of said communication channels upon which a next successive communication is to take place, a plurality of registers connected to said lines for storing the numbers of unit stations being called, an in-service number test unit coupled to said registers, a busy number test unit coupled to said registers, means interrogating both said in-service number and busy number test units upon storage of a unit station number in any of said plurality of registers, means adapted to seize said selected channel in response to an incoming communication on said plurality of lines conditionally upon an interrogation of both said busy number and in-service test number units, means for establishing a communication link with a selected one of said unit stations and said line upon which said incoming communication appears, and means for transferring said marking signal to another of said plurality of communication channels upon the seizure of said selected channel in response to said incoming communication.

21. A central office terminal for use in a multiple channel two-way radio telephone system in which a plurality of communication links are selectively established between a plurality of wire connected lines and a plurality of unit stations via radio communication channels, including the combination of means for marking a selected one of said communication channels with a signal to indicate the channel upon which the next successive communication is to take place, a plurality of registers connected to said wire connected lines for storing the numbers of unit stations being called, an in-service number test unit coupled to all of said plurality of registers, means interrogating said in-service number test unit in response to the storage of a number in any of said plurality of registers, means seizing said selected marked communication channel conditionally upon interrogation of said in-service number test unit to establish a communication link between a wire connected line and the unit station designated by the number stored in the register initiating the interrogation of said in-service number test unit, and means responsive to seizure of said selected channel for transferring said marking signal to another of said channels.

22. A central office terminal for use in a multiple channel two-way radio telephone system in which a plurality of communication links are selectively established between a plurality of wire connected lines and a plurality of unit stations via radio communication channels including the combination of means for marking a selected one of said communication channels with a signal to indicate the channel upon which the next successive communication is to take place, a plurality of registers connected to said wire connected lines for storing the numbers of unit stations being called, a busy number test unit coupled to all of said plurality of registers, means interrogating said busy number test unit in response to the storage of a number in any of said plurality of registers, means seizing said selected marked communication channel conditionally upon interrogation of said busy number test unit to establish a communication link between a wire connected line and the unit station designated by the number stored in the register initiating the interrogation of said busy number test unit, and means responsive to seizure of said selected channel for transferring said marking signal to another of said channels.

23. A central office terminal for use in a multiple channel two-way radio telephone system in which a plurality of communication links are selectively established between a plurality of wire connected lines and a plurality of unit stations via radio communication channels including the combination of means for marking a selected one of said communication channels with a signal to indicate the channel upon which the next successive communication is to take place, a plurality of registers connected to said wire connected lines for storing the numbers of unit stations being called, an in-service number test unit coupled to all of said plurality of registers, a busy number test unit coupled to all of said plurality of registers, means interrogating said in-service and busy number test units in response to the storage of a number in any of said plurality of registers, means seizing said selected marked communication channel conditionally upon interrogation of said in-services and busy number test units to establish a communication link between a wire connected line and the unit station designated by the number stored in the register initiating the interrogation of said in-service and busy number test units, and means responsive to seizure of said selected channel for transferring said marking signal to another of said channels.

24. In a multiple channel two-way radio telephone system in which a plurality of unit stations are each uniquely identified by number and arranged to employ selectively any of a plurality of radio channels for communication with at least one base station, the combination of a central office terminal at said base station having means for generating a marking signal on a selected idle channel to identify that channel as the one upon which a next communication is to take place, each of said unit stations including a channel selector responsive to the appearance of said marking signal to cause said unit station to some to rest upon said selected channel, said central office terminal including registers for storing the numerical designations of each unit station both initiating and receiving a call, a busy number test unit coupled to said registers, means interrogating said busy number test unit in response to storage of a number in any of said registers, means seizing said selected idle channel conditionally upon interrogation of said busy number test unit to establish a communication link to said numerically identified unit station, and means responsive to establishing said communication link to transfer said marking signal to another idle channel.

25. In a multiple channel two-way radio telephone system in which a plurality of unit stations selectively employ any of a plurality of radio channels for communication with at least one base station and in which each of the unit stations is assigned a unique numerical designation, the combination of means generating a marking signal on a single selected idle channel upon which a next communication is to take place, means associated with each of said unit stations for scanning said plurality of channels in search of the channel upon which said marking signal appears and for causing said unit stations to come to rest thereon, each of said unit stations being adapted to transmit its own unique numerical designation upon the initiation of a call from the unit station, said base station including registers for storing the number designations transmitted by the unit stations, an in-service number test unit coupled to said registers, means interrogating said in-service test unit upon storage of a numerical designation in any of said registers, means establishing a communication link with the unit station initiating a call conditionally upon interrogation of said in-service number test unit, and means returning dial tone to said calling unit station conditionally upon interrogation of said in-service number test unit and establishing a communication link therewith.

26. A central office terminal for use in a multiple channel two-way radio telephone system in which a plurality of communication links are selectively established between a plurality of wire-connected lines and a plurality of unit stations via radio communication channels, including the combination of means for marking a selected one of said communication channels with a signal to indicate the channel upon which the next successive communication is to take place, a channel supervisory unit at said central office terminal associated with each of said communication channels, each of said channel supervisory units including a register for storing a number uniquely assigned to each unit station, a plurality of wire line supervisory units associated with said lines, each of said wire line supervisory units including a register for storing the number of a called unit station, an in-service number test unit coupled to both said wire line and channel supervisory unit registers, means interrogating said in-service number test unit upon storage of a numerical designation in any of said registers, and means conditionally establishing a communication link between a numerically designated unit station and a wire line upon interrogation of said in-service number test unit.

27. A central office terminal for use in a multiple channel two-way radio telephone system in which a plurality of communication links are selectively established between a plurality of wire-connected lines and a plurality of unit stations via radio communication channels including the combination of means for marking a selected one of said communication channels with a signal to indicate the channel upon which the next successive communication is to take place, a channel supervisory unit at said central office terminal associated with each of said communication channels, each of said channel supervisory units including a register for storing a number uniquely assigned to each unit station, a plurality of wire line supervisory units associated with said lines, each of said wire line supervisory units associated with said lines, each of said wire line supervisory units including a register for storing the number of a called unit station, a busy number test unit coupled to both said wire line and channel supervisory unit registers, means interrogating said busy number test unit upon storage of a numerical designation in any of said registers, and means conditionally establishing a communication link between a numerically designated unit station and a wire line upon interrogation of said busy number test unit.

28. A central office terminal for use in a multiple channel two-way radio telephone system in which a plurality of communication links are selectively established between a plurality of wire-connected lines and a plurality of unit stations via radio communication channels including the combination of means for marking a selected one of said communication channels with a signal to indicate the channel upon which the next successive communication is to take place, a channel supervisory unit at said central office terminal associated with each of said communication channels, each of said channel supervisory units including a register for storing a number uniquely assigned to each unit station, a plurality of wire line supervisory units associated with said lines, each of said wire line supervisory units including a register for storing the number of a called unit station, an in-service number test unit coupled to both said wire line and channel supervisory unit registers, a busy number test unit coupled to both said wire line and busy number test units, means interrogating said in-service and busy number test units upon storage of a numerical designation in any of said registers, and means conditionally establishing a communication link between a numerically designated unit station and a wire line upon interrogation of said in-service and busy number test units.

29. In a multiple channel two-way radio telephone system in which a plurality of unit stations are each uniquely identified by a number and arranged to employ selectively any of a plurality of radio channels for communication with at least one base station, the combination of a central office terminal at said base station having means generating a marking signal on a selected idle channel to identify that channel as the one upon which the next communication is to take place, each of said unit stations including a channel selector responsive to the appearance of said marking signal to cause said unit stations to come to rest upon said selected channel, each of said unit stations being adapted to transmit said unique number identification automatically upon initiation of a call from the unit station, a plurality of channel supervisory units, each of said channel supervisory units including a register for storing the numerical designation transmitted by a unit station, and means establishing a communication link to said unit station upon registration of its numerical designation in said register.

30. A system in accordance with claim 29 in which said unit station includes means for transmitting a guard tone along with said numerical designation and said base station includes means responsive to the appearance of said guard tone to insure error free transmission of said numerical designation.

31. In a multiple channel two-way radio telephone system in which a plurality of unit stations selectively employ a plurality of radio channels for communication with at least one base station, the combination of a central office terminal at said base station including an idle channel marking programmer which is adapted to generate a marking signal on a selected one of said plurality of radio channels upon which a next successive communication is to take place, each of said unit stations including a channel selector responsive to the appearance of a marking signal on said selected channel for causing each of said unit stations to come to rest thereon, means establishing a communication link between said base station and a unit station upon initiation of a call by said unit station, said unit station further including means for transmitting a numerical designation corresponding to a called number, means transmitting a guard tone from said unit station along with said numerical designation and said base station including means responsive to the appearance of the guard tone to insure correct receipt of said numerical designation.

32. A unit station for use in a multiple channel two-way radio telephone system in which a marking signal appears on a selected one of a plurality of channels upon which a next successive communication is to take place and in which the marking signal is shifted in frequency during signalling, said unit station including means for scanning said plurality of channels in sequence, means responsive to the appearance of said marking signal for causing said scanning means to come to rest upon said selected channel, and means responsive to a change in frequency of said marking signal to inhibit said unit station from initiating a call on said selected channel during signalling.

33. The combination in accordance with claim 32 further comprising means individually associated with said unit station for disabling the scanning means in response to signals borne by the marking signal.

34. A unit station for use in a multiple channel two-way radio telephone system in which a plurality of unit stations selectively employ any of a plurality of radio channels for communication with at least one base station and in which a marking signal appears on a selected one of the channels which is idle and upon which a next successive communication is to take place, including the combination of scanning means for sequentially examining each of said channels in sequence for the appearance of said marking signal, means responsive to the appearance of said marking signal upon an idle channel for causing said scanning means to come to rest, and means responsive to an interruption in said marking signal for transmitting a numerical designation identifying the unit station upon initiation of a call by said unit station to said base station.

35. A unit station for use in a multiple channel two-way radio telephone system in which one of a plurality of communication channels is marked by a signal on a first frequency, including the combination of scanning means for sequentially searching said channels for the presence of a marking signal, means responsive to the appearance of a marking signal on one of said plurality of channels for causing the scanning means to come to rest thereon, means responsive to a shift in the frequency of said marking signal to inhibit said unit station from initiating a call, and means connected to said scanning means for initiating a channel search operation upon the interruption of said marking signal.

36. A unit station for use in a multiple channel two-way radio telephone system in which one of a plurality of communication channels is marked by a signal, including the combination of scanning means for sequentially searching said channels for the presence of a marking signal, means responsive to the appearance of a marking signal on one of said plurality of channels for causing the scanning means to come to rest thereon, means inhibiting the operation of the scanning means whenever the unit station is a party to a call, means for preventing call origination by a unit station which is not at rest on a marked channel, means for conditionally holding said call origination preventing means operative, and means connected to said scanning means for initiating a channel search operation whenever the unit station is not a party to a call.

37. A unit station for use in a multiple channel two-way radio telephone system in which a plurality of unit stations selectively employ any of a plurality of radio channels for communication with at least one base station and in which a marking signal appears on a selected one of the channels which is idle and upon which a next successive communication is to take place, including the combination of scanning means for sequentially examining each of said channels in sequence for the appearance of said marking signal, means responsive to the appearance of said marking signal upon an idle channel for causing said scanning means to come to rest, means responsive to a modulation of said marking signal for inhibiting said unit station from initiating a call, and means responsive to a coded numerical designation for inhibiting said channel scanning means whenever the unit station is a party to a call.

38. A unit station for use in a multiple channel two-way radio telephone system in which one of a plurality of communication channels is marked by the appearance of a marking signal and in which each of the plurality of unit stations is uniquely identified by numerical designation, including the combination of scanning means for searching said plurality of channels in sequence for said marking signal, means responsive to the appearance of said marking signal on an idle channel for arresting the operation of said scanning means in a position in which said unit station is at rest on the channel upon which said marking signal appears, means responsive to a modulation of the marking signal for causing the scanning means to remain at rest upon said channel whenever the numerical designation borne by the modulation of said marking signal corresponds to that of the unit station, and means responsive to an interruption in said marking signal for initiating a scanning operation whenever the numerical designation borne by the modulation of said marking signal differs from the numerical designation assigned to the unit station.

39. A unit station for use in a multiple channel two-way radio telephone system in which one of a plurality of communication channels is marked by the appearance of a marking signal and in which each of the plurality of unit stations is uniquely identified by numerical designation, including the combination of scanning means for searching said plurality of channels in sequence for said marking signal, means responsive to the appearance of said marking signal on an idle channel for arresting the operation of said scanning means in a position in which said unit station is at rest on the channel upon which said marking signal appears, a code selector responsive to the transmission of a coded signal corresponding to a numerical designation assigned to the unit station, said code selector being adapted to establish an electrical connection which causes the scanning means to remain at rest upon said channel whenever the numerical designation applied to the code selector corresponds to that of the unit station, and means responsive to an interruption in said marking signal for initiating a scanning operation whenever the numerical designation applied to the code selector differs from the numerical designation assigned to the unit station.

40. A multiple channel two-way radio telephone system in which a plurality of unit stations selectively employ any of a plurality of radio channels for communication with at least one base station, including the combination of means for generating a marking signal on a selected idle channel of said plurality of channels, means for modulating said marking signal with a numerical designation of a selected one of said plurality of unit stations, each of said unit stations including scanning means for searching said plurality of channels in sequence for said marking signal, means responsive to the appearance of said marking signal on an idle channel for arresting the operation of said scanning means in a position in which each of said unit stations is at rest on the channel upon which said marking signal appears, each of said unit stations including means responsive to the modulation of said marking signal for causing the scanning means of the selected unit station to remain at rest on said channel whenever a numerical designation borne by the modulation of said marking signal corresponds to the numerical designation of said unit station, and means at each of said unit stations for initiating a scanning operation whenever the numerical designation of the unit station differs from the numerical designation borne by the modulation of said marking signal whereby all of said unit stations with the exception of that station identified by the numerical designation borne by the modulation of said marking signal are removed from said channel to search for the appearance of a marking signal on another of said plurality of channels upon which the next successive communication is to take place.

41. A multiple channel two-way radio telephone system in which a plurality of unit stations are each uniquely identified by a number and arranged to selectively employ any of a plurality of radio channels for communication with at least one base station, including the combination of a central office terminal at said base station having means for generating a marking signal on a selected idle channel to identify that channel as the one upon which a next communication is to take place, each of said unit stations including a channel selector responsive to the appearance of said marking signal to cause said unit stations to come to rest upon said selected channel, means associated with said central office terminal for modulating said marking signal in accordance with the numerical designation corresponding to the number of a particular one of said unit stations, said marking signal generating means being adapted to transfer said marking signal to another idle channel for a next successive communication, and means associated with each of said unit stations for inhibiting the operation of said channel selector whenever the modulation of said marking signal corresponds to the number assigned thereto whereby each of said unit stations with the exception of the particular unit station designated by said numerical modulation is transferred to another idle channel preparatory to establishing a next successive communication.

42. In a multiple channel two-way radio telephone system in which a plurality of unit stations are each uniquely identified by a number and arranged to employ selectively any of a plurality of radio channels for communication with at least one base station, the combination of a central office terminal at said base station having means generating a marking signal on a selected idle channel to identify that channel as the one upon which the next communication is to take place, each of said unit stations including a channel selector responsive to the appearance of said marking signal to cause said unit stations to come to rest upon said selected channel, each of said unit stations being adapted to transmit said unique number identification upon initiation of a call from the unit station, said central office terminal including register means for storing the numerical designation transmitted by a unit station, and means establishing a communication link to said unit station upon registration of its numerical designation in said register means.

43. In a multiple channel two-way radio telephone system in which a plurality of unit stations selectively employ a plurality of radio channels for communication with at least one base station, the combination of a central office terminal at said base station including an idle channel marking programmer which is adapted to generate a marking signal on a selected one of said plurality of radio channels upon which a next successive communication is to take place, each of said unit stations including a channel selector responsive to the appearance of a marking signal on said selected channel for causing each of said unit stations to come to rest thereon, means establishing a communication link between said base station and a unit station upon initiation of a call by said unit station, said unit station further including means for transmitting a numerical designation corresponding to a called number, means transmitting a supplemental signal from said unit station along with said numerical designation, and said base station including means responsive to the appearance of the supplemental signal to insure correct receipt of said numerical designation to detect mutilation of the transmitted numerical designation.

44. A unit station for use in a multiple channel two-way radio telephone system in which one of a plurality of communication channels is marked by the appearance of a marking signal and in which each of the plurality of unit stations is uniquely identified by a numerical designation, including the combination of scanning means for searching said plurality of channels in sequence for said marking signal, means responsive to the appearance of said marking signal on an idle channel for arresting the operation of said scanning means in a position in which said unit station is at rest on the channel upon which said marking signal appears, means responsive to a modulation of the marking signal for causing the scanning means to remain at rest upon said channel whenever the numerical designation borne by the modulation of said marking signal corresponds to that of the unit station, and means for initiating a scanning operation by said unit stations when the numerical designation borne by the modulation of said marking signal differs from the numerical designation assigned to the unit station.

45. A unit station for use in a multiple channel two-way radio telephone system in which one of a plurality of communication channels is marked by the appearance of a marking signal and in which each of the plurality of unit stations is uniquely identified by a numerical designation, including the combination of scanning means for searching said plurality of channels in sequence for said marking signal, means responsive to the appearance of said marking signal on an idle channel for arresting the operation of said scanning means in a position in which said unit station is at rest on the channel upon which said marking signal appears, a code selector responsive to the transmission of a coded signal corresponding to a numerical designation assigned to the unit station, said code selector being adapted to establish an electrical connection which causes the scanning means to remain at rest upon said channel whenever the numerical designation applied to the code selector corresponds to that of the unit station, and means for initiating a scanning operation by said unit station when the numerical designation applied to the code selector differs from the numerical designation assigned to the unit station.

46. A unit station for use in a multiple channel two-way radio telephone system in which one of a plurality of communication channels is marked by the appearance of a marking signal and in which each of the plurality of unit stations is uniquely identified by a numerical designation, including the combination of a radio receiver including scanning means for searching said plurality of channels in sequence for said marking signal, a supervisory unit including means responsive to the receipt of said marking signal by said radio receiver for arresting the operation of said scanning means in a position in which said unit station is at rest on the channel upon which said marking signal appears, means responsive to a modulation of the marking signal for causing the scanning means to remain at rest upon said channel whenever the numerical designation borne by the modulation of said marking signal corresponds to that of the unit station, and means coupled to said radio for initiating a scanning operation whenever the numerical designation borne by the modulation of said marking signal differs from the numerical designation assigned to the unit station.

47. A unit station for use in a multiple channel two-way radio telephone system in which one of a plurality of communication channels is marked by the appearance of a marking signal and in which each of the plurality of unit stations is uniquely identified by a numerical designation, including the combination of a duplex radio communicating means including scanning means for searching said plurality of channels in sequence for said marking signal; a supervisory unit including means responsive to a marking signal received by said radio on an idle channel for arresting the operation of said scanning means in a position in which said unit station is at rest on the channel upon which said marking signal appears, a code selector responsive to the receipt by said radio of a coded signal corresponding to a numerical designation assigned to the unit station, said code selector being adapted to establish an electrical connection which causes the scanning means to remain at rest upon said channel whenever the numerical designation applied to the code selector corresponds to that of the unit station, and means coupled to said radio for initiating a scanning operation whenever the numerical designation applied to the code selector differs from the numerical designation assigned to the unit station.

48. A unit station in accordance with claim 47 including a control head coupled to said supervisory unit having a hookswitch actuated by the removal of a telephone handset, said supervisory unit including means for energizing the radio to transmit a connect signal upon actuation of the hookswitch by removal of the handset.

49. A unit station in accordance with claim 48 in which said supervisory unit includes means for conditionally blocking transmission of said connect signal by said radio in the absence of receipt of a marking signal by said radio.

50. A multiple channel two-way radio telephone communication system comprising a base station having idle channel marking means for placing a marking signal on a selected one of a plurality of channels on which a next telephone call is to take place and a plurality of unit stations for communicating with the base station over said plurality of channels; each unit station having a channel scanner for sequentially scanning each of the channels in search of the marking signal, means responsive to the marking signal for inhibiting the channel scanner from further scanning, a transmitter, a signal generator, and call originating means for energizing the transmitter and the signal generator in order to send a connect signal modulated on the transmitter carrier to the base station when a call is to be originated from the unit station.

51. A system in accordance with claim 50 further including means at the base station responsive to said connect signal from a unit station to cause the idle channel marking means to move the idle channel marking signal from the channel on which the connect signal is received to the next idle channel on which a call is to take place.

52. A system in accordance with claim 51 further including means at the unit station for inhibiting the channel scanner from initiating search responsive to the operation of the call originating means.

53. A system in accordance with claim 52 wherein each unit station further includes means for terminating the connect signal upon receipt of an indication from the base station that the connect signal was received, a code selector for generating signals representing a particular numerical designation identifying a unit station, and means for energizing said code selector upon receipt of a command to identify from the base station in order to send to the base station the numerical designation of the unit station originating a call.

54. A system in accordance with claim 53 further including means at the base station including a register for storing the numerical designation received from the call originating unit station and for conditionally sending dial tones over the selected channel to the call originating unit station.

55. A system in accordance with claim 54 further including means for selectively energizing the transmitter and the signal generator to send dialing signals to the base station over the selected channel to designate a telephone called by the call originating unit station.

56. A system in accordance with claim 55 further including means at the base station for completing a communication path to the designated telephone in response to the dialing signals sent to the base station from the call originating unit station.

57. A system in accordance with claim 56 wherein each unit station further includes means for selectively energizing the transmitter and the signal generator to send a disconnect signal modulated on the transmitter carrier to the base station when the unit station subscriber hangs up to terminate a connection to a channel on which a call was placed.

58. A system in accordance with claim 57 further including means at the base station responsive to the receipt of the disconnect signal from a unit station for sending a numerical designation identifying the base station and for preventing the idle channel marking means from applying a marking signal to the channel on which the base station is sending its numerical designation until the termination of base station identification.

59. A multiple channel two-way radio telephone communication system comprising a base station having idle channel marking means for placing a marking signal on a selected one of a plurality of channels on which a next telephone call is to take place and a plurality of unit stations for communicating with the base station over said plurality of channels; each unit station having a channel scanner for sequentially scanning each of the channels in search of the marking signal and means responsive to the marking signal for inhibiting the channel scanner from further scanning; the base station also including means for modulating the marking signal to send signals corresponding to a numerical designation identifying a selected unit station to which a call is placed.

60. A system in accordance with claim 59 wherein each unit station further includes means for originating a call and means for inhibiting the operation of the call originating means during the receipt of numerical designation signals from the base station.

61. A system in accordance with claim 60 further including a code selector at each unit station coded in accordance with the unique numerical designation of its particular unit station for selecting a called unit station in response to the numerical designation sent by the base station.

62. A system in accordance with claim 61 further including means at the base station for causing the idle channel marking means to transfer the marking signal to the next idle channel on which a call is to take place.

63. A system in accordance with claim 62 wherein each unit station further includes means for causing the channel scanner to begin scanning the plurality of channels in search of the transferred marking signal if the unit station is not a party to the call being placed and means for further inhibiting the search operation of the channel scanner if the unit station is selected by the particular numerical designation sent by the base station.

64. A multiple channel radio telephone communication system in accordance with claim 63 further including means at the unit station responsive to an indication from the code selector for indicating to a unit station subscriber that a particular unit station is selected by the numerical designation from the base station.

65. A system in accordance with claim 64 wherein each unit station further includes a transmitter, a signal generator, and means for selectively energizing the transmitter and the signal generator to send a connect signal to the base station modulated on transmitter carrier when the unit station subscriber answers the call being placed from the base station.

66. A system in accordance with claim 65 further including means at each unit station for selectively energizing said transmitter and signal generator to send a disconnect signal modulated on the transmitter carrier to the base station when the unit station subscriber hangs up at the conclusion of a call.

67. A system in accordance with claim 66 further including means at the base station responsive to the receipt of the disconnect signal from a unit station for sending a numerical designation identifying the base station and for preventing the idle channel marking means from applying a marking signal to the channel on which the base station is sending its numerical designation until the termination of base station identification.

68. A unit station for use in a multiple channel radio telephone system in which a base station identifies one of a plurality of radio channels by means of a marking signal to indicate that the next communication is to take place thereon including means for originating a call from said unit station over the marked channel, means controllable from the base station for inhibiting said call originating means, and means at the unit station for holding the inhibiting means actuated.

69. A unit station for use in a multiple channel radio telephone system in which a base station identifies one of a plurality of radio channels by means of a marking signal to indicate that the next communication is to take place thereon including means for originating a call from said unit station over the marked channel, means controllable from the base station for inhibiting said call originating means, and means at the unit station for holding the inhibiting means actuated including a hookswitch connected in a latching circuit path to said inhibiting means.

70. A unit station for use in a multiple channel radio telephone system in which a base station identifies one of a plurality of radio channels by means of a marking signal to indicate that the next communication is to take place thereon including means for sequentially searching said plurality of channels, means responsive to the marking signal for inhibiting the channel searching means when the marked channel is reached, means for originating a call from said unit station over the marked channel, means for inhibiting the call originating means during the searching operation, and means including a hookswitch at the unit station for holding the inhibiting means actuated.

71. A unit station for use in a multiple channel radio telephone system in which a base station identifies one of a plurality of radio channels by means of a marking signal to indicate that the next communication is to take place thereon including means for searching the plurality of channels for the marked channel, means responsive to the marking signal for arresting the searching means, a selector responsive to coded signals from the base station designating a particular unit station, means for inhibiting the origination of a call from the unit station, and means coupled to the selector for energizing the inhibiting means when the selector is actuated.

72. A unit station for use in a multiple channel radio telephone system in which a base station identifies one of a plurality of radio channels by means of a marking signal to indicate that the next communication is to take place thereon including means for searching the plurality of channels for the marked channel, means responsive to the marking signal for arresting the searching means, a selector responsive to coded signals from the base station designating a particular unit station, means for inhibiting the origination of a call from the unit station, means coupled to the selector for energizing the inhibiting means when the selector is actuated, and means for holding the inhibiting means operated if energized when the unit station is attempting to originate a call.

73. A unit station for use in a multiple channel radio telephone system in which a base station selects one of a plurality of radio channels by means of a marking signal to indicate that the next communication is to take place thereon including a scanner for searching the radio channels in sequence for the marked channel, means responsive to the marking signal for interrupting further searching by the scanner, means for originating calls from the unit station, a busy relay for blocking the call originating means, logic circuitry connected to operate the busy relay upon the occurrence of any one of a plurality of predetermined conditions, a telephone hand set, and a latching circuit energizable by the lifting of the telephone hand set for holding the busy relay operated.

74. A unit station for use in a multiple channel radio telephone system in which a base station selects one of a plurality of radio channels by means of marking signal to indicate that the next communication is to take place thereon including a scanner for searching the radio channels in sequence for the marked channel, means responsive to the marking signal for interrupting further searching by the scanner, means for originating calls from the unit station, a busy relay for blocking the call originating means, a selector responsive to numerical coded signalling received over the selected channel, a first circuit path energizable by the marking signal responsive means and connected to operate the busy relay in the absence of the marking signal, a second circuit path coupled to the selector and connected to operate the busy relay when the selector is driven off its normal rest position, and means for holding the busy relay, once operated, when an attempt is made to originate a call from the unit station.

75. A unit station for use in a multiple channel two-way radio telephone system in which a base station identifies one of a plurality of radio channels by means of a marking signal to indicate that the next communication is to take place thereon, comprising the combination of scanning means for sequentially searching each of said plurality of channels for said marking signal, means responsive to the appearance of said marking signal on one of said radio channels for arresting the operation of said scanning means and causing said unit station to come to rest thereon, means responsive to an interruption in said marking signal for causing said scanning means to commence a searching operation, means at said unit station for seizing a channel upon origination of a call from the unit station, and means controllable from the base station for inhibiting the channel seizing means in order to release a seized channel from control of the unit station.

76. A unit station for use in a multiple channel radio telephone system in which a base station communicates with a plurality of unit stations over a plurality of radio channels with the channel selected for the next communication being indicated by a marking signal from the base station, said unit station comprising channel searching means, means responsive to the marking signal for interrupting further operation of the channel searching means, means for maintaining a unit station on a particular channel, a transmitter, signal generating means, call originating means, and means controllable by the call originating means for modulating the output of the transmitter with signals from the signal generating means in order to indicate to the base station that a call is being originated at the unit station.

77. A unit station for use in a multiple channel radio telephone system in which a base station communicates with a plurality of unit stations over a plurality of radio channels with the channel selected for the next communication being indicated by a marking signal from the base station, said unit station comprising channel searching means, means responsive to the marking signal for interrupting further operation of the channel searching means, means for maintaining a unit station on a particular channel, a transmitter, a telephone handset, a hook-switch actuable by the handset, and means controllable by the hook-switch in response to the lifting of the handset for modulating the output of the transmitter with a distinctive signal to indicate to the base station that a call is being originated at the unit station.

78. For use in a multiple channel radio telephone system including a base station and a plurality of unit stations arranged to search over a plurality of channels to arrive at a distinctively marked channel on which a next call is to take place, a central office terminal at the base station comprising an idle channel marker for placing a marking signal on the channel on which the next call is to take place, a transmitter, means for causing the transmitter to send base station identification code at the termination of a call between the base station and a unit station, and means for inhibiting the idle channel marker from marking a channel while the transmitter is sending base station identification code thereon.

79. A multiple channel radio telephone system including a base station having means for marking a selected one of a plurality of channels to indicate the channel on which a next call is to be placed; a plurality of unit stations capable of communicating with the base station over said channels; each of said unit stations being identifiable by a unique numerical designation and including a scanner for sequentially searching the plurality of channels for the marked channel, means responsive to the appearance of a marking signal on the selected channel for arresting the operation of the scanner, and means for generating coded identification signals in accordance with the assigned numerical designation for sending to the base station over the selected channel during the origination of a call by a unit station; and means for initiating the generating of said coded identification signals under the control of the base station including means at the base station for providing a command to identify and means at the unit station responsive to said command to identify to energize the coded identification signal generating means.

80. A multiple channel radio telephone system including a base station having means for marking a selected one of a plurality of channels to indicate the channel on which a next call is to be placed; a plurality of unit stations capable of communicating with the base station over said channels; each of said unit stations being identifiable by a unique number assignment and including a scanner for sequentially searching the plurality of channels for the marked channel, means responsive to the appearance of a marking signal on the selected channel for arresting the operation of the scanner, and a selector coded to select a unit station for connection in a communication path with the base station over the selected channel upon receipt of coded signals corresponding to the unique number assignment of that unit station, the selector including means for arresting operation of the scanner upon receipt of said coded signals; and means at the base station for signalling a selected unit station over the selected channel and for repeating said signalling in order to protect against the failure of the signals to select a particular unit station due to mutilation of signals over said channel.

81. A multiple channel radio telephone system including a base station having means for marking a selected one of a plurality of channels to indicate the channel on which a next call is to be placed; a plurality of unit stations capable of communicating with the base station over said channels; each of the unit stations being identifiable by a unique numerical designation and including a scanner for sequentially searching the plurality of channels for the marked channel, means responsive to the appearance of a marking signal on the selected channel for arresting the operation of the scanner, and a selector coded in accordance with a corresponding numerical designation, the selector including means for arresting the operation of the scanner on receipt of coded signals from the base station identifying the corresponding unit station; means at the base station for sending coded signals corresponding to the numerical designation of a selected unit station to originate a call from the base station; and means at a unit station controllable by the selector for sending signals corresponding to its unique numerical designation when a unit station is originating a call over the selected channel.

82. A multiple channel radio telephone system including a base station having means for marking a selected one of a plurality of radio channels to indicate the channel on which a next call is to be placed and means for sending numerical designation signals over the selected channel to select a unit station in accordance with dialing information applied to the system; and a plurality of unit stations capable of communicating with the base station over said channels; each of the unit stations being identifiable by a unique numerical designation and including a scanner for sequentially searching the plurality of channels for the marked channel, means responsive to the presence of the marking signal on the selected channel for arresting the operation of the scanner, a selector operable in response to said numerical designation signals from the base station to signal the selected unit station, said selector being adapted also to generate said numerical designation signals for transmission to the base station during call origination from the unit station, and means for automatically sending dialing information from the unit station to the base station during said call origination comprising a telephone dial and a signal generator controlled by said dial.

83. In a multiple channel two-way radio telephone system in which a plurality of unit stations selectively employ a plurality of radio channels for communication with at least one base station, a central office terminal at said base station having signal generating means for generating two distinctive tones for modulating a carrier frequency transmitted from the base station, and means for selectively energizing said signal generating means to mark a selected one of said plurality of channels as the one on which a next communication is to take place, to control a unit station to identify itself during call origination from that unit station, and to select a particular unit station for completion of a call to that unit station.

84. For use in a multiple channel two-way radio telephone communication system employing a plurality of channels for communication between a base station and a plurality of unit stations on a selective basis, the combination of a base station comprising idle channel marking means for placing a marking signal on a selected one of said plurality of channels on which a next telephone call is to take place, means responsive to a connect signal modulated on transmitted carrier from a call originating unit station to cause the idle channel marking means to move the marking signal from the selected channel to the next idle channel on which a call is to take place and for commanding the call originating unit station to transmit coded signals identifying the unit station in accordance with a numerical designation assigned to the unit station, a register for storing the numerical designation received from the call originating unit station, means responsive to a signal from the register for conditionally sending dial tone over the selected channel to the call originating station, means for completing a communication path to a designated telephone in response to dialing signals from the call originating unit station, means responsive to a disconnect signal modulated on transmitted carrier from a unit station for disconnecting the communication path upon call termination, and means for transmitting a base station identification signal upon the termination of a call.

85. For use in a multiple channel two-way radio telephone communication system employing a plurality of radio channels for selective communication between a base station and a plurality of unit stations, the combination of a base station having idle channel marking means for placing a marking signal on a selected one of said plurality of channels on which a next telephone call is to take place, means for modulating the marking signal to send signals corresponding to a numerical designation identifying a selected unit station to which a call is placed, means for causing the idle channel marking means to transfer the marking signal to the next idle channel on which a call is to take place, means responsive to a connect signal modulated on transmitted carrier from the selected unit station when the unit station subscriber answers the call being placed, means for completing a communication path between a calling subscriber and the selected unit station over the selected channel, and means for interrupting said communication path in response to a disconnect signal modulated on transmitted carrier from the unit station when the unit station subscriber hangs up at the conclusion of a call.

(References on following page)

References Cited by the Examiner

UNITED STATES PATENTS

| | | | |
|---|---|---|---|
| 2,657,266 | 10/53 | Hoth et al. | 179—2.5 |

References Cited by the Applicant

UNITED STATES PATENTS

| | | |
|---|---|---|
| 2,479,701 | 8/49 | Ress. |
| 2,533,662 | 12/50 | Bartelink. |
| 2,599,097 | 6/52 | Entz et al. |
| 2,629,092 | 2/53 | Herrick. |
| 2,641,757 | 6/53 | Hoth et al. |
| 2,649,541 | 8/53 | McDavitt. |
| 2,670,435 | 2/54 | Mitchell. |
| 2,686,257 | 8/54 | Reichle. |
| 2,733,337 | 1/56 | Mitchell et al. |
| 2,773,176 | 12/56 | Braak et al. |

ROBERT H. ROSE, *Primary Examiner.*

WILLIAM C. COOPER, *Examiner.*

UNITED STATES PATENT OFFICE

CERTIFICATE OF CORRECTION

Patent No. 3,173,996 March 16, 1965

Chandos A. Rypinski, Jr.

It is hereby certified that error appears in the above numbered patent requiring correction and that the said Letters Patent should read as corrected below.

Column 5, line 29, for "estabishes" read -- establishes --; column 7, line 43, for "by" read -- but --; line 49, for "will" read -- all --; column 13, line 71, for "operates" read -- operate --; column 20, line 25, for "comomn" read -- common --; column 23, line 30, for "asumed" read -- assumed --; column 25, line 28, for "dailing" read -- dialing --; column 27, line 44, for "throuhg" read -- through --; line 52, for "interogation" read -- interrogation --; column 32, line 6, for "transistion" read -- transition --; column 41, line 46, after "marking" insert -- signal --; same line 46, after "a", second occurrence, strike out "single"; column 46, line 62, for "some" read -- come --.

Signed and sealed this 17th day of August 1965.

(SEAL)

Attest:

ERNEST W. SWIDER
Attesting Officer

EDWARD J. BRENNER
Commissioner of Patents